US012715063B2

(12) United States Patent
Grubb et al.

(10) Patent No.: US 12,715,063 B2
(45) Date of Patent: Aug. 25, 2026

(54) HIGH POWER LASER TUNNELING MINING AND CONSTRUCTION EQUIPMENT AND METHODS OF USE

(71) Applicant: Foro Energy, Inc., Houston, TX (US)

(72) Inventors: Daryl L. Grubb, Houston, TX (US); John F. Volkmar, Boulder, CO (US); Mark S. Zediker, Castle Rock, CO (US); Shararth K Kolachalam, Highlands Ranch, CO (US); Ryan J. Norton, Conifer, CO (US); Mark S. Land, Houston, TX (US); Brian O. Faircloth, Evergreen, CO (US); Ronald A. De Witt, Katy, TX (US)

(73) Assignee: Foro Energy, Inc., Littleton, CO (US)

( * ) Notice: Subject to any disclaimer, the term of this patent is extended or adjusted under 35 U.S.C. 154(b) by 0 days.

(21) Appl. No.: 18/114,869

(22) Filed: Feb. 27, 2023

(65) Prior Publication Data

US 2023/0321749 A1 Oct. 12, 2023

Related U.S. Application Data

(60) Division of application No. 16/237,691, filed on Jan. 1, 2019, now Pat. No. 11,590,606, which is a division (Continued)

(51) Int. Cl.

*B23K 26/00* (2014.01)
*B23K 26/03* (2006.01)

(Continued)

(52) U.S. Cl.

CPC .......... *B23K 26/0093* (2013.01); *B23K 26/03* (2013.01); *B23K 26/0604* (2013.01); *B23K 26/0622* (2015.10); *B23K 26/0626* (2013.01); *B23K 26/0648* (2013.01); *B23K 26/0676* (2013.01); *B23K 26/14* (2013.01);

(Continued)

(58) Field of Classification Search

CPC ............ B23K 2103/30; B23K 2103/52; B23K 2103/50; B23K 37/0294; B23K 37/0288; B23K 26/402; B23K 26/40; B23K 26/1476; B23K 26/14; B23K 26/0676; B23K 26/0648; B23K 26/0626; B23K 26/0604; B23K 26/03; B23K 26/703; B23K 26/382; B23K 26/0622; B23K 26/0093;

(Continued)

(56) References Cited

U.S. PATENT DOCUMENTS 2,548,463 A * 4/1951 Blood ........................ E21B 7/14 175/212
4,047,763 A * 9/1977 Gilliland ................. E21C 31/02 299/76

(Continued)

*Primary Examiner* — Jimmy Chou

(57) ABSTRACT

There are provided high power laser and laser mechanical earth removing equipment, and operations using laser cutting tools having stand off distances. These equipment provide high power laser beams, greater than kW to cut and volumetrically remove targeted materials and to remove laser affected material with gravity assistance, mechanical cutters, fluid jets, scrapers and wheels. There is also provided a method of using this equipment in mining, road resurfacing and other earth removing or working activities.

19 Claims, 42 Drawing Sheets

Related U.S. Application Data of application No. 14/139,680, filed on Dec. 23, 2013, now Pat. No. 10,195,687, which is a continuation-in-part of application No. 14/080,722, filed on Nov. 14, 2013, now Pat. No. 9,545,692, and a continuation-in-part of application No. 13/782,869, filed on Mar. 1, 2013, now Pat. No. 9,719,302, and a continuation-in-part of application No. 13/768,149, filed on Feb. 15, 2013, now Pat. No. 9,242,309, and a continuation-in-part of application No. 13/347,445, filed on Jan. 10, 2012, now Pat. No. 9,080,425, and a continuation-in-part of application No. 13/222,931, filed on Aug. 31, 2011, now abandoned, and a continuation-in-part of application No. 13/210,581, filed on Aug. 16, 2011, now Pat. No. 8,662,160, and a continuation-in-part of application No. 12/840,978, filed on Jul. 21, 2010, now Pat. No. 8,571,368, and a continuation-in-part of application No. 12/706,576, filed on Feb. 16, 2010, now Pat. No. 9,347,271, and a continuation-in-part of application No. 12/544,136, filed on Aug. 19, 2009, now Pat. No. 8,511,401, and a continuation-in-part of application No. 12/544,094, filed on Aug. 19, 2009, now Pat. No. 8,424,617, and a continuation-in-part of application No. 12/543,986, filed on Aug. 19, 2009, now Pat. No. 8,826,973.

(60) Provisional application No. 61/745,661, filed on Dec. 24, 2012, provisional application No. 61/727,096, filed on Nov. 15, 2012, provisional application No. 61/605,429, filed on Mar. 1, 2012, provisional application No. 61/605,434, filed on Mar. 1, 2012, provisional application No. 61/378,910, filed on Aug. 31, 2010, provisional application No. 61/374,594, filed on Aug. 17, 2010, provisional application No. 61/153,271, filed on Feb. 17, 2009, provisional application No. 61/106,472, filed on Oct. 17, 2008, provisional application No. 61/102,730, filed on Oct. 3, 2008, provisional application No. 61/090,384, filed on Aug. 20, 2008.

(51) Int. Cl.

| | |
|---|---|
| ***B23K 26/06*** | (2014.01) |
| ***B23K 26/062*** | (2014.01) |
| ***B23K 26/0622*** | (2014.01) |
| ***B23K 26/064*** | (2014.01) |
| ***B23K 26/067*** | (2006.01) |
| ***B23K 26/14*** | (2014.01) |
| ***B23K 26/382*** | (2014.01) |
| ***B23K 26/40*** | (2014.01) |
| ***B23K 26/402*** | (2014.01) |
| ***B23K 26/70*** | (2014.01) |
| ***B23K 37/02*** | (2006.01) |
| ***E01C 23/08*** | (2006.01) |
| ***E21B 7/15*** | (2006.01) |
| ***E21C 25/64*** | (2006.01) |
| ***E21C 27/24*** | (2006.01) |
| ***E21C 37/18*** | (2006.01) |
| ***E21D 9/10*** | (2006.01) |
| *B23K 103/00* | (2006.01) |

(52) U.S. Cl.

CPC ........ *B23K 26/1476* (2013.01); *B23K 26/382* (2015.10); *B23K 26/40* (2013.01); *B23K 26/402* (2013.01); *B23K 26/703* (2015.10); *B23K 37/0288* (2013.01); *B23K 37/0294* (2013.01); *E01C 23/08* (2013.01); *E21B 7/15* (2013.01); *E21C 25/64* (2013.01); *E21C 27/24* (2013.01); *E21C 37/18* (2013.01); *E21D 9/1073* (2013.01); *B23K 2103/30* (2018.08); *B23K 2103/50* (2018.08); *B23K 2103/52* (2018.08)

(58) Field of Classification Search

CPC ....... E21D 9/1073; E21C 37/18; E21C 27/24; E21C 25/64; E21B 7/15; E01C 23/08

USPC ............ 219/121.72, 121.82, 121.78, 121.69, 219/121.67

See application file for complete search history.

(56) References Cited

U.S. PATENT DOCUMENTS

| | | | | | |
|---|---|---|---|---|---|
| 4,148,057 | A * | 4/1979 | Jesse | B41J 3/28 | 430/1 |
| 4,557,524 | A * | 12/1985 | Melhuish | E21C 35/223 | 454/168 |
| 4,715,657 | A * | 12/1987 | Sato | E21C 35/08 | 299/1.6 |
| 5,501,548 | A * | 3/1996 | Hayashi | E21D 9/093 | 299/1.4 |
| 5,529,437 | A * | 6/1996 | Filipowski | G01C 15/002 | 356/153 |
| 6,203,111 | B1 * | 3/2001 | Ollis | E21C 35/24 | 299/1.4 |
| 6,477,943 | B2 * | 11/2002 | Janecka | A21C 9/063 | 99/450.2 |
| 6,851,488 | B2 * | 2/2005 | Batarseh | E21B 7/14 | 175/11 |
| 6,880,646 | B2 * | 4/2005 | Batarseh | E21B 43/11 | 166/57 |
| 6,974,726 | B2 * | 12/2005 | Dani | H01L 21/78 | 438/114 |
| 7,147,064 | B2 * | 12/2006 | Batarseh | E21B 47/013 | 175/11 |
| 8,124,000 | B2 * | 2/2012 | Tsujikawa | B23K 26/361 | 264/2.7 |
| 8,201,642 | B2 * | 6/2012 | Radford | E21B 10/26 | 175/107 |
| 8,464,794 | B2 * | 6/2013 | Schultz | E21B 43/11 | 166/250.1 |
| 8,511,401 | B2 * | 8/2013 | Zediker | E21B 43/11 | 372/4 |
| 9,074,422 | B2 * | 7/2015 | Grubb | B23K 26/1464 | |
| 9,562,395 | B2 * | 2/2017 | Grubb | E21B 7/14 | |
| 10,036,232 | B2 * | 7/2018 | DeWitt | E21B 29/00 | |
| 2002/0029909 | A1 * | 3/2002 | Griffo | C23C 30/005 | 175/426 |
| 2002/0050637 | A1 * | 5/2002 | Sekiya | H01L 21/67132 | 257/702 |
| 2003/0006220 | A1 * | 1/2003 | Cummings | B23K 26/40 | 219/121.76 |
| 2004/0188400 | A1 * | 9/2004 | Peng | B28D 1/221 | 219/121.72 |
| 2004/0256103 | A1 * | 12/2004 | Batarseh | B23K 26/128 | 166/55.1 |
| 2005/0121235 | A1 * | 6/2005 | Larsen | E21B 10/18 | 175/393 |
| 2005/0269132 | A1 * | 12/2005 | Batarseh | B23K 26/40 | 175/40 |
| 2006/0070770 | A1 * | 4/2006 | Marsh | E21B 44/00 | 175/27 |
| 2006/0102343 | A1 * | 5/2006 | Skinner | B23K 26/082 | 166/57 |
| 2007/0068705 | A1 * | 3/2007 | Hosie | E21B 21/10 | 175/57 |
| 2008/0166132 | A1 * | 7/2008 | Lynde | E21B 29/06 | 398/142 |
| 2008/0213978 | A1 * | 9/2008 | Henry | B23K 26/40 | 257/E21.238 |

(56) References Cited

U.S. PATENT DOCUMENTS

2008/0245568 A1* 10/2008 Jeffryes .................... E21B 7/06 175/73
2009/0114628 A1* 5/2009 DiGiovanni ......... B23K 26/146 219/121.72
2009/0260877 A1* 10/2009 Wirth ...................... E21B 10/55 175/40
2010/0032207 A1* 2/2010 Potter ...................... F03G 7/04 175/57
2010/0044102 A1* 2/2010 Rinzler ................... E21B 43/11 175/15
2010/0044103 A1* 2/2010 Moxley ..................... E21B 7/15 166/65.1
2010/0044105 A1* 2/2010 Faircloth ................. E21B 10/60 175/16
2010/0044106 A1* 2/2010 Zediker ................... E21B 29/00 166/65.1
2010/0078414 A1* 4/2010 Perry ................... B23K 26/382 175/11
2010/0089576 A1* 4/2010 Wideman ................ E21B 10/00 166/272.6
2010/0096189 A1* 4/2010 Salzer, III ........... E21B 17/1078 175/92
2010/0101866 A1* 4/2010 Bird ........................ C22C 29/08 175/428
2010/0108401 A1* 5/2010 Lanning .................. E21B 10/54 175/425
2010/0116556 A1* 5/2010 Buske ..................... E21B 10/26 175/335
2010/0175926 A1* 7/2010 Buske ..................... E21B 10/50 175/374
2010/0181117 A1* 7/2010 Scott ....................... E21B 10/46 175/428
2010/0181292 A1* 7/2010 Stauffer ................... H05H 1/42 175/336
2010/0187018 A1* 7/2010 Choe ....................... C22C 19/00 175/426
2010/0193254 A1* 8/2010 Lind .................. B24D 18/0009 175/426
2010/0193255 A1* 8/2010 Stevens ................... E21B 10/54 175/425
2010/0238680 A1* 9/2010 Stuart ................... H01S 5/4025 362/235
2010/0258289 A1* 10/2010 Lynde ..................... E21B 37/02 166/55.7
2010/0276208 A1* 11/2010 Sue ......................... C22C 29/08 175/425
2010/0282510 A1* 11/2010 Sullivan .................. E21B 10/00 73/152.43
2010/0282519 A1* 11/2010 Zhang ..................... E21B 10/55 175/434
2010/0307837 A1* 12/2010 King ......................... E21B 7/20 175/425
2010/0326659 A1* 12/2010 Schultz ................... E21B 29/06 166/297
2011/0042145 A1* 2/2011 Xia ......................... E21B 10/52 76/108.1
2011/0048810 A1* 3/2011 Lin ......................... E21B 10/25 175/371
2011/0120771 A1* 5/2011 Montaron ................. E21B 7/14 175/11
2011/0266068 A1* 11/2011 Eason ................... E21B 10/602 175/374
2012/0068086 A1* 3/2012 DeWitt ................... E21B 37/00 250/492.1
2012/0074110 A1* 3/2012 Zediker ................... E21B 10/60 219/121.72
2012/0255774 A1* 10/2012 Grubb ..................... E21B 10/60 175/16
2012/0261188 A1* 10/2012 Zediker ..................... E21B 7/14 175/15
2012/0267168 A1* 10/2012 Grubb ................ B23K 26/0093 250/492.1
2012/0273269 A1* 11/2012 Rinzler .................. G01M 11/35 175/16
2012/0325563 A1* 12/2012 Scott ................... E21B 10/5676 175/428
2013/0081875 A1* 4/2013 Hyde ...................... E21B 49/02 175/57
2014/0041940 A1* 2/2014 Shnell ...................... H05B 6/80 175/11
2015/0105899 A1* 4/2015 Santner .............. B23K 26/0093 700/166

* cited by examiner

Spot at 100 Ft ± 4 Ft

-4 ft
2 cm diameter

-Focal Plane
1 15 cm diameter

+4 ft
2 cm diameter

Ray trace analysis at 100 ft from optic +4 ft shows a tight spot over the entire range

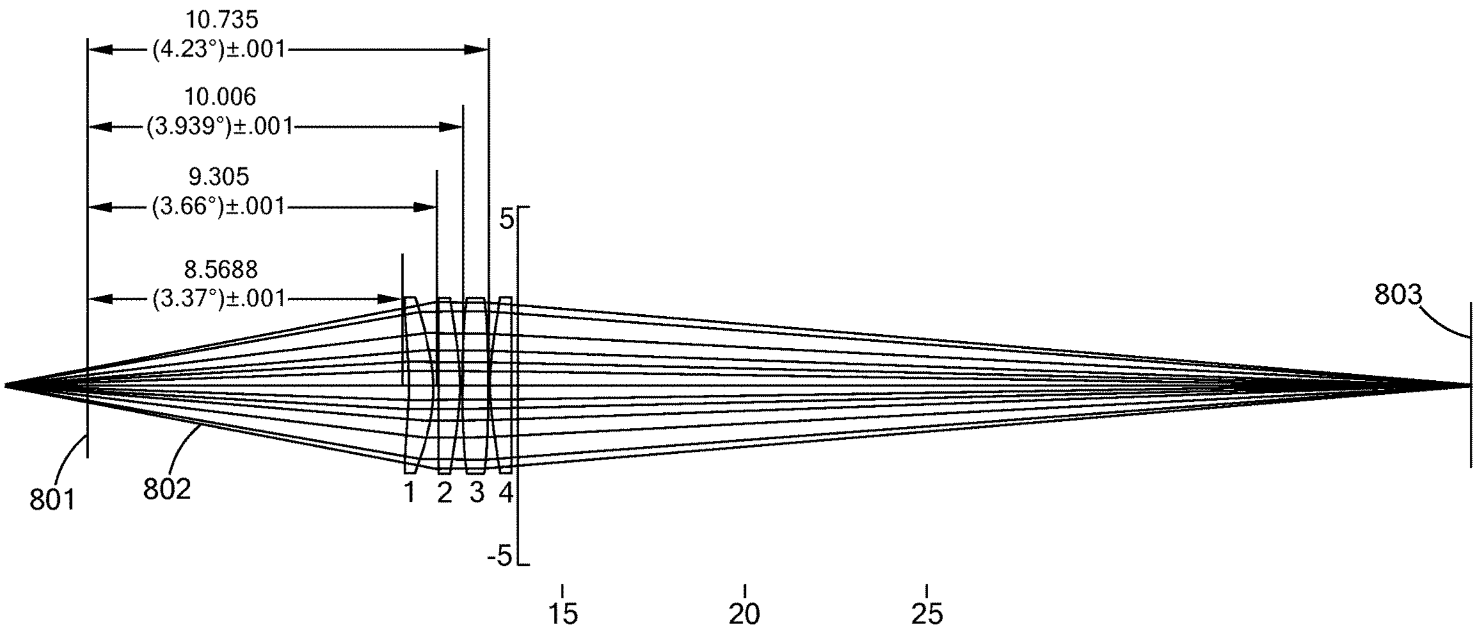
FIG. 18
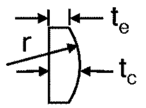
- Lens 1: LE4560
- Lens 2: PLCX-50.8-1030-UV-10.64
  $t_c$=6.4mm r=103mm
  $t_e$=3.2mm
- Lens 3: PLCX-50.8-257.5-UV-10.64
  $t_c$=6.4mm r=257.5mm
  $t_e$=5.1mm
- Lens 4: LE4150
FIG. 18A
<u>1000mm FL</u>
- Lens
  Ø : 50.8mm 2”
- Lens center
  ? 6.4mm 0.2519”
- Lens edge
  ? 5.8mm 0.223”
1-2: - 0.29
1-3: - 0.569+0.051
1-4: - 0.86
Lens radius of curvature: 515.1mm = 20.279”
R
FIG. 18B Laser 7020

Laser Unit - Source of Beam

Chiller 7021

Chiller Unit - Temperature Control of Components

Controls 7022

Controls - Human/System Interface for Function of Device

Compressor 7023

Compressor - Pressurized Air for Optics Protection/ Cooling and Assist of Cut

Generator 7024

Generator - Power Source for All Components

7000

Beam Manipulator - Component to Direct Beam to Work

HIGH POWER LASER TUNNELING MINING AND CONSTRUCTION EQUIPMENT AND METHODS OF USE

This application is a divisional of U.S. patent application Ser. No. 16/237,691 filed Jan. 1, 2019, which is a divisional of U.S. patent application Ser. No. 14/139,680 filed Dec. 23, 2013 and which: (i) claims, under 35 U.S.C. § 119(e)(1), the benefit of the filing date of Dec. 24, 2012 of U.S. provisional application Ser. No. 61/745,661; (ii) is a continuation in part of U.S. patent application Ser. No. 14/080,722, which claims under 35 U.S.C. § 119(e)(1), the benefit of the filing date of Nov. 15, 2012 of U.S. provisional application Ser. No. 61/727,096; is a continuation in part of U.S. patent application Ser. No. 13/782,860, which claims, under 35 U.S.C. § 119(e)(1), the benefit of the filing date of Mar. 1, 2012 of U.S. provisional application Ser. No. 61/605,429; (iii) is a continuation in part of US patent application Ser. No. 13/768,149, which claims, under 35 U.S.C. § 119 (e)(1), the benefit of the filing date of Mar. 1, 2012 of U.S. provisional application Ser. No. 61/605,434; (iv) is a continuation-in-part of U.S. patent application Ser. No. 13/222,931 filed Aug. 31, 2011, which claims under 35 U.S.C. § 119 (e)(1), the benefit of the filing date of Aug. 31, 2010 of provisional application Ser. No. 61/378,910; (v) is a continuation-in-part of U.S. patent application Ser. No. 13/210,581, filed Aug. 16, 2011, which claims, under 35 U.S.C. § 119 (e)(1), the benefit of the filing date of Aug. 17, 2010 of provisional application Ser. No. 61/374,594; (vi) is a continuation-in-part of U.S. patent application Ser. No. 12/544,136, filed Aug. 19, 2009, which claims, under 35 U.S.C. § 119 (e)(1), the benefit of the filing date of Aug. 20, 2008 of provisional application Ser. No. 61/090,384, the benefit of the filing date of Oct. 3, 2008 of provisional application Ser. No. 61/102,730, the benefit of the filing date of Oct. 17, 2008 of provisional application Ser. No. 61/106,472, and the benefit of the filing date of Feb. 17, 2009 of provisional application Ser. No. 61/153,271; (vii) is a continuation-in-part of U.S. patent application Ser. No. 12/544,094, filed Aug. 19, 2009; (viii) is a continuation-in-part of U.S. patent application Ser. No. 12/706,576 filed Feb. 16, 2010; (ix) is a continuation-in-part of U.S. patent application Ser. No. 12/840,978 filed Jul. 21, 2010; (x) is a continuation-in-part of U.S. patent application Ser. No. 12/543,986, filed Aug. 19, 2009; (xi) claims, under 35 U.S.C. § 119 (e)(1), the benefit of the filing date of Nov. 15, 2012 of U.S. provisional application Ser. No. 61/727,096; and, (xii) is a continuation-in-part of U.S. patent application Ser. No. 13/347,445 filed Jan. 10, 2012, the entire disclosures, of each, of which are incorporated herein by reference.

BACKGROUND OF THE INVENTION

Field of the Invention

The present inventions relate to methods, apparatus and systems for the delivery of high power laser beams over a distance to a work surface to perform a laser operation or a laser mechanical operation on the work surface, such as, treating, fracturing, tunneling, weakening, welding, annealing, cutting, removing, drilling, penetrating, and combinations and various of these. The work surfaces, for example, may be roads, the earth, bridge supports, dams, ice, rocks, rock faces, pipes, conduit, tubes, columns, wire, cables, girders, beams, buildings, concrete, reinforced concrete, rebar, metal, earth, coal, ore, shale, tar sands, mineral containing materials, steel, tanks, and support structures.

As used herein the term “earth” should be given its broadest possible meaning, and includes, the ground, all natural materials, such as rocks, and artificial materials, such as concrete, that are or may be found in the ground, including without limitation rock layer formations, such as, granite, basalt, sandstone, tar sands, dolomite, sand, salt, limestone, ores, minerals, overburden, marble, rhyolite, quartzite and shale rock.

As used herein, unless specified otherwise, the terms “borehole,” “tunnel,” “shaft” and similar such terms should be given their broadest possible meaning and include any opening that is created in the earth, in a structure (e.g., building, protected military installation, nuclear plant, or ship), in a work surface, or in a structure in the ground, (e.g., foundation, roadway, airstrip, cave or subterranean structure) that is substantially longer than it is wide, such as a well, a tunnel, adit, raise, rise, incline, decline, a hole, a well bore, a mine shaft, a well hole, a micro hole, slimhole and other terms commonly used or known in the arts to define these types of narrow long passages. Such openings may further have segments or sections that have different orientations, they may have straight sections and arcuate sections and combinations thereof; and for example may be of the shapes commonly found when directional drilling is employed or when mining tunnels follow ore deposits, thus incline, decline or maintain a constant gradient, or when road tunnels begin at the surface and extend below a body of water and then return to the surface, such as for example the Chesapeake Bay tunnels. Thus, as used herein unless expressly provided otherwise, the terms “bottom”, “bottom surface” or “end,” “shaft bottom”, “end of tunnel”, “end of decline”, and similar such terms, when used in relation to a borehole, tunnel or shaft, refer to the end of the borehole, tunnel or shaft, e.g, that portion that is farthest along the path from the opening, start, the surface of the earth, other reference point, or the beginning.

As used herein, unless specified otherwise, the terms, “cut,” “cutting,” “sectioning” and similar such terms should be given their broadest possible meaning, and include the remove of material in a pattern that is longer than it is wide, which would include a pattern that is linear, substantially linear, curved, annular, geometric (such as a rectangle, square, trapezoid, etc.) or non-geometric (such as a trace of a natural structure like an ore seam, or other pattern that does not have a common geometric name). A cut may be continuous, such that the material is removed by the laser along the entirely of the pattern, or it may be staggered or partial, which could be viewed as a series of lands (where no material is removed) and cuts (where material is removed), stitches, perforations, spaced holes, etc. The use of the term “completed” cut, and similar such terms, includes severing a material into two sections, i.e., a cut that is all the way through the material, or removing sufficient material to meet the intended objective of the cut. A borehole, a tunnel, a hole, an opening, or any volumetric shape of removed material, may be made using cuts placed adjacent, or substantially adjacent one an another, as for example by delivering the laser beam in a raster scan pattern.

As used herein, unless specified otherwise “offshore” and “offshore drilling activities”, “offshore activities” and similar such terms are used in their broadest sense and would include activities on, or in, any body of water, whether fresh or salt water, whether manmade or naturally occurring, such as for example rivers, lakes, canals, inland seas, oceans, seas, bays and gulfs. As used herein, unless specified otherwise the term “seafloor” is to be given its broadest possible meaning and would include any surface of the earth that lies under, or is at the bottom of, any body of water, whether fresh or salt water, whether manmade or naturally occurring.

As used herein, unless specified otherwise, “mining”, “mine” and similar such terms, are used in their broadest possible sense; and would include all activities, locations and areas where materials of value, e.g., ore, gems, minerals, etc., are removed or obtained from the earth.

As used herein, unless specified otherwise “high power laser energy” means a laser beam having at least about 1 kW (kilowatt) of power. As used herein, unless specified otherwise “great distances” means at least about 500 m (meter). As used herein the term “substantial loss of power,” “substantial power loss” and similar such phrases, mean a loss of power of more than about 3.0 dB/km (decibel/kilometer) for a selected wavelength. As used herein the term “substantial power transmission” means at least about 50% transmittance.

Discussion of Related Art

Mining Activities and Equipment

This is a general background discussion of the mining arts, it being understood that this general discussion does not limit the applicability of the present laser operations, systems and apparatus to the mining arts, presently known, or later developed, including mining arts and practices that may be developed based upon and using the teachings of this specification.

In general, and without limitation, mining and mining activities can generally be categorized into surface mining and underground mining, which may include activities under the surface of the earth and activities under the sea floor. Surface mining may be considered to include activities that take place at or into the surface of the earth to extract deposits of resources, e.g., minerals or ore, which are close, or closer, to the surface. While underground mining may be considered to include activities that take place to obtain deposits of resources that are further below the earth's surface, and thus, require the extraction activities to take place under the surface, i.e., sub-surface, of the earth, including the sea floor.

Surface Mining

In many types of surface mining, heavy equipment, such as an earthmover, first removes the overburden, which is the soil and rock above the resource deposit. Then after the overburden has been removed, generally large machines such as drag lines, dozers, shovels and haulers, extract the ore, e.g., the earth containing the mineral (including various forms of that mineral), such as, gold, silver, iron, argentite, barite, bauxite, chalcocite, hematite, magnetite, taconite, diamonds, coal or salt.

In surface mining to extract the ore, often times, holes are drilled, explosives are placed into the hole and initiated to fracture the rock mass, cut, or otherwise make the ore easier to remove. Following blasting, weakened—fracture rock—material is extracted utilizing mining removal equipment, etc., e.g. excavation and hauling equipment is employed to remove the ore for further processing, if need be, to recover the economic mineral inventory, mineral reserves or resource. In general, surface mining may further be characterized into several types, such as placer mining, strip mining, mountain top removal, hydraulic, open pit, and dredging. In being understood that these characterizations, as well as the general characterizations of surface and underground, are not exclusive, and should be viewed as general characterizations for which some types of activities may come under one or more characterization, and that other terms or names may be used for these, as well as, other activities by those of skill in the art.

Placer mining□ involves types of mining where the resources are deposited in sand or gravel or are otherwise on the surface of the earth, and thus, can be recovered without having to drive, use explosives or any other significant means. This is an older form of mining. The simplest technique of placer gold mining is panning. In panning, some sediment is placed in a large metal pan, combined with an amount of water, and stirred or mixed so that the sand flows over the side. Any gold particles contained in the sand, due to the higher density of gold, will tend to remain on the bottom of the pan after all of the sand and mud has been washed away. The same principle may be employed on a larger scale by constructing a sluice box, with barriers along the bottom to slow the movement of gold particles. This method better suits excavation with shovels or similar implements to feed sediment into the device.

Strip mining is the practice of mining a seam of mineral ore by first removing all of the soil and rock that lies on top of it (the overburden). It is similar to open-pit mining in many regards. Strip mining is a near surface mining method typically used in near surface deposit with low rock strength or hardness. Typically, no drilling and blasting is required in Strip mining, the rock mass is sufficiently weak that ore can be fractured, ripped and excavated through the use of mechanical mining equipment such as bucket wheel excavators, dragline excavator and/or general earth moving equi This method is sometimes referred to as strip mining and/or contour strip mining. Area strip mining may be used on fairly flat terrain to extract deposits over a large area. Contour strip mining may be used in hilly terrain and involves cutting terraces in mountainsides following the contour of the land.

Mountaintop removal, a relatively new form of mining compared to the others described above, involves essentially the restructuring of the earth, e.g., removing the top of a mountain, to reach ores or minerals, as deep as 1,000 feet below the surface.

Hydraulic mining involves high pressure water. The water is sprayed at an area of rock and/or gravel and the water breaks the rock up, dislodging the ore. The water/ore mixture is then further processed.

Open pit mining/Open Cast Mining/Quarry Mining involves the removal of both economic and non-economic near surface material/rock to expose and excavate either economic commodities such as copper, gold, nickel, potash, iron ore, molybdenum, diamonds, coal, oil shale or economic material such as granite, marble or material used for construction i.e. road metal, aggregate, gravel and sand. Typically, open pit mines used to mine material such as granite, marble, gravel sand etc are refered to as a quarry or quarrying etc. Open pit mining will utlize a combination of methods and equipment to remove both the ore and waste (non-economic) material. Initial removal of either the overburden and/or more weathered (weak) rock mass will be removed by mechanical methods as previously described. Generally, rock strength increase with depth as the weathering profile decreases, once the rock strength exceed the mechanical breaking capacity of the machinery, drilling and blasting methods will be used to fracture the rock and subsequently excavate/remove the material/rock using mechanical excavators or shovels. Open Pit mining is non selective and requires the removal of all material ore and waste to the final pit shape, shell or designed economic bottom of the pit. Dredging is a method often used to bring up underwater mineral deposits. Dredging may be used to clear or enlarge waterways for shipping and also may be used to recover underwater minerals Underground Mining Underground mining refers to a group of techniques used for the extraction of valuable minerals or other geological materials from the earth Underground or sub-surface mining is a form of where the operations and workings are below ground and is overlain by rock or material strata by definition. Access to the working is via a tunnel or shaft. There are two main components to an underground mine. The access the means by which the underground environment is accessed from the surface and the production (mining) area. There are only two means of accessing an underground mine either vertically via and Shaft—(vertical or inclined typically up 45-55 degrees, sometimes referred to as a raise, rise or whinz) or by a drifting (also referred to as a tunnel, adit, drive, decline, incline, ramp and slope. Drifts can vary in gradient from 0 to +/−30% These access can be developed by either mechanical methods ultilizing mechanical cutting, ripping or fracturing or via a drilling and blasting methods, requiring the use of explosives to fracture the rock. Mechanical methods include the utilization of equipment as tunnel boring machine, road header, continuous miner, shaft boring machine and raisebore machine. Drilling and blasting methods require the drilling of blast holes, which are loaded with explosives and initiated (blasted). Several types of drills can be used in drifting, raising and sinking. These include development drills single boom, double boom, triple, boom (often referred to as a development jumbo). There are production drill rigs usually referred to by their brand name i.e. Solo, Cubex these are single drill utilizing for the drilling of larger diameter drill holes. There also small diameter manual drills commonly known as Airleg, Jackleg and stopers. Finally, there are shaft drills, shaft or sinking jumbos Both types of access can be developed by both mechanical and drill and blast methods, in additions both methods can be applied to, what is typically referred to as soft and hard rock.

Additional terminology refers to the initial access or start of either the drift or shaft. The initial access to a decline, incline or adit is referred to as a portal this is the initial 5-100 meters of the drift, often additional support is required installed to support the potentially more weather material close to the surface. A portal can be initiated either from the original surface (through soil or solid rock) or from a man made surface such as an open pit bottom, wall, bench or a box cut (a large excavation of typically soil-sand-weathered rock material to the start of solid rock, Due to the stability of these material these excavation usually have walls below the minimum rill angle of soil less than 55 degrees), retaining structures may need to be constrain the material.

Similarly the initial entry into a shaft is via the shaft collar from a surface shaft (mines can have internal shafts and raises), typically shaft collar is developed in solid rock. If the shaft location is overlain with significant soil-sand-weather rock this will be excavated until solid rock is reach using earth moving equipment similar to the described box cut. Retaining structures may need to be constructed to retain the material.

In being understood that these characterizations, as well as, the general characterizations of surface and underground, are not exclusive, and should be viewed as general characterizations for which some types of activities may come under one or more characterization, and that other terms or names may be used for these, as well as, other activities by those of skill in the art.

Drift mining is a method of accessing valuable geological material, such as coal, by cutting into the side of the earth, rather than tunneling straight downwards. Drift mines have horizontal entries into the coal seam from a hillside. Drift mines are distinct from slope mines, which have an inclined entrance from the surface to the coal seam. If possible, though, drifts are driven at just a slight incline so that removal of material can be assisted by gravity.

□Slope mining is a method of accessing valuable geological material, such as coal. A sloping access shaft travels downwards towards the coal seam. Slope mines differ from shaft and drift mines, which access resources by tunneling straight down or horizontally, respectively.

Shaft mining is a type of underground mining done by use of a mine shaft. A mine shaft is a vertical passageway used for access to an underground mine. On the surface above the shaft stands complex hoisting, air management, communication and other supply and support equipment.

Hard rock mining is a general term that may be used to refer to various techniques used to mine ore bodies from harder rocks. Thus, it would include an orebody and rock masses that require mining via drilling and blasting mining methods with greater rock strengths these would include orebodies such as gold, silver, iron, copper, zinc tin, nickel, and lead deposits. Hard rock mining techniques may also be used to mine gems, such as diamonds. Soft rock mining is a general term used to refer to orebodies that can be mined using mechanical mining equipment using machines, to fracture, cut or rip the rock. The orebody are typically refered to as been soft rocks such coal, tar sands, and salt, these rock deposits are generally sedimentary It being recognized that these techniques and material may be be used in various applications and combinations of applications.

Typical, underground mining methods include, cut and fill mining, room and pillar mining, sub-level caving and block caving and variations of these techniques. These methods can been classified in to two groups caving and non caving methods. The non-caving method the method is designed to either be self supporting (such are room and pillar where pillars of ore are purposely left behind to support the overlying strata) or supported methods where ground support and/or backfill are used to support the overlying strata. These methods include, cut and fill, room and pillar and Long Hole Open stoping, (and variations of these methods such as stope and pillar, vertical crater retreat, benching and shrink stoping).

Caving methods such as sub level caving and block caving (or variations of the method such as inclined caving) the orebody is allowed or purposely.

Mining techniques, may involve the creation of underground "rooms", where the ore or valuable material has been removed, supported by surrounding pillars of standing rock. Mining techniques can These techniques would include, for example, stope and pillar, room and pillar, long hole stoping, benching, vertical crater retreat, block caving, and sub-level caving.□

□Borehole Mining (BHM) is a remote operated method of mining mineral resources through boreholes by means of high pressure water jets. This process can be carried out from the land surface, open pit floor, underground mine, floating platform, or vessel through pre-drilled boreholes.

Entry under ground and advancement of the shafts or tunnels, to the mining activity, or face of the material to be mined, may be obtained through several ways, including by a declining ramp, an essentially vertical, or vertical shaft, or a essentially horizontal, or horizontal, opening (e.g., an adit).

Thus, for example, a decline may be a spiral tunnel which can go around the deposit and thus circles either the outside or inside of the deposit. The declines can begins with a square or box cut, to function as the portal to the surface. Depending on the amount of overburden and quality of bedrock, a steel or other supports may may be required for safety purposes. Shafts are vertical excavations sunk, e.g., bored or dug, into or adjacent to an ore body. Shafts may be sunk for ore bodies where haulage to surface via truck is not economical, or where access to the ore bodies is not practical. Shafts may also be employed in conjunction with a ramp or adits. Adits are horizontal, or substantially horizontal, excavations into the side of a hill or mountain. They are used for horizontal or near-horizontal ore bodies where there is no need for a ramp or shaft, or they may serve to access shafts. An example of a combination of these techniques may be seen when a decline is placed into the the side of the pit wall of an surface mine when, for example, the ore is of a payable grade sufficient to support an underground mining operation but the strip ratio (mineral to waste) has become too great to support surface mining operations.

Generally, there underground mining may be viewed as having two principal phases: development mining and production mining. Development mining is composed of excavation almost entirely in (non-valuable) waste rock in order to gain access to the ore or valuable material. Generally, development mining may involve to following activities: remove previously blasted material, scaling (e.g., removing any unstable slabs of rock hanging from the roof and sidewalls to protect workers and equipment from damage), support excavation, drill rock face, load explosives, and blast explosives.

Generally, production mining may be further characterized as, long hole mining methods and short hole mining methods. Short hole mining is similar to development mining, except that it occurs in ore or valuable material. There are several different methods of long hole mining. Such techniques may also be referred to as room & pillar, or cut and fill method. For example, and generally, long hole mining may have two excavations within the ore, or material of value, at different elevations below surface, (e.g, about 15 meters to 30 meters apart), which may also be referred to as long hole stoping or variations off. Holes are then drilled between the two excavations and loaded with explosives. The holes are blasted and the ore is removed from the bottom excavation.

The surrounding walls and roof of the mine excavation area, in general need to be supported by area ground support. Area ground support is used to prevent ground failures and in particular major ground failures. Thus, holes are drilled into the back, e.g., ceiling or roof, and walls of the mine and a long steel shaft, e.g., a rod or rock bolt, is installed to hold the ground together. There are in general three types of these supports: mechanical bolts, grouted bolts, and friction bolts.

Mechanical bolts would include point anchor bolts, e.g., expansion shell bolts. A point anchor bolt is a metal bar between about 20 mm-25 mm in diameter, and between about 1 m to 4 m to 25 m long, this size may vary and is determined to meet the holding and strength requirements for a particular application or mine. There is an expansion unit or assembly at the end of the bolt, which is inserted into the hole. As the bolt is tightened by the installation drill the expansion member, e.g., a shell like assembly, expands and the bolt tightens holding the rock together.

Grouted bolts can be essentially a resin grouted rod, e.g., rebar, and generally can be used in areas that require more support than a point anchor bolt can give. The rebar used may be of similar size as a point anchor bolt but does not have an expansion assembly. Once the hole for the rebar is drilled, cartridges of epoxy resin are installed in the hole. The rebar bolt is installed after the resin and spun by the installation drill. This opens the resin cartridge and mixes it. Grouted bolt types would also include cable bolts, which are used to bind large masses of rock in for example a hanging wall or around large excavations. These cable bolts are much larger than standard rock bolts and rebar, usually between about 10-25 meters. These bolts are are grouted with a cement.

Friction bolts, or friction stabilizer, would include bolts of the type solded as SPLIT SET. These bolts can be easier to install than mechanical bolts or grouted bolts; as these bolt are hammered into a drill hole, which has a smaller diameter than the bolt. In this manner as the bold is forced into the hole, pressure from the bolt on the wall holds the rock together. Another type of friction bolt uses a high pressure source, such as high pressure water to expand the bold once it is in place in the rock. An example of this type of bold would be the SWELLEX type bolts and systems.

Other examples of mining methods may include stope and fill, stope and retreat, cut and fill, drift and fill, shrinkage stoping, room and pillar, and block caving. In stope and reteat, material is removed from stope, e.g., a stepped area of excavation, without filling in any voids, allowing the rocks walls to collapse to fill in the extracted area after the ore has been removed. In the stope and fill method, instead of allowing the excavated area to collapse, it is filled with a material; so that room the remaining ore around the first area of excavation can then be removed. Cut and fill mining methods can be used for short hole mining for example in steeply dipping or irregular ore zones, in particular where the hanging wall limits the use of long hole methods. In this method the ore is mined in horizontal or slightly inclined slices, and then filled with waste rock, sand or tailings. Either fill option may be consolidated with concrete, or left unconsolidated. Drift and fill methods are similar to cut and fill techniques, except they may be used in ore zones which are wider. For example, they may include the technique where a first drift is developed in the ore, and is backfilled using consolidated fill. Then a second drift is driven adjacent to the first drift. This carries on until the ore zone is mined out to its full width, at which time this activity is repeated starting atop of the first cut. Shrinkage stoping is a short hole mining method and may find particular suitability for steeply dipping ore zones. This method is similar to, or may be viewed as a variant of, cut and fill mining with the exception that after being blasted, broken ore is left in the stope where it is used to support the surrounding rock and as a platform from which to work. Generally, only enough ore is removed from the stope to allow for drilling and blasting the next slice. The stope is emptied when all of the ore has been blasted. Room and pillar mining is typically done in flat or gently dipping bedded ore bodies. Pillars are left in place in a regular pattern while the rooms are mined out. At some point the pillars may also be taken out starting at the farthest point from the access, allowing the roof to collapse and fill in the stope; allowing for increased ore recovery by not leaving any ore behind in the pillars.

Undergrounds mines can be very deep. For example, it is reported that the TauTona and Savuka gold mines in South Africa are at depths exceeding 12,000 feet, and it is believed that mines will extend to depths of 14,000 feet, 15,000 feet and greater. Other mines may be at least about 5,000 feet, at least about 7,000 feet and at least about 10,000 feet in depth.

At these depths the need for, and difficulties in providing electric power and the cables needed to provide such power can be considerable.

Tunneling Activities and Equipment

Tunneling generally relates to the creation of underground passages. Tunnels may be used for roads, rail roads, coal or mineral transportation by for example conveyor systems, for placing communication and power lines, as aqueducts to supply water for consumption or irrigation, as aqueducts for to supply water for hydroelectric stations, and as sewers. Tunnels can be bored or dug in any type of materials varying from soft clay to harder rock. The method of tunnel construction may depend on varied factors such as the ground conditions, the ground water conditions, the length and diameter of the tunnel, the depth of the tunnel, the logistics of supporting the tunnel excavation, the final use, and shape of the tunnel. Examples of the types of tunnel construction would include: cut and cover tunnels, constructed in a shallow trench and then covered over, bored tunnels, constructed in situ, without removing the ground above, which in general may be of circular or horseshoe cross-section; and immersed tube tunnels which would include those that are sunk into a body of water and sit on, or are buried just under, the sea floor of the body of water.

Generally, larger tunnels may be constructed using a tunnel boring machine. These machines can be massive, having diameter of 15 feet, 20 feet, 25 feet or more, and complex having the ability to advance the tunnel face forward while simultaneously placing supports within the tunnel. An example of these large machines were the tunnel boring machines used to dig the "Chunnel" between England and France under the English Channel.

Quarrying Activities and Equipment

Quarrying is a type of surface mining, although quarrying activities can occur underground, that is generally associated with the removal of building and decorative materials such as granite, marble, slate, limestone, sandstone, as well as other types of materials such as aggregate, riprap, sand and gravel. In may applications it is desirable to remove large slaps, or blocks, of such materials for use in building and decorative applications, such as for us on the facade of a building, for a sculpture, or to make counter tops or flooring. In additional to the use of explosives to remove slabs and blocks of the desired materials, large saws are used to cut and section the materials into the desired size.

Road and Infrastructure Repair Activities and Equipment

The repair and replacement of roadways, as well as the repair and replacement of various types of infrastructure, such as steam tunnels, communication tunnels, water lines, electric lines, etc., requires the use of at times large, and very large, and noisy equipment. This equipment and activities can also cause substantial vibrations and potential damage to surrounding structures. This equipment is needed, for example to remove the surface of a roadway so that a new surface could be placed on and bonded to the underlying road, remove the road surface and upper layers of the road bed to all a new road to be built, remove decking from bridges to allow for replacement decking and roadways, remove a highway ramp or bridge structure all together to allow for a new or replacement structure, and to cut holes in existing streets, building or walkways to gain access to other types of infrastructure to among other things repair, replace or enhances that infrastructure. Many times, especially in urban areas, because of the associated noise and vibrations from the use of this equipment the activities have to take place during daylight or business hours when traffic is most heavy. Thus, resulting in the in ability, because of the noise and vibrations, to perform the work in off hours, late in the night when traffic disruption would be at it minimal.

Summary

The equipment and methods for mining, tunneling, earth moving and repairing infrastructure, have generally involved, dangerous, noisy, high vibration and imprecise equipment and activities, requiring for example the use of explosives or large powerful mechanical cutting and digging machines. Thus, there has been a long standing need need for the controlled, precise and predetermined delivery of high power directed energy, such as in the form of a high power laser beam over distances to assist, enhance and improve the equipment and operations in these fields. The present inventions, among other things, solve these and other needs by providing the articles of manufacture, devices and processes using precise and predetermined high power energy deliver tools as a part of mining, tunneling, earth removing and infrastructure repair equipment and operations.

Thus, there is provided a method of volumetric removal of material from a target using high power directed energy and mechanical energy, including: applying high power directed energy having a power sufficient to penetrate the material in a predetermined three dimensional pattern, corresponding to a predetermined volumetric shape; removing the material along the three dimensional pattern; weakening material adjacent to the pattern, thereby creating directed energy affected areas of the material; the directed energy affected areas substantially occupying the predetermined volumetric shape; and, removing the material from the predetermined volumetric shape with a means to provide a force.

Moreover, there is provided a method of mining a material from a target using high power directed energy and mechanical energy, including: applying high power directed energy having a power sufficient to penetrate the material in a predetermined three dimensional pattern, corresponding to a predetermined volumetric shape; removing the material along the three dimensional pattern; weakening material adjacent to the pattern, thereby creating directed energy affected areas of the material; the directed energy affected areas substantially occupying the predetermined volumetric shape; and, removing the material from the predetermined volumetric shape with a means to provide a force.

There is further provided the methods and apparatus having one or more of the following features, including: wherein the three dimensional pattern comprises a line; wherein the line forms a spiral; wherein the three dimensional pattern has a length, a width and a depth, and the depth is at least about 10 feet; wherein the three dimensional pattern comprises a plurality of lines; wherein at least two of the plurality of lines is interconnected; wherein the volumetric shape corresponds to a mineral deposit; wherein the depth of penetration is self-limiting; wherein the volumetric shape is a cube; wherein the volumetric shape is a cylinder; wherein the directed energy is a high power laser beam having at least about 10 kW of power; wherein the directed energy is a high power laser beam having at least about 40 kW of power; wherein the directed energy is a high power laser beam having at least about 20 kW of power; wherein the directed energy is a high power laser beam having at least about 5 kW of power; wherein the means to provide a force is a rotating mechanical cutter; wherein the means to provide a force is a mechanical cutter; wherein the means to provide a force is gravity; wherein the means to provide a force is a conveyor; wherein the means to provide a force is a rotating mechanical cutter; wherein the means to provide a force is gravity; wherein the means to provide a force is an explosive; and wherein the target is the earth in an underground mine;

Still further, there is provided a method of mining using the shaped volumetric removal of earth from a mine using high power laser mechanical equipment, the method having: directing a high power laser beam having a power sufficient to penetrate the earth in a predetermined three dimensional pattern, corresponding to a predetermined volumetric shape; removing the earth along the three dimensional pattern; creating laser affected areas of earth adjacent to the pattern; the laser affected areas substantially filling the predetermined volumetric shape; and, removing the earth from the predetermined volumetric shape with a mechanical means.

There is further provided the methods and apparatus having one or more of the following features, including: wherein the laser beam is a CW beam; wherein the laser beam is a pulsed beam; wherein the power is at least about 10 kW; and, wherein the power is at least about 20 kW; wherein the laser source has a power of at least about 40 kW; and wherein the laser source has a power of at least about 50 kW.

Yet still further, there is provide a method of mining using the shaped volumetric removal of earth from a mine using high power laser mechanical equipment, including: directing a high power laser beam in an essentially vertical direction having a power sufficient to penetrate the earth in a predetermined three dimensional pattern; removing the earth along the three dimensional pattern; creating laser affected areas of earth adjacent to the pattern; and, permitting the earth to fall downward and collecting and removing the fallen earth.

Additionally there is provided the methods and apparatus having one or more of the following features, including: wherein the laser beam is applied from a high power laser cutting tool positioned at a stand off distance from a surface of the material; wherein the stand off distance is at least about 3 ft; wherein the stand off distance is at least about 10 ft; wherein the laser beam is applied from a high power laser cutting tool positioned at a stand off distance from a surface of the material; the laser beam has a spot size and spot shape along the laser beam, and a waist having a focal point and a distal end and a proximal end defining a waist length therebetween; wherein the spot size of the beam waist is less than about 2.5 $cm^2$; wherein the spot size of the beam waist is less than about 2.5 $cm^2$, and the waist length is at least about 2 ft; wherein the spot size of the beam waist is less than about 2.5 $cm^2$, the waist length is at least about 2 ft, and the stand off distance is at least about 3 ft; wherein the spot size area at the beam waist is less than about 2.5 $cm^2$, the waist length is at least about 2 ft, the stand off distance is at least about 3 ft, and the proximal end of the beam waist is at the surface of the material; wherein the laser beam is applied from a high power laser cutting tool positioned at a stand off distance from a surface of the material; the laser beam has a spot size and spot shape along the laser beam, and a waist having a focal point and a distal end and a proximal end defining a waist length therebetween; wherein the spot size of the beam waist is less than about 2.5 $cm^2$; wherein the spot size of the beam waist is less than about 2.5 $cm^2$, and the waist length is at least about 2 ft; wherein the spot size of the beam waist is less than about 2.0 $cm^2$, the waist length is at least about 4 ft, and the stand off distance is at least about 10 ft; wherein the laser beam is directed at a beam angle of at least about 5°; wherein the laser beam is directed at a beam angle of at least about 10°; wherein the laser beam is directed at a beam angle of at least about 25°; and, wherein the laser beam is directed at a beam angle of at least about 170°.

Moreover there is provided a high power laser laser mechanical earth removing machine, having: a source of high power laser energy, a source of a fluid, and an optics package; the optics package comprising a cooling means, and an optics assembly; the optics assembly configured to provide a laser beam from the tool, the beam having a focal length, a spot size, a spot shape, and a waist having a focal point and a distal end and a proximal end defining a waist length therebetween; and, a means for mechanically removing laser effected earth.

There is further provided the methods and apparatus having one or more of the following features, including: wherein the spot size of the beam waist is less than about 2.5 $cm^2$; wherein the spot size of the beam waist is less than about 2.5 $cm^2$, and the waist length is at least about 2 ft; and, wherein the spot size of the beam waist is less than about 2.5 $cm^2$, the waist length is at least about 2 ft; whereby the tool has a stand off distance of at least about 3 ft.

Still further there is provided a method of removing material using high power laser mechanical equipment, the method including: directing a high power laser beam having a power of at least about 1 kW and a beam angle of greater than about 2° toward a surface of a material; the laser beam creating a hole in the material having a bottom comprising molten material; and, advancing the hole by flowing the molten material back towards the laser beam, thereby exposing solid material for the laser beam to melt.

Still additionally, there is further provided the methods and apparatus having one or more of the following features, including: wherein the laser beam is directed at a beam angle of at least about 5°; wherein the laser beam is directed at a beam angle of at least about 10°; wherein the laser beam is directed at a beam angle of at least about 15°; wherein the laser beam is directed at a beam angle of at least about 25°; and, wherein the laser beam is directed at a beam angle of at least about 80°.

Yet further there is provided a method of removing material using high power laser energy, by: directing a high power laser beam having a power of at least about 1 kW toward a surface of a material; the laser beam creating a hole in the material having a bottom comprising molten material; and, advancing the hole by flowing the molten material back towards the laser beam, thereby exposing solid material for the laser beam to melt.

Moreover, there is further provided the methods and apparatus having one or more of the following features, including: wherein the earth removing machine is a laser mechanical tunneling machine; wherein the earth removing machine is a laser mechanical boring machine; wherein the earth removing machine is a laser mechanical road resurfacing machine; wherein the earth removing machine comprises a movable cutting assembly; wherein the earth removing machine is a laser mechanical continuous miner; wherein the earth removing machine is a laser mechanical shear plow; and, wherein the earth removing machine comprises a long wall mining system.

Yet moreover there is provided a laser roof shield assembly having: a laser cutting tool capable of delivering a laser beam characterized by a spot size having a diameter of 2 cm or less and a power of at least about 10 kW.

Moreover there is provided a laser tunneling machine, having: three laser cutting tools, each tool capable of generating at least about a 10 kW laser beam having a spot size having a diameter of 3 cm or less; a tunneling housing laser assembly having a plurality of cutting members having a plurality of cutters.

Still further there is further provided the methods and apparatus having one or more of the following features, including: wherein the laser tunneling machine is characterized as a Class I product; wherein the laser earth removal machine is characterized as a Class I product; wherein the laser mining machine is characterized as a Class I product; wherein the laser road resurfacing machine is a Class I product; wherein the laser tunneling machine is characterized as a Class II product; wherein the laser earth removal machine is characterized as a Class II product; wherein the laser mining machine is characterized as a Class II product; wherein the laser road resurfacing machine is a Class II product; wherein the laser tunneling machine is characterized as a Class IIa product; wherein the laser earth removal machine is characterized as a Class IIa product; wherein the laser mining machine is characterized as a Class IIa product; wherein the laser road resurfacing machine is a Class IIa product; wherein the laser tunneling machine is characterized as a Class IIIa product; wherein the laser earth removal machine is characterized as a Class IIIa product; wherein the laser mining machine is characterized as a Class IIIa product; wherein the laser road resurfacing machine is a Class IIIa product; wherein the laser tunneling machine is characterized as a Class IIIb product; wherein the laser earth removal machine is characterized as a Class IIIb product; wherein the laser mining machine is characterized as a Class IIIb product; and, wherein the laser road resurfacing machine is a Class IIIb product.

Still further there is provided a laser road machine, having: a laser cutter capable of generating at least about a 10 kW laser beam having a predetermined self-limiting beam characterization and a laser beam shield.

Additionally there is provided a laser mechanical earth removing machine, having: a movable cutting assembly, the cutting assembly having a laser cutter capable of generating at least about a 10 kW laser beam having a spot size of less than about 3 cm diameter, a rotating mechanical cutting roller, the roller having a cutting wheel, the laser cutter providing a beam path cooperatively positioned with the cutting wheel.

Yet further there is provided a laser mechanical continuous mining machine, having: a rotating head having a cutting wheel; an adjustment means whereby the position of the rotating head is adjusted; an inlet chute for receiving a laser affected ore; and outlet chute for discharging a laser affected ore; a laser cutting assembly; a laser support bar, whereby the laser cutting assembly is affixed to the mining machine; and a high power laser cable in optical communication with the laser cutting assembly.

Additionally there is provided a laser mining system, the system comprising a high power laser truck, a laser robot, the laser robot having a means for directing a laser beam in a substantially vertical direction.

Still further there is further provided high power laser systems and methods having 1 kW, 10 kW, 20 kW, 40 kW or more laser energy and one or more of the following features, including: wherein the system is characterized as a Class I product; wherein the system is characterized as a Class II product; wherein the system is characterized as a Class IIa product; wherein the system is characterized as a Class IIIa product; and wherein the system is characterized as a Class IIIb product.

BRIEF DESCRIPTION OF THE DRAWINGS

FIG. 18 is a cross sectional view of an embodiment of an optics assembly and laser beam ray trace pattern in accordance with the present inventions.

FIGS. 18A, & 18B are tables providing embodiment of an optics assembly of FIG. 18 in accordance with the present invention.

DESCRIPTION OF THE PREFERRED EMBODIMENTS

In general, the present inventions relate to the delivery of high power laser beams over a distance to assist in performing a laser operation on the work surface. These distances, e.g., the stand off distance, may be greater, and may be substantially larger than typically occurs, or is obtainable, in laser cutting operations. Further, and preferably, the present inventions provide the ability to perform these distant cuts without the need for, with a minimum need for, or with a reduced need for a fluid jet to remove the laser effected material, e.g., dross, slag, or molten material, created by the laser operation. Thus, among other things, the longer stand off distances, alone or in conjunction with, minimizing the need for mechanical cleaning of the cut, e.g., fluid jet, provides the ability to perform laser operations in the field, including in hostile and remote locations, such as, a quarry, a tunnel, a pit, a mine, a well bore, or a nuclear reactor. The laser operations may include, for example, treating, fracturing, tunneling, weakening, melting, ablating, spalling, vaporizing, cooking, charring, welding, heating, annealing, cutting, removing, drilling, penetrating, perforating and combinations and various of these.

Figure 1:
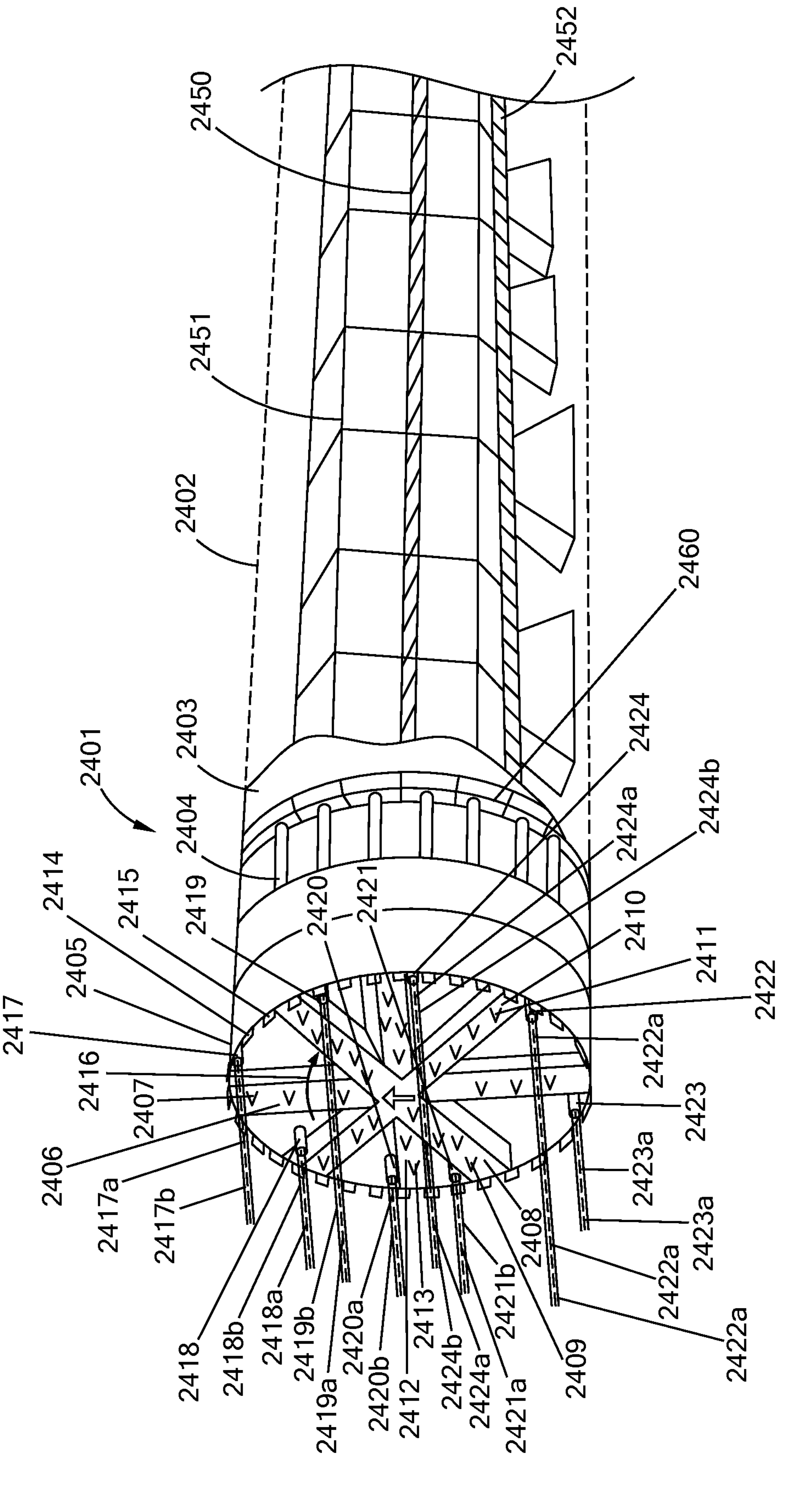
FIG. 1 is a perspective view of an embodiment of a laser mechanical tunneling machine in accordance with the present invention.

Turing to FIG. 1 there is provided an embodiment of a laser mechanical tunneling machine. The laser mechanical tunneling machine 2401 is shown positioned within a tunnel 2402, which is shown by dashed lines as the outer wall of the tunnel has been removed for the purpose of showing the machine within the tunnel. The outer wall of the tunnel is formed by concrete tunnel wall segments 2403. These wall segments are carried forward from support areas behind the machine 2401 by conveyor system 2452. The concrete section 2403 are positioned and fixed along the inside of the tunnel to create a strong and secure tunnel lining.

The laser mechanical tunneling machine has a series of rams 2404 that have shoes 2460, which are adjacent to, and engage the wall segments 2403. Thus, the machine 2401 is driven forward, and driven into engagement with the face of the tunnel, by the rams 2404 pushing against the tunnel wall segments 2403.

Forward, distally to the rams 2404, is the tunneling housing laser assembly 2405. This assembly has a transverse cutting member 2406 that has several, e.g., 2, 4, 10, 20 or more cutters, e.g., 2407 positioned on it for engagement with the face of the tunnel. The assembly has additional transverse cutting members 2408, 2410, 2412, that have their respective cutters, e.g., 2409, 2410, 2411, 2413. Thus, in this embodiment the tunneling housing laser assembly has 4 transverse cutting members. Two of the cutting members 2408 and 2410 are positioned in a cross or X fashion with the center of the X being on the axis of rotation for the housing 2405. The other two cutting member 2406 and 2412 are positioned in a cross or X fashion with the center of the X being on the axis of rotation for the housing 2405. The X 2408-2410 is positioned distally with respect to the X 2406-2412, (i.e., X 2408-2410 is in front of X 2406-2412 and thus close to and first to engage the face of the tunnel). In being understood that other types, configurations, and numbers of cutting members may be used.

There are also provided a circular kerf cutting member 2414 that has several, e.g., 2, 4, 10, 20 or more cutters, e.g., 2415 positioned on it for engagement with the face of the tunnel. The tunneling housing laser assembly 2405 rotates in the direction as shown by arrow 2416. Thus, when rotated, the kerf cutters cut essentially along the circumference of the face of the tunnel, e.g., they cut continuously adjacent to essentially the outer surface of the tunnel. The other cutting members rotate around engaging the inner portions of the wall face. Force is applied to engage these cutters against the wall face and cut the face, removing material, by the rams 2404 pushing the the shoes 2406 against the wall segments 2403 and thus driving the tunneling laser housing assembly 2405 forward.

In this embodiment laser cutting tools 2417, 2418, 2419, 2420, 2421, 2422, 2423 and 2124 are associated with the tunneling housing laser assembly 2405. Preferably the laser tools are located with the housing proximal to one or both of the X configurations of cutting members. In this manner the laser tools are removed from and the face of the tunnel and protected from damage and debris. Each of the laser cutting tools is located a head of a respective cutting member, which enable the cutting member to in essence follow the laser beam. Each laser tool respectively delivers a high power laser beam 2417*b*, 2418*b*, 2419*b*, 2420*b*, 2421*b*, 2422*b*, 2423*b* and 2124*b*, that has predetermined laser beam properties, along a respective laser beam path 2417_a_, 2418_a_, 2419_a_, 2420_a_, 2421_a_, 2422_a_, 2423_a_ and 2124_a_ that are aimed at a predetermined location on the face of the rock wall relative to the cutting members and cutters.

More or less laser cutting tools may be used. The sources of the laser beams may be located in the tunneling housing laser assembly 2405, in which case they will rotate with the housing, or they may be located in the frame 2451 of the machine 2401 at, near, or far removed from the housing 2405. Each laser beam may have a power of at least about 5 kW, at least about 10 kW, at least about 20 kW and at least about 50 kW or more. Each laser beam may have the same or different laser beam properties. The beam paths may be relatively aimed at the same or different relative locations. The laser tools may be positioned at different locations along and in the housing 2405. If high power long distance optical fibers are used or needed, one, two, three, four or more fibers may be used or contained in a single umbilical or each may be in its own separate cable structure.

Additionally, associated with the frame is a conveyor system 2450 for removing the laser effect and other debris, e.g., waste, form the tunneling activity. There are also provided movement and advancement supports, e.g., 2453, that provide for the movement, e.g., follow of the frame behind the housing 2405 as it advances forward. This embodiment of the tunnel boring machine is large, having a diameter of at about 25 feet. Other size diameters may be used from about 5 feet to about 25 feet, greater than about 10 feet, greater than about 15 feet, and greater than about 30 feet.

Figure 2:
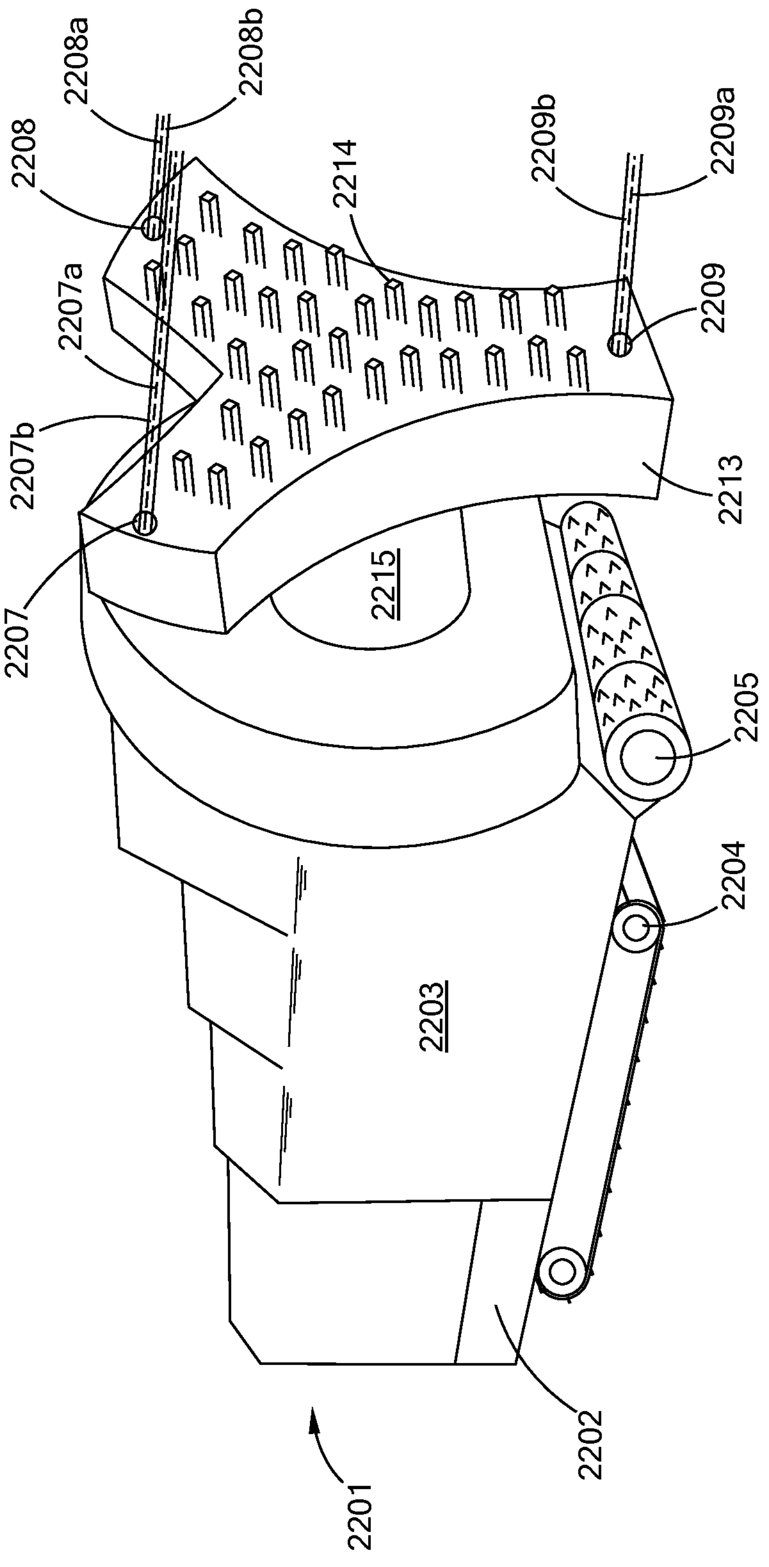
FIG. 2 is a perspective view of an embodiment of a laser tunneling apparatus in accordance with the present invention.

Turning to FIG. 2 there is provided a perspective view of an embodiment of laser mechanical tunneling apparatus. The laser mechanical tunneling apparatus 2201 has a body 2202 having a laser housing 2203 that contains a high power laser source (not shown in the figure). The high power laser source may also be remotely located from the apparatus 2201 and optically connected to the apparatus 2201 by way of a high power long distance optical cable. The apparatus 2201 has a track assembly 2204 for moving and positioning the apparatus 2201. The apparatus has a roller wheel 2205 that feeds an internal conveyor system for removing the cuttings and waste from boring the tunnel. The apparatus has a shaft 2215. This shaft is rotated to rotate the laser mechanical cutting assembly 2213, the shaft 2215 may also be advance forward, e.g., extended from the apparatus, to drive or force the cutting assembly 2213 into the face of the tunnel.

Thus, the apparatus 2201 can be positioned, and locked in place either with a mechanical device or with a braking system, then the shaft 2215 is rotated and extended to it reaches its maximum length, which would the maximum amount of distance that can be bored from that particular position of the apparatus. The apparatus 2201 would then be moved forward and the process repeated. Because the laser energy weakens and fractures the rock less mechanical force is need to cut and remove it. Thus, rather than, or in conjunction with, this start and stop process, the boring process can be continuous with the apparatus 2201 being driven forward by the track assembly 2204; and the extension of the shaft 2215 being used for finer, or secondary, force control.

The laser mechanical cutting assembly 2213 has three laser tools contained inside. Distal opening 2207 for a laser tool has a laser beam path 2207_a_ and a laser beam 2207_b_. Distal opening 2208 for a laser tool has a laser beam path 2208_a_ and a laser beam 2208_b_. Distal opening 2209 for a laser tool has a laser beam path 2209_a_ and 2209_b_. The laser mechanical cutting assembly 2213 has mechanical cutters, e.g., 2214 associated with the face, or distal end of the assembly.

Each laser tool respectively delivers a high power laser beam that has predetermined laser beam properties, along a respective laser beam path that are aimed at a predetermined location on the face of the rock wall relative to the cutting members and cutters. More or less laser tools may be used. Each laser beam may have a power of at least about 5 kW, at least about 10 kW, at least about 20 kW and at least about 50 kW or more. Each laser beam may have the same or different laser beam properties. The beam paths may be relatively aimed at the same or different relative locations. The laser tools may be positioned at different locations along and in the laser mechanical cutting assembly. The embodiment of FIG. 2 may for example have the capability to cut a tunnel having at least a 5 foot diameter, at least a 10 foot diameter, and at least a 15 foot diameter.

Figure 3:
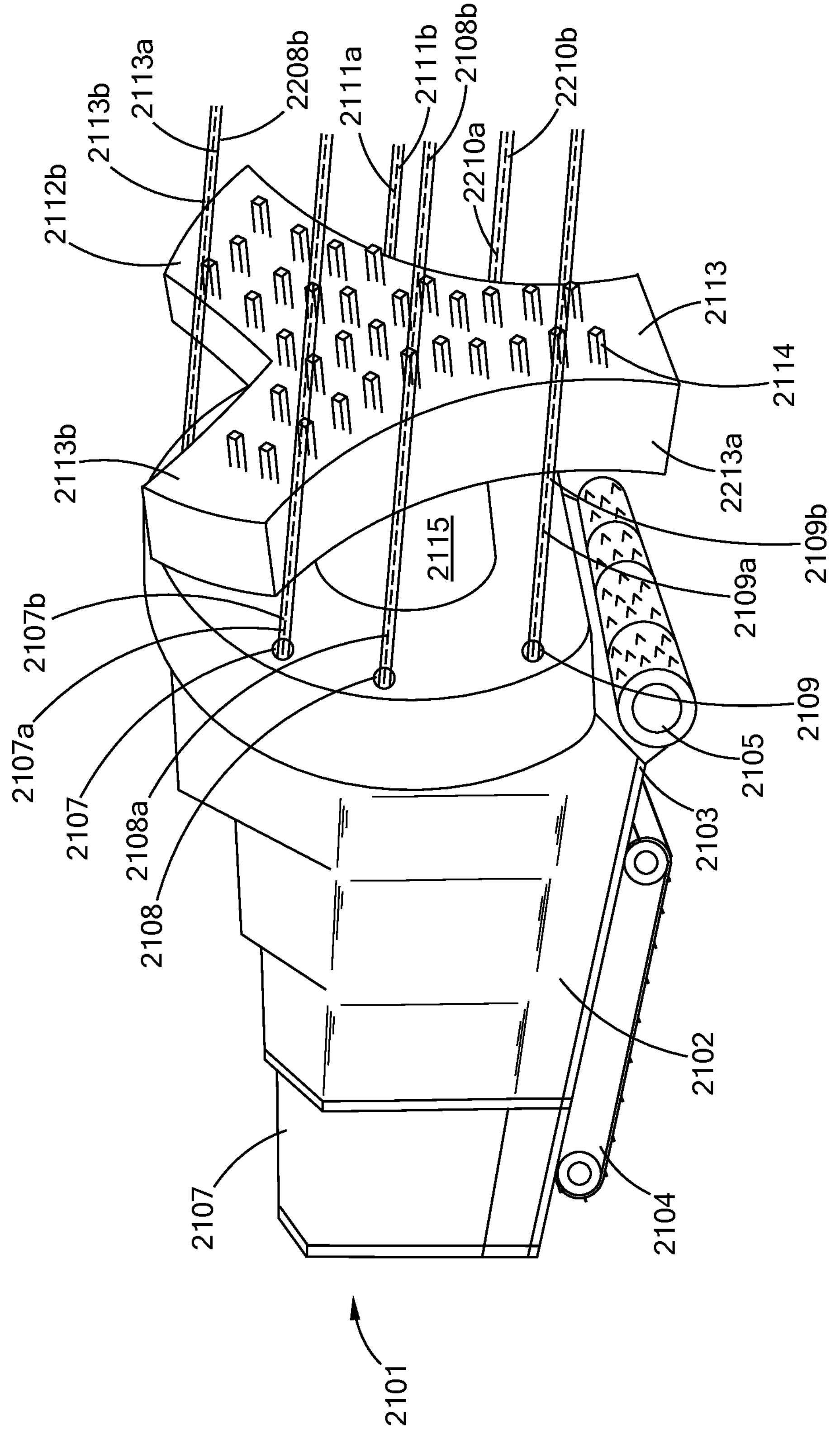
FIG. 3 is a perspective view of an embodiment of a laser tunneling machine in accordance with the present invention.

Turning to FIG. 3 there is provided a perspective view of an embodiment of laser mechanical tunneling apparatus. The laser mechanical tunneling apparatus 2101 has a body 2102, a frame 2103, and a laser housing 2107 that contains a high power laser source (not shown in the figure). The high power laser source may also be remotely located from the apparatus 2101 and optically connected to the apparatus 2101 by way of a high power long distance optical cable. The apparatus 2101 has a track assembly 2104 for moving and positioning the apparatus 2101. The apparatus has a roller wheel 2105 that feeds an internal conveyor system for removing the cuttings and waste from boring the tunnel. The apparatus has a shaft 2115. This shaft is rotated to rotate the mechanical cutting assembly 2213, the shaft 2115 may also be advance forward, e.g., extended from the apparatus, to drive or force the cutting assembly 2113 into the face of the tunnel.

The laser tool laser support housing 2106 contains six laser tools contained inside. Distal opening 2107 for a laser tool has a laser beam path 2107_a_ and a laser beam 2107_b_. Distal opening 2108 for a laser tool has a laser beam path 2108_a_ and a laser beam 2108_b_. Distal opening 2109 for a laser tool has a laser beam path 2109_a_ and 2109_b_. Distal opening 2210 for a laser tool has a laser beam path 2110_a_ and 2110_b_. Distal opening 2111 for a laser tool has a laser beam path 2111_a_ and 2111_b_. Distal opening 2112 for a laser tool has a laser beam path 2112_a_ and 2112_b_. In the embodiment the laser tools do rotate. The mechanical cutting assembly 2113 has mechanical cutters, e.g., 2114 associated with the face, or distal end of the assembly. The mechanical cutting assembly 2113 has three arms 2113_a_, 2113_b_ and 2113_c_. The placement of the laser tools, beam paths and firing sequence of the laser tools, relative to the arms of the assembly 2113 should be such so that the laser beams do not strike the arms. Thus, the laser tools can be fired when the arms are not rotating and the beam paths are clear of the arms as shown in FIG. 3. In this manner, as provided subsequently in greater detail, the the laser beams can be used to cut, fracture and penetrate deep into the rock to be cut along the outer outline, wall of the tunnel, in effect pre-kerf the tunnel along the tunnel wall for the application of the mechanical cutters which then more easily remove the material to for the tunnel. The beam paths, or additional laser tools and beam paths may be positioned outside of the arm enabling the laser traveling along those beam paths to be fired while the arms are rotation. Further the laser tool firing could be timed such that the laser did not fire when an arm was in its beam path.

Thus, the apparatus 2101 can be positioned, and locked in place either with mechanical device or with a braking system, then the shaft 2215 is rotated and extended to it reaches its maximum length, which would the the maximum amount of distance that can be bored from that particular position of the apparatus. The apparatus 2101 would then be moved forward and the process repeated. Because the laser energy weakens and fractures the rock less mechanical force is need to cut and remove it, the mechanical boring part of this laser mechanical process can be continuous until all of the laser effected rock is removed, at which point the laser can be fired again.

Figure 4:
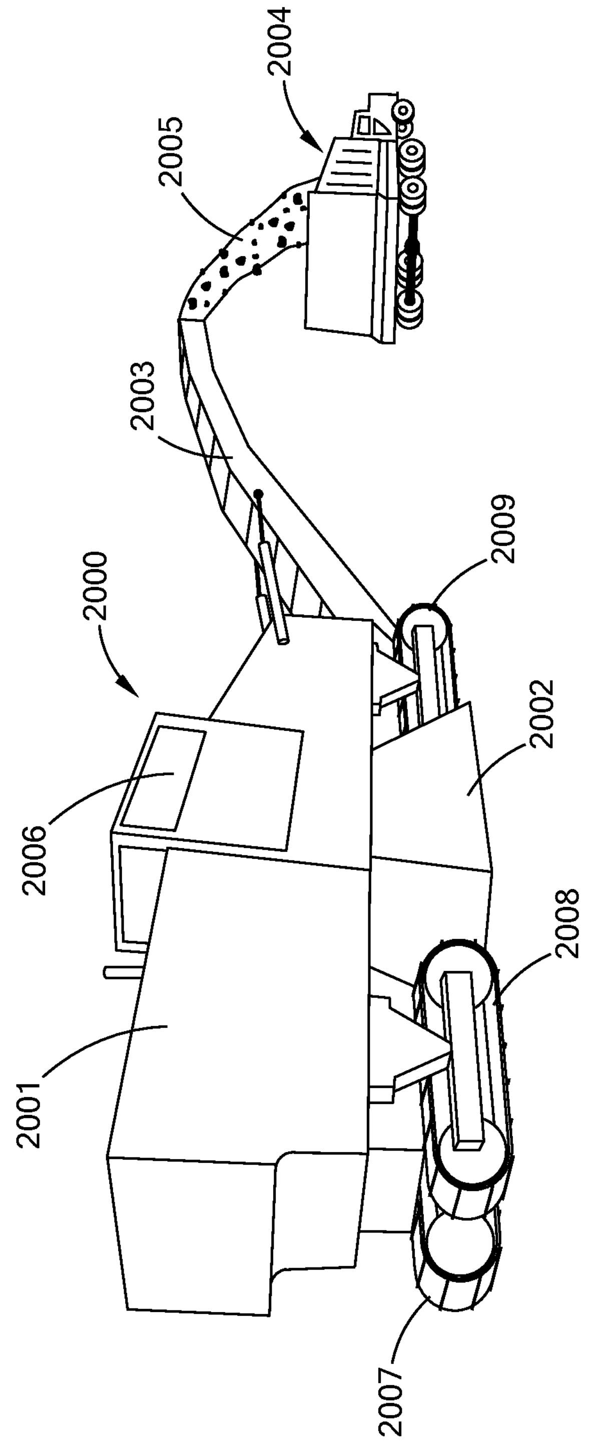
FIG. 4 is a perspective view of an embodiment of a laser road equipment in accordance with the present invention.

Turning to FIG. 4 there is provided a prospective view of an embodiment of a laser-mechanical road resurfacing apparatus in operation. The laser road surfacing machine 2000 has a laser housing 2001 that contains a high power laser, a laser beam path shield 2002, a conveyor chute 2003, for transporting and removing laser affected road material 2005 to a truck 2004. The cab 2006 has controls for operating the laser, laser tools and other equipment of the machine 2000. There are provided four track assemblies, of which 2007, 2008 and 2009 are seen in the view of the figure. Laser tools are located within the shield 2002. The laser tools provide laser beam paths and laser beams along those paths that are directed toward the road surface. As provided in greater detail subsequently, the laser beam paths and beam properties are predetermined to provide a self-limiting cut depth. The laser beams weaken the road surface material requiring less force to then remove the laser affected material. Additionally, the laser beams may be used to precondition the remaining surface of the road to provided for better bonding when new road surface material is applied to it. Preferably, the laser beam path shield 2002 contains the laser energy sufficiently so that any laser energy escaping the shield 2002 is below the amounts of Table I.

The use of lasers for road and construction related activities, can greatly reduce the amount of noise that is associated with such activities. Thus, the use of lasers, and their associated noise reduction, can provide for the ability to conduct road repairs, or construction activities, in evening hours, in urban areas, and in particular dense urban areas, such as large cities, without annoyance, or with minimal noise nuisance, for personals living or working in near the construction area.

Figure 5:
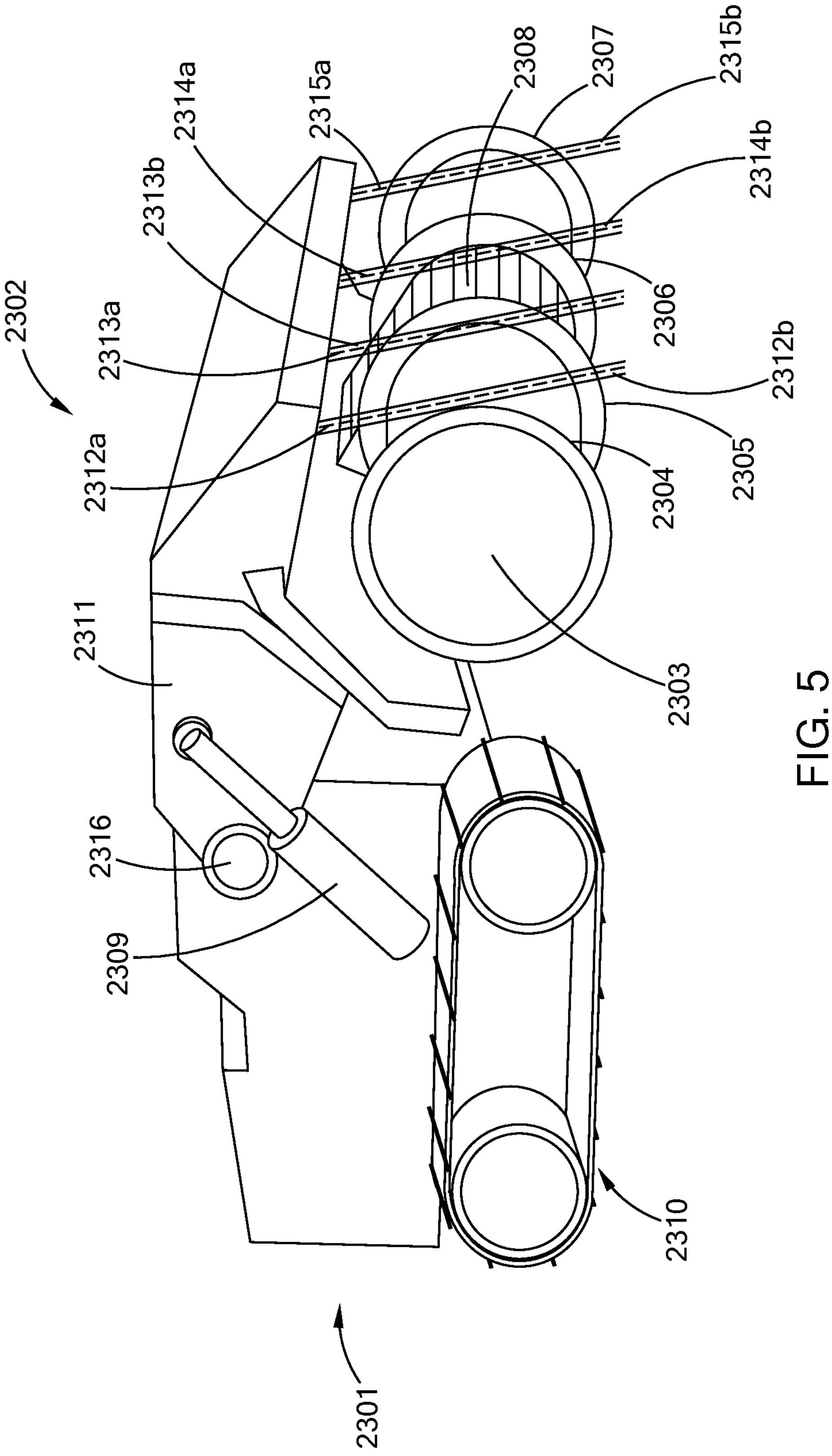
FIG. 5 is a perspective view of an embodiment of a laser mechanical earth removing machine in accordance with the present invention.

Turning to FIG. 5 there is provided an embodiment of a laser mechanical earth removing machine. The laser mechanical earth removing machine 2301 has a movable and positionable cutting assembly 2302. The cutting assembly 2302 has a rotating mechanical cutting roller 2303 that has cutting wheels 2304, 2305, 2306, and 2307 positioned on it and spaced across the length of the roller. An hydraulic lift cylinder assembly 2309 raises and lowers the cutting assembly 2302 about pivoting rotational joint assembly 2316. Thus, the hydraulic cylinder 2309 can position the cutting assembly to engage and cut essentially horizontal earth surfaces, e.g., a horizontal slab of rock, to essentially vertical earth surfaces, e.g., the face of a quarry wall.

The cutting assembly 2302 has a hood assembly 2311. Within the hood assembly 2311 are four laser cutting tools, corresponding to the four cutting wheels 2304, 2305, 2306, 2307. Each laser cutting tool has a laser beam path 2312*a*, 2313*a*, 2314*a* and 2315*a* and is capable of firing a laser beam 2312*b*, 2313*b*, 2314*b*, 2315*b* along its respective laser beam path. The laser beam paths are positioned to correspond with the cutting wheels, with out damaging them. In this manner as the hood assembly 2311 is positioned the laser beam paths will also be positioned, and similarly as the cutting assembly, roller and wheels are positioned so will the beam paths be positioned. Thus, provided for one positioning means, e.g., the hydraulic cylinder assembly 2309, to position both the mechanical cutters and the laser beam paths.

Figure 6:
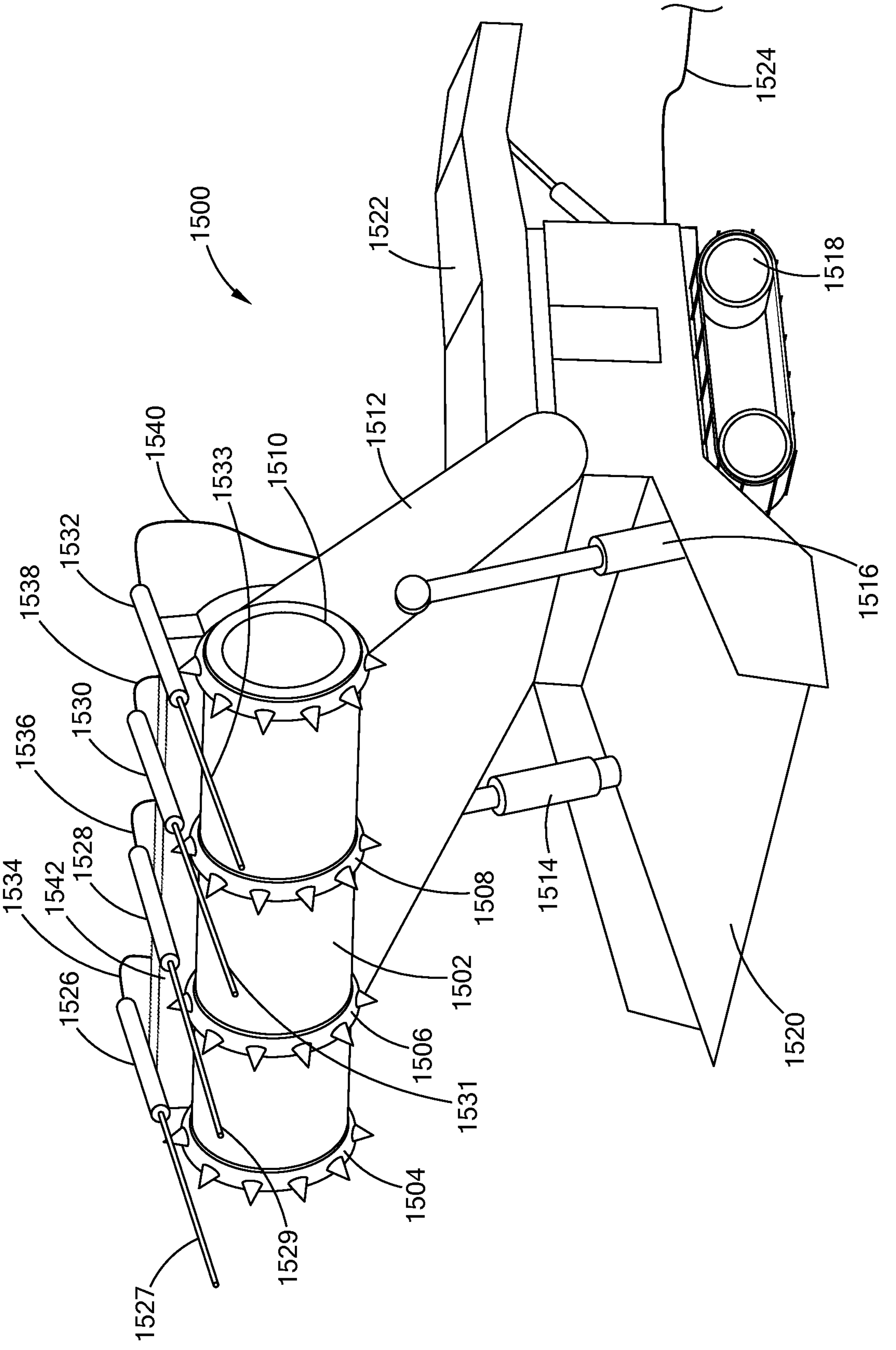
FIG. 6 is a perspective view of an embodiment of a laser mechanical continuous miner in accordance with the present invention.

Turning to FIG. 6 there is provided an embodiment of a laser continuous mining machine. Laser continuous miners may be used for example in underground room and pillar mining. The laser continuous miner 1500 has a rotating head 1502, that is positionable by adjustment arm 1512 and hydraulic cylinders 1516, 1518. The rotating head 1502 has cutting wheels 1504, 1506, 1508, 1510 positioned along the width of the head. The cutting wheels may have various types of cutters. The miner 1500 has track assemblies 1518 for moving, advancing and positioning the miner 1500. A collection chute 1520, which may have a conveyor means or collecting arms, pulls in the laser affected and laser mechanically removed ore, desired material, or removed material and moves it through the miner 1500 to the discharge chute 1522 where it is sent for further transport, shipping or storage. A high power laser cable 1524 is provided and provides optical communication to a source of high power laser beam(s). Mounted slightly behind the rotating head 1502 is the laser cutter support bar 1542. Attached to the laser cutter support bar are four laser cutting tools 1526 (providing laser beam 1527 along a beam path), 1528 (providing laser beam 1529 along a beam path), 1530 (providing laser beam 1531 along a beam path), 1532 (providing laser beam 1533 along a beam path). Each laser tool laser beam is configured and positioned to cooperate with, and provide a synergistic effect with, the mechanical cutting wheels. Each laser tool has a high power laser cable 1534, 1536, 1538 and 1540 associated with it. These cables are in optical communication with high power laser cable 1524, which preferably has four optical fibers that provide the laser beams to the laser tools.

Figure 7:
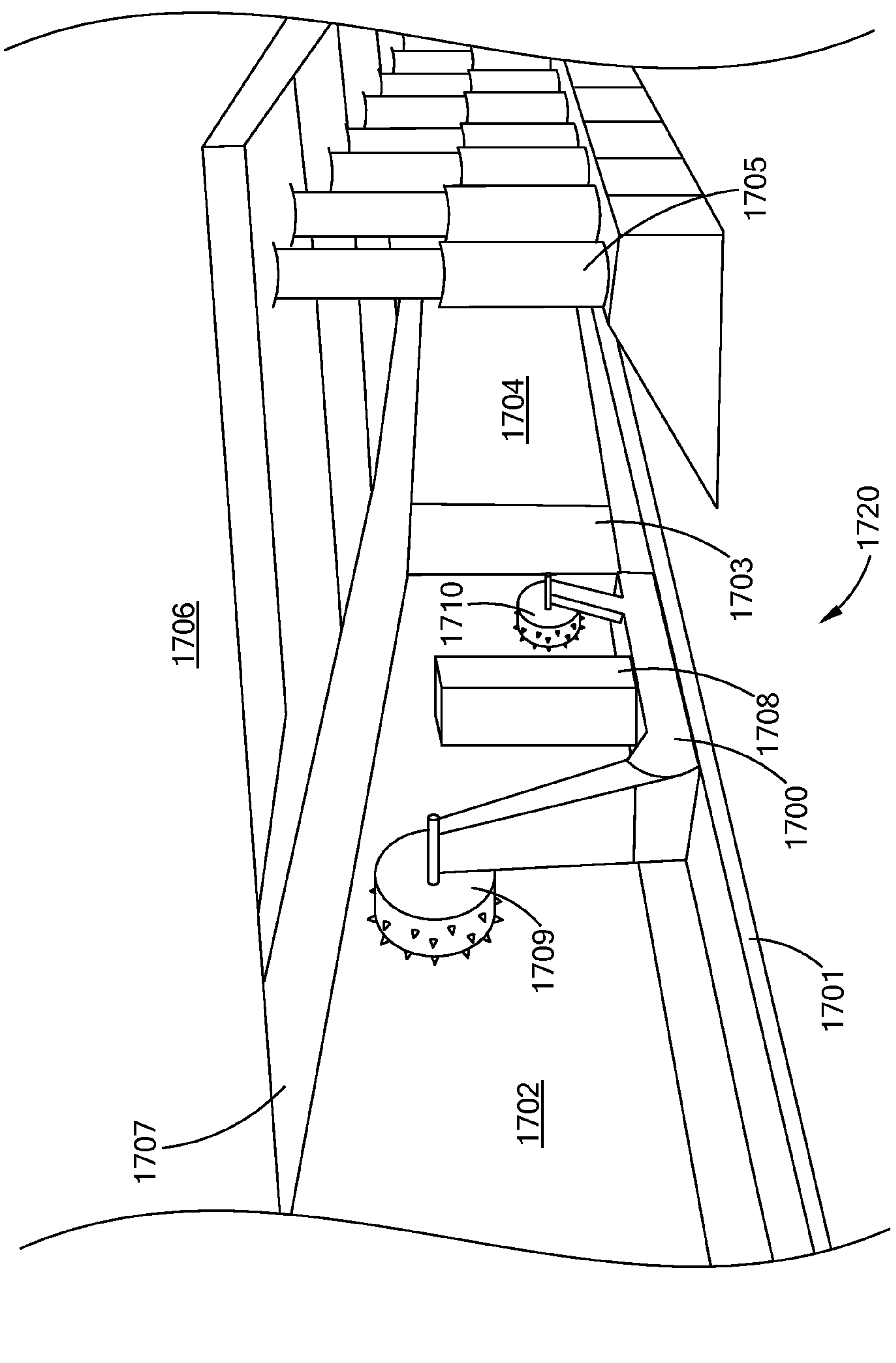
FIG. 7 is a perspective view of an embodiment of a long wall laser mechanical mining system in accordance with the present invention.

Turning to FIG. 7 there is provided a perspective view of a laser mechanical shear plow system in operation performing an underground laser mining operations. The laser mechanical shear plow system 1720 may be used, for example, to perform laser long wall mining operations. The laser mechanical shear plow 1700 is shown on a track conveyor 1701. The laser mechanical shear plow 1700 is located in a shaft or opening in formation 1706. This opening has series of plow shields, e.g., 1705 associated with it. The plow shields 1705 support the roof above the shaft preventing the formation from caving in the opening. Roof section 1707 is freshly exposed by the laser mechanical shear plow, and is not yet been supported by the plow shields 1705. As the laser mechanical shear plow removes more of the material, the size of unsupported roof section grows, to appoint where the plow shields, e.g., 1705 are moved toward rock face, e.g., 1702, 1704 and the newly exposed roof behind the plow shield is permitted to collapse and fill in the opening. In this way the opening follows the rock face as it is mined and advanced.

The track conveyor 1701 guides the laser shear 1700 as it moves along the mining face 1702, moves the laser shear 1700 into engagement with lead mining face 1703, which is advanced as face 1704 is removed by the laser mechanical plow shear 1700. The conveyor 1701 also serves to move the mined (e.g., laser affected removed materials or ores) materials to another location or further transport. The laser mechanical shear plow 1701 has a first cutting tool 1709, which is a wheel with cutters on it, and a second cutting tool 1710, which is a wheel with cutters on it. The plow also has a laser tool housing 1708, which has the high power laser tool. A high power laser, for providing the high power laser beam to the laser tool, may be in the laser tool housing, adjacent the laser tool housing and in its own protective housing, or removed from the opening and put in optical communication with the laser tool by a high a power long distance optical fiber.

Figure 8:
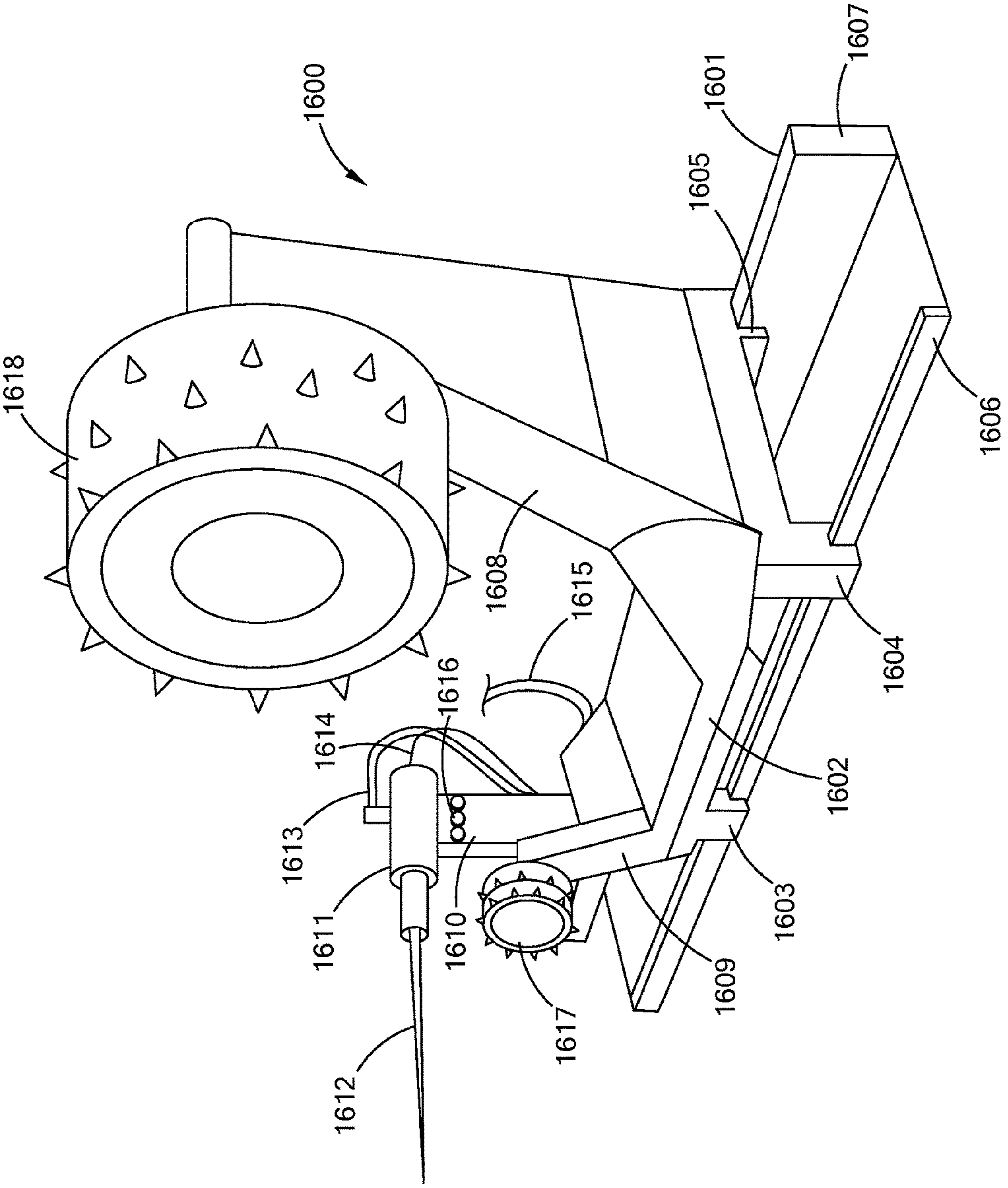
FIG. 8 is a perspective view of an embodiment of a laser sled shear plow in accordance with the present invention.

FIG. 8 is provides a prospective view of an embodiment of a laser sled shear plow 1600 on a section of its haulage conveyor 1601. The haulage conveyor 1601 has rails 1607 (taller rail) and 1608 (shorter rail). The laser sled shear plow 1600 has a base that has four rails guides that engage and move along the rails. In the view of the figure, rail guides 1603 and 1604 are seen engaging rail 1606 and rail guide 1605 is seen engaging rail 1607. Arm 1608 supports and positions cutting wheel 1618 and arm 1609 supports and positions cutting wheel 1617. Laser tool arm 1610 supports a three axis positioning system 1616, which is connected with the laser cutting tool 1611. The laser cutting tool provides a laser beam 1612 along a beam path. A fluid line 1613 provides a fluid, preferably air or nitrogen, to keep the optics path and distal opening of the tool open and free from debris. An optical fiber cable 1614 having an optical fiber is connected to and in optical communication with the laser tool. The optical fiber cable 1614 and the fluid line 1616 are located in, or along the laser arm 1610 and join into the umbilical 1615, which provides fluid and optical communication to the fluid line 1613 and the optical fiber cable 1614.

Figure 9:
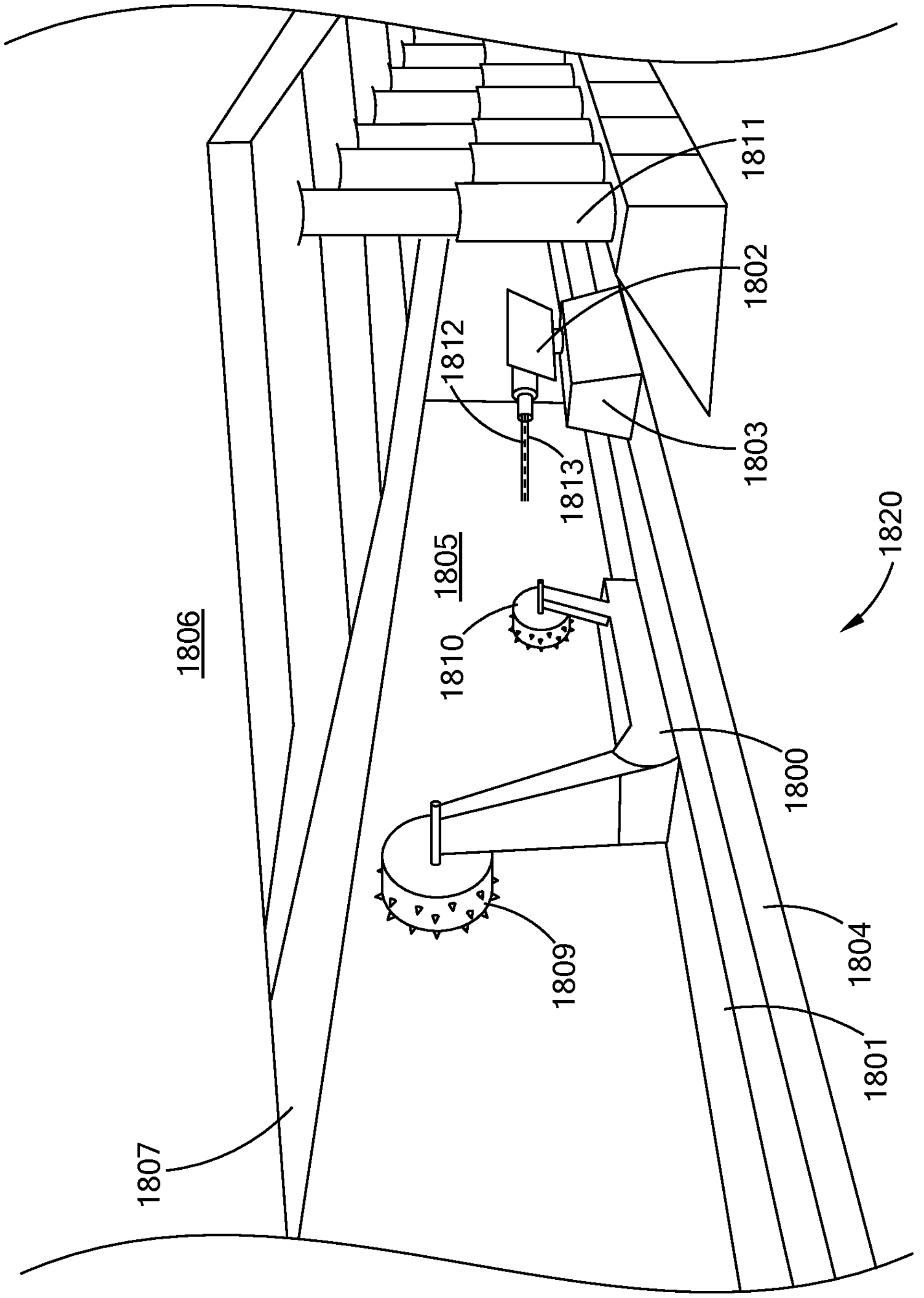
FIG. 9 is perspective view of an embodiment of a long wall laser mechanical mining system in accordance with the present invention.

Turning to FIG. 9 there is provided a perspective view of a laser mechanical shear plow system in operation performing an underground laser mining operations. The laser mechanical shear plow system 1820 may be used, for example, to perform laser long wall mining operations. The mechanical shear plow 1800 is shown on a track conveyor 1801. The mechanical shear plow 1800 is located in a shaft or opening in formation 1806. This opening has series of plow shields, e.g., 1811 associated with it. The plow shields 1811 support the roof above the shaft preventing the formation from caving in the opening. Roof section 1807 is freshly exposed by the laser mechanical operation, and is not yet been supported by the plow shields 1811. As the mechanical shear plow removes more of the laser affected material, the size of unsupported roof section grows, to appoint where the plow shields, e.g., 1811 are moved toward rock face 1805 and the newly exposed roof behind the plow shield is permitted to collapse and fill in the opening. In this way the opening follows the rock face 1805 as it is mined and advanced.

The track conveyor 1801 guides the mechanical shear 1800 as it moves along the mining face 1805, removing laser affected material. The conveyor 1801 also serves to move the mined (e.g., laser affected removed materials or ores) materials to another location or further transport. The mechanical shear plow 1801 has a first cutting tool 1809, which is a wheel with cutters on it, and a second cutting tool 1810, which is a wheel with cutters on it. A laser cutting tool 1802 is positioned on a laser cutting tool sled 1803, which moves along a laser cutting tool sled track 1804. The laser tool 1802 fires laser beam 1812 along beam path 1813 to cut the mining face 1805.

The laser tool is optically associated with a high power laser, for providing the high power laser beam to the laser tool. The high power laser may be in on the laser tool sled, on its own sled traveling in concert with the laser tool sled, or removed from the opening and put in optical communication with the laser tool by a high a power long distance optical fiber.

In this laser laser mechanical shear plow system 1820 the laser tool may be moved separately from the sled having the mechanical cutters, thus provided for a greater number of laser mechanical deliver patterns, sequences and operations.

Figure 10:
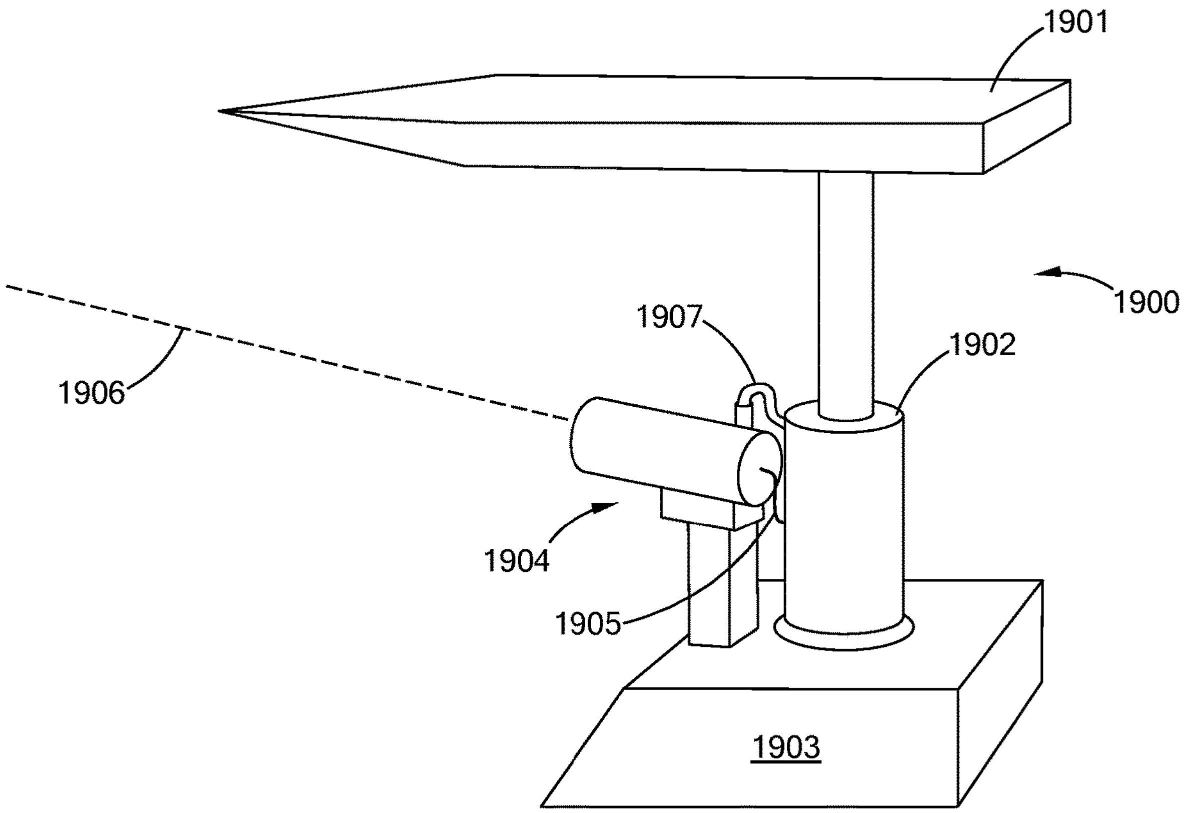
FIG. 10 is a perspective view of an embodiment of a laser roof shield assembly in accordance with the present invention.

Turning to FIG. 10 there is provided a laser roof shield assembly for perform laser operations on a mining face. The laser roof shield assembly 1900 has a roof shield 1901, a lift piston assembly 1902, a base assembly 1903, a laser tool 1904 that has an optical cable 1905 and a fluid and control conveyance structure 1907 (which may all be combined as a single umbilical, or may be three or more separate cables or lines). The laser tool is configured to provide a laser beam path 1906, along which a laser beam can be propagated. The optical cable 1905, the fluid cable and the control control cable are in communication with a high power laser source, a fluid source and a control center, respectively. The base has apparatus to move the base forward as the mining operation removes the wall facing the laser tool.

It should be noted that the mining, tunneling, road working and earth moving equipment of the embodiments shown in FIGS. 1 to 10, absent the integration of laser tools and laser processing operations, are generic examples of well known types of such equipment that have been used in these arts for many years. The integration of laser tools to these particular generic types of well known equipment is done by way of illustration, and is not meant to, and does not limit the scope of these inventions from being applied to, and embodied in other types of presently know equipment such as roof bolters, tractors, boring machines, dozers, continuous miners, long wall miners, robots, graders, mini-excavators (e.g., Bobcats®), trenchers, scrapers, shovels, etc., as well as, to newly developed and improved earth moving equipment such as may be provided by suppliers such as Caterpillar®, Joy®, Kubota®, Hitachi®, John Deere®, Link-Belt® and others.

It should further be noted that although one, two or more processes and techniques for laser assisted mining, drilling, boring or otherwise using the embodiments of laser equipment illustrated in the various figures of this specification, many other processes, operations and combination of these are contemplated and may occur. Thus, for example, start and stop, continuous, and semi continues processes and operations are contemplated, in which the laser is fired during the entire operation or at predetermined times, or intervals, during the operation to obtain the desired enhancements to the process or operation from using the laser energy. Further, although laser-mechanical operations are presently preferred, there may be processes in which laser energy alone is sufficient, and could further be preferred. Additionally, as set forth subsequently in greater detail each laser tool may have its own positioning and aiming device, which then allows the laser beam path to be adjusted, or changed, before of during the movement, positioning or rotation of the various housing and assemblies that hold the laser tools. In this manner, for example, the laser beam angle may be maintained at a desired or predetermined angle during rotation or other movement of the equipment or housing in which the laser tool is positioned.

Figure 26:
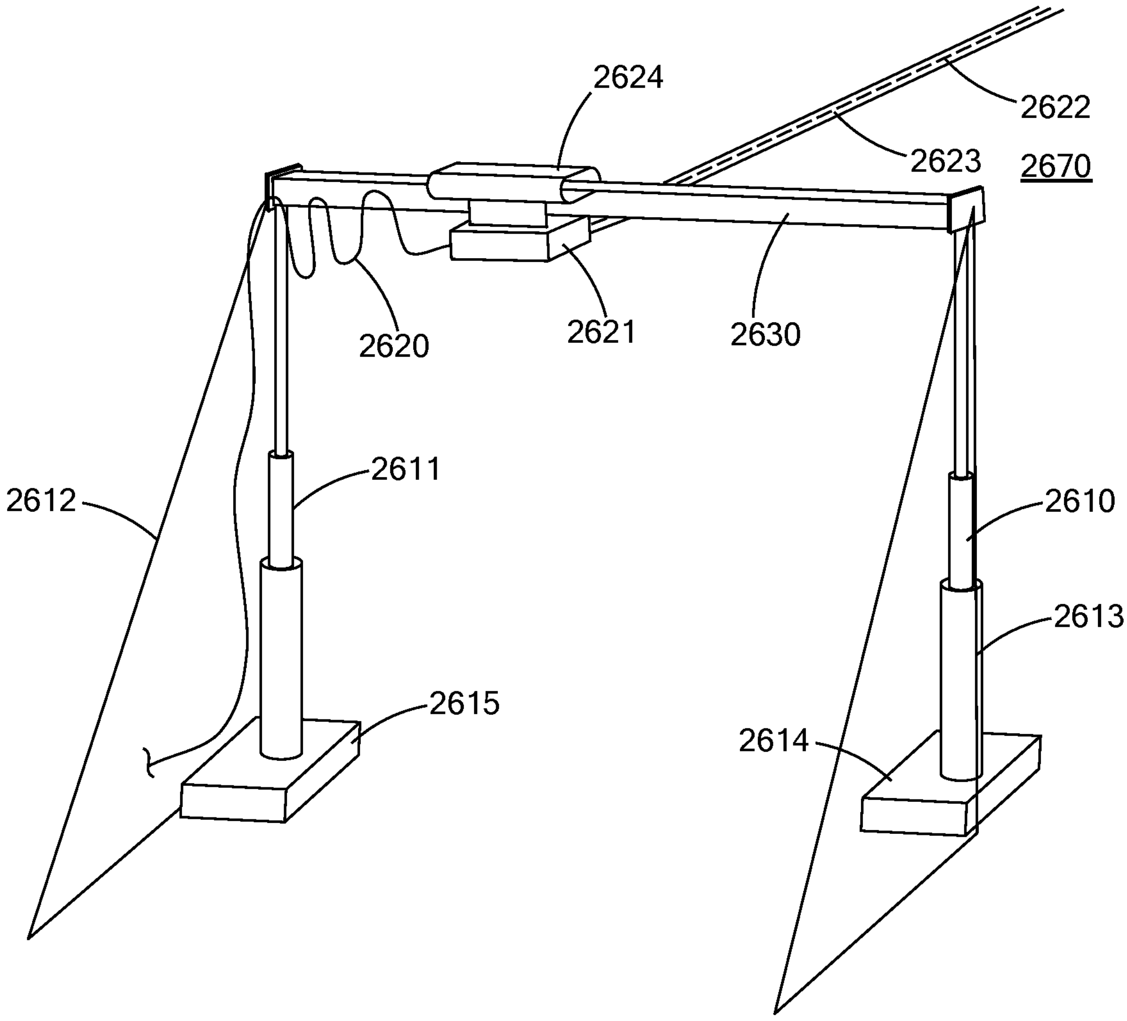
FIG. 26 is a perspective view of an embodiment of a laser cutting assembly in accordance with the present inventions.

Turning to FIG. 26 there is provided a perspective view of an embodiment of a wall face laser cutting system. The system has a laser cutting assembly 2621 having a laser-cutting tool within. The laser cutting tool is optically connected to a source of high power laser energy by cable 2620, which also may carry other lines, such as fluid, control, data, etc. The laser cutting assembly 2621 has an attachment and motive assembly 2624 that attaches to horizontal beam 2630. In this manner the laser cutting assembly 2621 can move back and forth across the beam 2630, and can do so in a predetermined pattern. The beam 2630 is supported by two extendable cylinders or lifts, 2611, 2610 having bases 2615, 2614 and supports 2612, 2614 (which provide stability while not interfering with the vertical movement of the beam and cylinders). In this manner the cylindars can be moved up and down together or independently to place the beam 2630 at predetermined heights and angles other than horizontal. Thus, the vertical, horizontal movement of the laser beam 2623 traveling along beam path 2622 created by laser cutting assembly 2621 can be delivered to a wall surface of a mine 2670 in a predetermined pattern.

Figure 27:
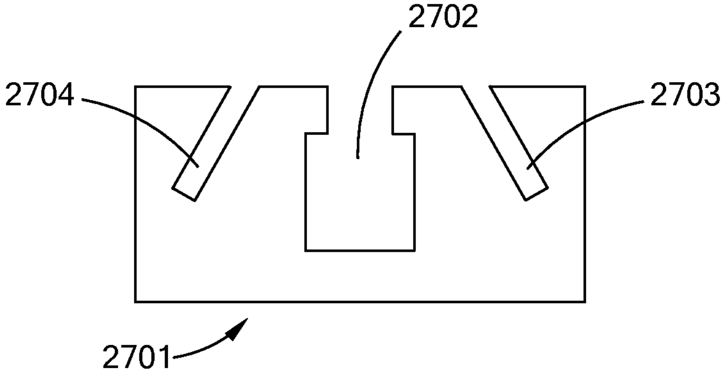
FIG. 27 is a schematic view of a laser cutting head of the assembly of FIG. 26.

Turning to FIG. 27 there is provided a cross section of a laser cutting assembly 2701 having a laser cutting tool 2702 and two high power jets 2704, 2703. The high power jets may be for example high power air jets, or high power water jets. And can be used to assist in the removal of material for the hole or cut, or to provide mechanical force to assist in the removal of laser affected material.

Further, each laser tool respectively delivers a high power laser beam that has predetermined laser beam properties, along a respective laser beam path that are aimed at a predetermined location on the surface of earth. More or less laser tools may be used. Each laser beam may have a power of at least about 5 kW, at least about 10 kW, at least about 20 kW and at least about 50 kW or more. Each laser beam may have the same or different laser beam properties. The beam paths may be relatively aimed at the same or different relative locations. The laser tools may be position at different locations along the mining face. If high power long distance optical fibers are used or needed, one, two, three, four or more fibers may be used or contained in a single umbilical or each be in its own separate cable structure.

Figure 10A:
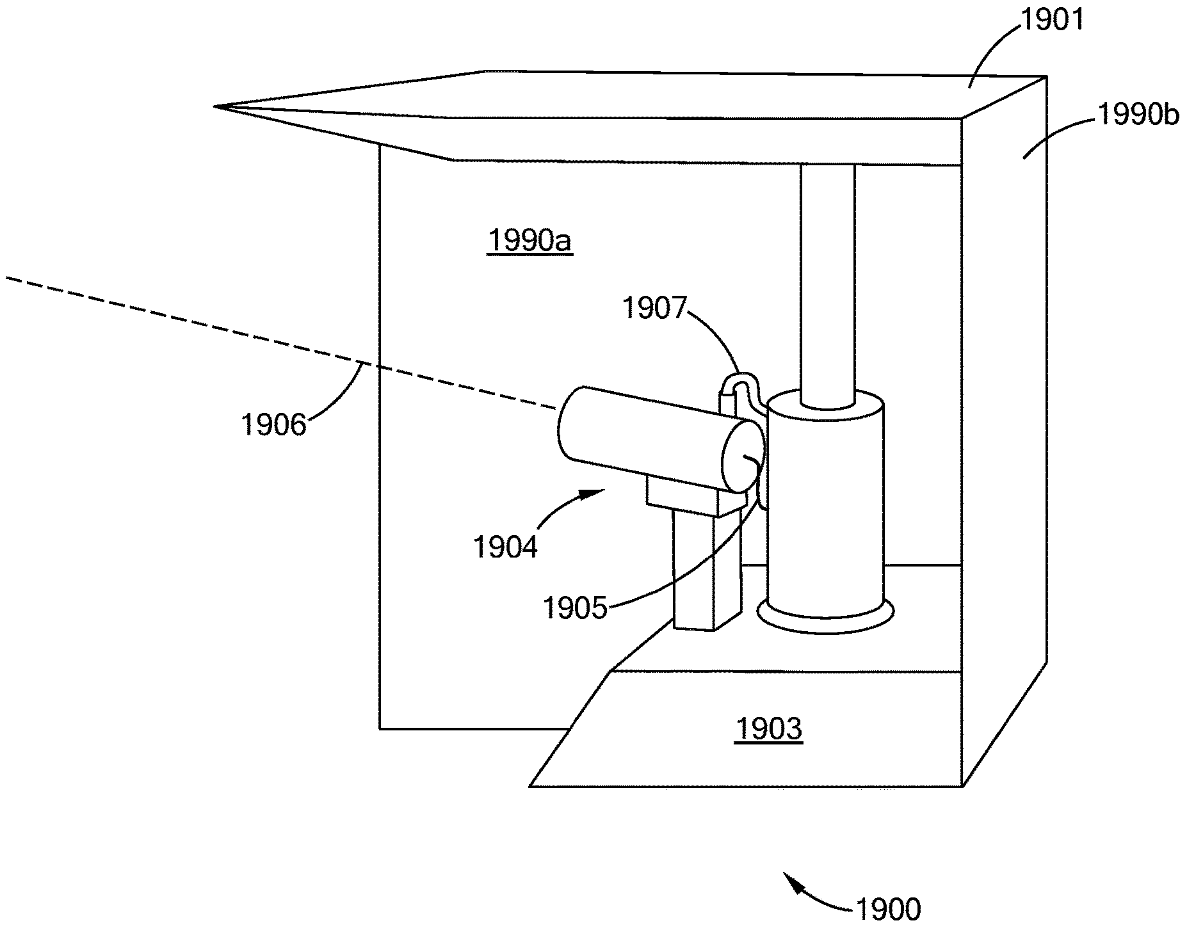
FIG. 10A is a perspective view of the embodiment of FIG. 10 with an optical shield in accordance with the present invention.
Figure 11:
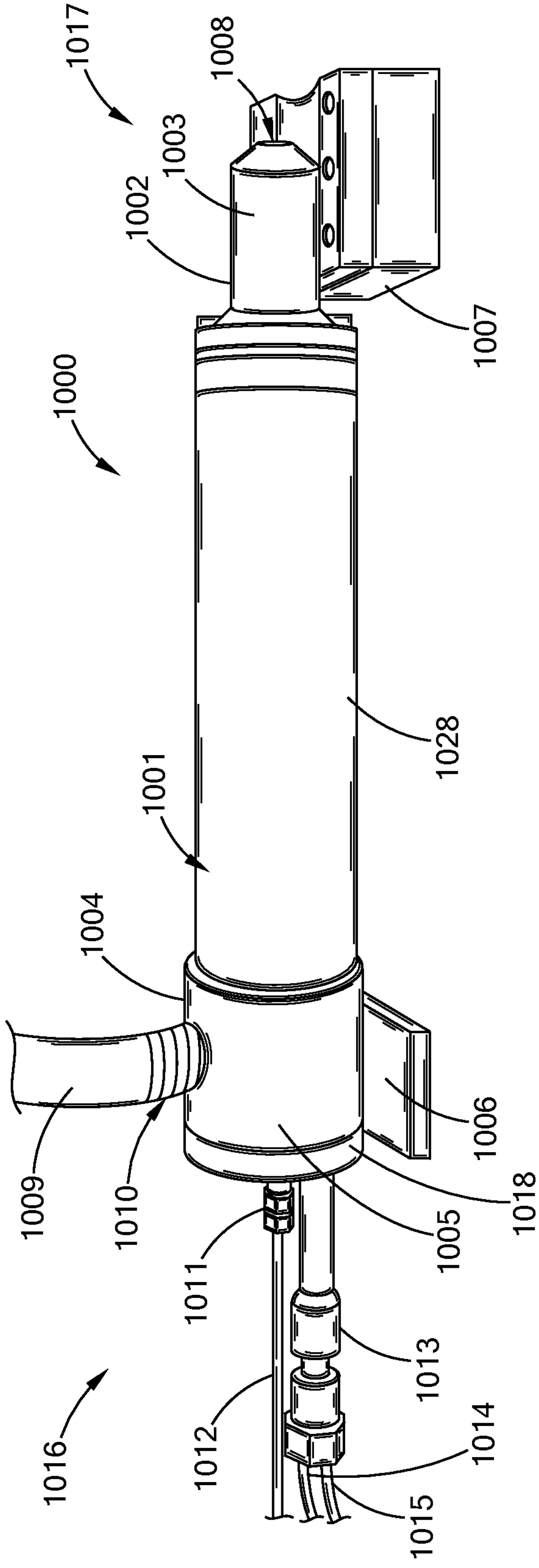
FIG. 11 is perspective view of an embodiment of a long stand off distance high power laser cutting tool in accordance with the present invention.

Turning to FIG. 11 there is shown a perspective view of an embodiment of a long stand off distance high power laser cutting tool of the type that may be used with earth moving, tunneling, boring, mining and quarrying equipment in general, and in particular of the types shown for example in the embodiments of FIGS. 1 to 10, 22, 26, 2A, 3A, 5A, 6A, 8A, 10A and 26A. The cutting tool 1000 has a laser discharge end 1017 and a back end 1016. A high power laser beam is propagated, e.g., fired from the laser discharge end 1017 of the cutting tool 1000. The cutting tool 1000 has a tool body 1001, having a laser discharge section 1002 and a gas inlet section 1004. The laser discharge section 1002 has a laser discharge section body 1003 and the gas inlet section 1004 has a gas inlet section body 1005. The laser discharge section body 1003 has an opening 1008 for the laser beam to pass through as it travels along a laser beam path to a work surface.

In FIG. 11, the cutting tool 1000 is shown positioned on a back support 1006 and a front support 1007. Generally, these supports may be part of a supporting assembly such as a mounting bracket, bar or other assembly for positioning the laser cutting tool in a laser housing, cutting assembly housing, or otherwise associating the laser cutting tool with earth moving, tunneling, boring, mining and quarrying equipment of the types shown for example in the embodiments of FIGS. 1 to 10, 22, 26, 2A, 3A, 5A, 6A, 8A, 10A and 26A. They may have height adjustment capabilities; and may have other adjustment, aiming, alignment, targeting, or tracking capabilities. These capabilities may be associated with measuring and positioning devices so that the position of the cutting tool with respect to a predetermined reference points or points can be known. Such capabilities may be manual, automatic, program driven, controller driven, and combinations and variations of these. These supports may be mounts that are part of a piece of equipment, such as an earth remover, a tracked vehicle, a trailer, etc. Additionally, there may be only a single support, or there may be two, three, four or more supports; and these supports may be mounted, attached, fixedly removable, to the same or different sections of the cutting tool as the sections of the cutting tool 1000 where supports 1006, 1007 are located. Preferably, one or both, of the supports is used to adjust and set the cutting angle of the laser beam path and the laser beam with respect to the work surface.

The gas inlet section body 1005, has a gas inlet line 1009 and connector 1010, for securing the gas inlet line 1009 to the gas inlet section body 1005. The gas inlet section body 1005 has a back end piece 1018, which has a fitting 1011 for an optical fiber cable 1012. The back end piece 1018, also has an auxiliary fitting 1013 for data line 1014, and data line 1015.

Figure 11A:
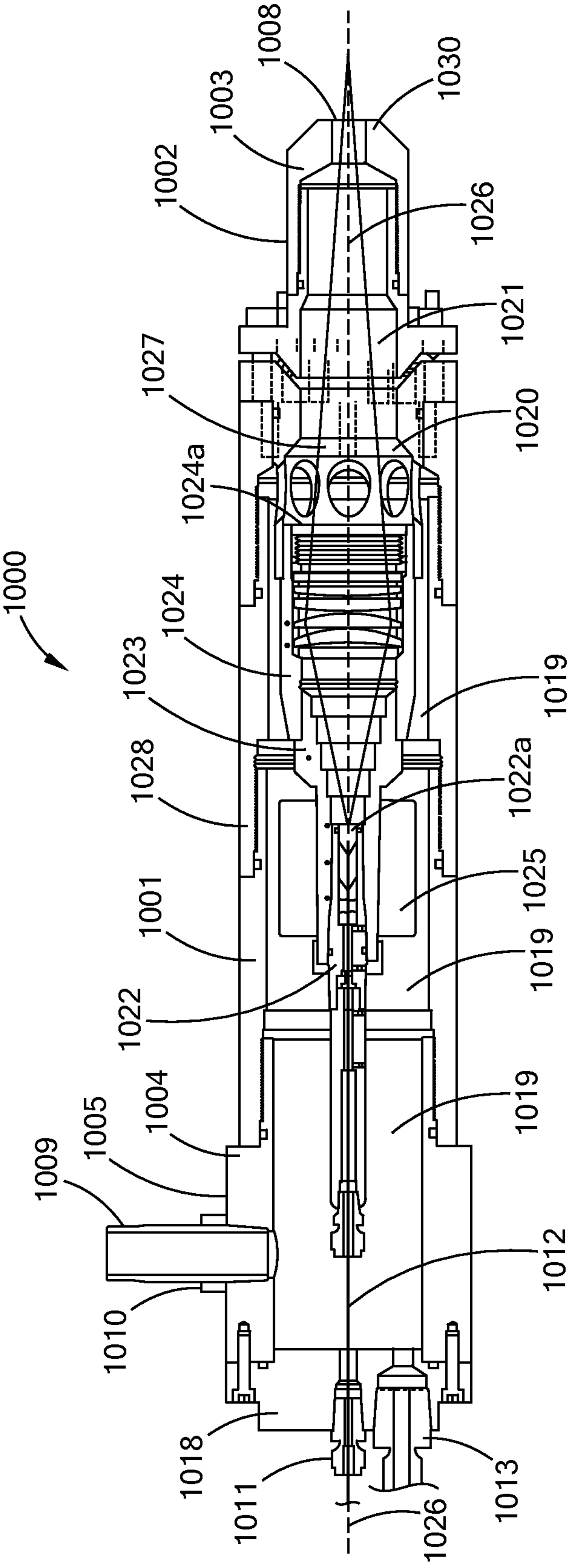
FIG. 11A is a cross sectional view of the tool of FIG. 11.

Turning to FIG. 11A, there is shown a cross section of the embodiment of FIG. 11 (without the supports). There is a gas flow passage 1019 that channels the gas from the gas inlet line 1009 along the length of the tool, around the exterior of a series of optical components. The gas flow is than transitioned, by gas flow carryover section 1020, from a location exterior to the optical components to gas flow passage 1021, which is positioned in, on and associated with the laser beam path 1026, where the gas then exits the tool through opening 1008. The gas flow passage 1019 is within the gas inlet section body 1005 and the optics section body 1028 of the tool 1000. The optical section body 1028 is made of up several bodies that are threaded together. The back end of the optical section body 1028 is connected by a threaded connection to the front end of the gas inlet section body 1005. The front end of optical section body 1028 is attached by threaded members, e.g., bolts, to the laser discharge section body 1003.

Generally, the various body sections of the tool may be separate components or they may be integral. They may be connected by any means available that meets the use requirements for the tool. Preferably, the tool, as assembled, should be sufficiently rigid to withstand anticipated vibration and mechanical shocks so that the optical components will remain in optical alignment. The tool body may be made from a single component or tube, it may be made from two, three or more components that are fixed together, such as by threaded connections, bolts, screws, flanges, press fitting, welding, etc. Preferably, the tool, as assembled, should meet the anticipated environmental conditions for an intended use, such as temperature, temperature changes, moisture, weather conditions, and dust and dirt conditions. The tool body, and body sections may be made from metal, composite materials, or similar types of materials that provide the requisite performance capabilities.

As used herein, unless specified otherwise, the terms front, and distal, are used to refer to the side or portion of a body, component, or structure that is the laser discharge side, is closer to the laser discharge end of the tool, or is further from the source of the laser beam, when the tool is assembled. The terms back or proximal, as used herein and unless specified otherwise, are used to refer to the side or portion of a body, component, or structure that is the back side, is further from the laser discharge end of the tool, or is closer to the source of the laser beam, when the tool is assembled.

Returning to FIG. 11A, the optical fiber cable 1012 extends into the gas inlet section body 1005 and the gas flow passage 1019. The optical fiber cable 1012 is optically and mechanically associated with optical connector 1022, which is positioned in optical connector receptacle 1023. The optical connector receptacle has a plurality of fins, e.g., 1025, which extend into gas flow passage 1019, and which provide cooling for the optical connector 1022 and the optical connector receptacle 1023. The laser beam path is represented by dashed line 1026, and extends from within the core of the optical fiber cable 1012 to a potential target or work surface. (The totality of the optical path would start at the source of the laser beam, and extend through all optical components, and free space, that are in the intended path of the laser beam.) At the distal end 1022*a* of optical connector 1022, the laser beam path 1026 is in free space, e.g., no solid components are present, and travels from the distal connector end 1022*a* to the optics package 1024, where the laser beam is optically manipulated to predetermined laser beam parameters for providing long stand off distance capabilities. The laser beam path 1026 exits the distal end 1024*a* of the optics package 1024, and travels in free space in the flow carry over section 1020, in the front section of the optical section body 1028, and in the laser discharge section body 1003, exiting through opening 1008. In operation the laser beam 1027 would be propagated by a laser, e.g., a source of a laser beam, and travel along the laser beam path 1026.

Figure 11B:
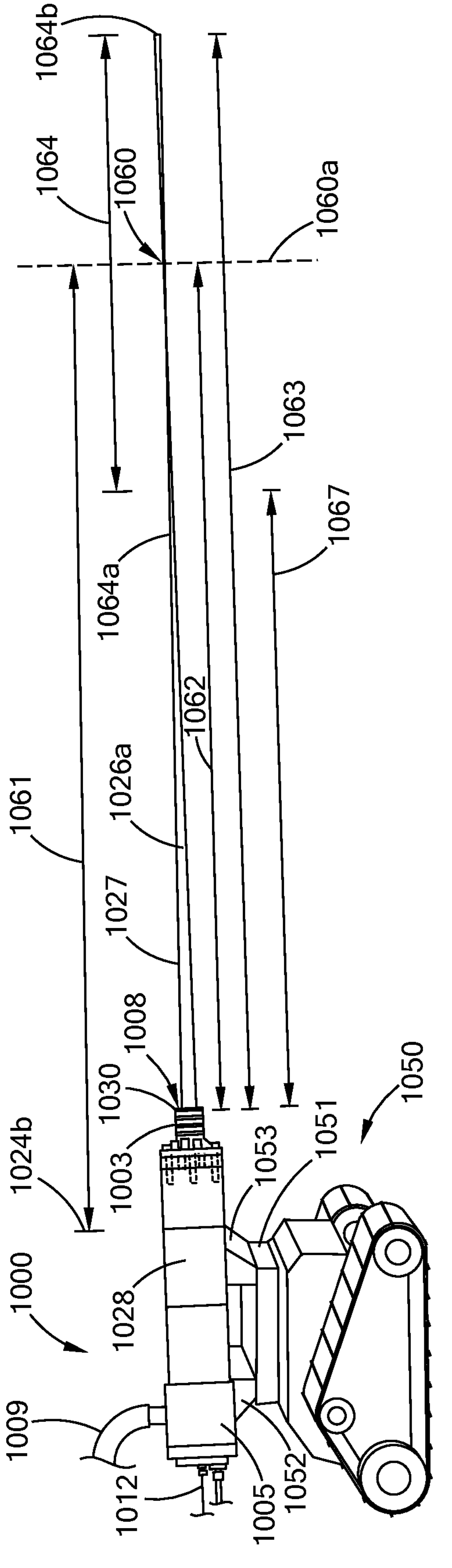
FIG. 11B is a perspective view of the tool of FIG. 11 mounted on a vehicle in accordance with the present invention.

Turning to FIG. 11B the tool 1000 is shown mounted on an embodiment of a mobile unit 1050. The tool 1000 is firing the laser beam 1027. In this embodiment the mobile unit 1050 is a tracked robotic vehicle. The mobile unit 1050 has a tool positioning and control unit 1051, which has the capability to have three axis of movement. The positioning and control unit 1051 is associated with a control system to provide for the aiming, e.g., position, location, scanning and movement in a pattern, of the laser beam path and laser beam. Preferable the laser tool is optically associated with a laser that has the capability to provide an aiming laser beam, which is eye safe and preferably visible, e.g., 532-670 nm, and a cutting or work laser beam, which has the request power and other beam properties, e.g., >1 kW, >5 kW, >10 kW, >15 kW, >20 kW, >40 kW, >50 kW and greater, to perform the intended laser activities. Preferably the aiming laser beam travels along the same laser beam path as the cutting laser beam. These beam paths may be separate, parallel, or converging.

In this embodiment of the tool, the optics package 1024 has lenses that provided for a long focal length, e.g., greater than about 100 mm (3.94"), greater than about 150 mm (5.91"), greater than about 250 mm (9.84"), greater than about 50 mm (19.68"), greater than about 1,000 mm (39.37"), greater than about 1,500 mm (59.06"), greater than about 2,000 mm (78.74"), greater than about 22,860 mm (75') and greater; and from about 250 mm to about 1,500 mm, and about 500 mm to about 1,000 mm. Thus, turning to FIG. 11B, there is shown an imaginary plane 1060*a*, for the purpose of reference, that passes through a point on the laser beam path 1060 that corresponds to the focal point of the laser beam. Thus, double arrow 1062 shows the distance from the distal end or face of the tool 1000 to the focal point 1060; double arrow 1061 shows the distance from the distal end of the optics package 1024*a* to the focal point 1060, which generally corresponds to the focal length of the optics. Based upon the laser beam properties, e.g., power, spot size, spot shape, focal length, and work material properties, there may be an optimum portion or length 1064 of the laser beam, which generally may be equal distance on either side of the focal point, and typically corresponds to the laser beam waist or laser beam depth of focus. Additionally, double arrow 1063 shows the distance from the face 1030 of the tool to the distal end 1064*b* of the beam waist 1064; and double arrow 1067 shows the distance from the face 1030 of the tool to the proximal end 1064*a* of the beam waist 1064.

The stand off distance, which is the distance from the face or distal end 1030 of the laser tool 1000 to the work surface can be greater than about 0.5 feet, greater than about 1 foot, greater than about 3 feet, greater than about 4 feet, and greater. As laser power increases, and laser beam properties are selected the stand off distance may be about 10 feet and greater. Further, as laser power increases, laser beam properties are selected, and if needed means for assisting the laser beam path from the tool to the work surface are used, e.g., a special atmosphere, a jet, or a means to keep the beam path clear, even greater stand off distances may be used, e.g., 50 feet, 75 feet, 100 feet, or more. Generally, across the stand off distance the laser beam path will be in free space, e.g., the laser beam would not be traveling through any solid components, e.g., an optical fiber core, a lens, a window. Thus, for example, the laser beam could be traveling through the atmosphere, e.g., the environmental conditions at a work site, upon exiting the tool at opening 1008 until it strikes the intended work surface.

Figure 11C:
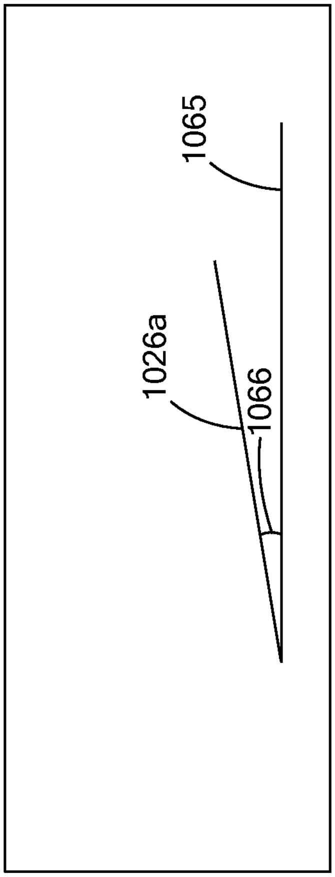
FIG. 11C is a schematic showing laser beam path angle in accordance with the present invention.

Turning to FIG. 11C there is shown a schematic illustrating the laser beam path angle 1066. The laser beam path angle 1066 is the angle that is formed between the laser beam path 1026*a* (as the beam path leaves the laser tool 1000) and a horizontal, i.e., level, line 1065. Generally, the laser beam path angle should be greater than 0°, greater than about 5°, greater than about 10°, greater than about 15°, greater than about 30° and may even be greater; and preferably may be from about 10° to about 40° and more preferably may be from about may be from about 15° to about 25°.

Having a laser beam path angle greater than zero, in conjunction with the laser beam power and other beam properties allows for the laser beam to penetrate deeply into a target material, e.g., the earth, rock, hard rock, and concrete. The laser beam can penetrate over 1 foot into a target material, e.g., hard rock, at least about 2 feet, at least about 5 feet, at least about 10 feet, at least about 50 feet and at least about 100 feet and more. Generally, the laser beam upon striking the work surface of the target material heats and melts that material (vaporization may also take place, and as discussed further below, spallation and thermal-mechanical cracking may also arise as a result of the laser heating of the target material). Because the beam angle is greater than 0° the laser beam forms a hole in the target material that has a slope, i.e., down toward the work surface and up into the target material). Thus, the molten material can flow down and out of the hole, clearing the hole so that the laser beam is continually striking the bottom or end of the hole, melting and thus removing additional target material and lengthening the hole.

The attachment and control assemblies for the laser cutting tools when they are mounted or otherwise associated with rotating components of equipment can be configured to maintain the drilling angle at greater than zero, and at a predetermined greater than zero value, for example 12, 15, 20 or 25 degrees as the laser tool is rotated. Generally, for example, when the laser tool is rotated it is rotated about an axis that is generally perpendicular to the mine, wall or rock face that is being bored; as is the case, for example, in the embodiments of FIGS. 1, 2, and 3. Additionally, if the focus angle of the beam is large enough, or the laser beam profile is such that the hole will have a taper on its lower side, and thus will have an effective beam angle greater than zero cut, (for example as shown in the embodiment of the cut and beam profile of FIG. 20), so that the motel material will flow from the hole, then the laser tool will not have to have its relative position changes as it moved through a complete rotation.

Figure 19:
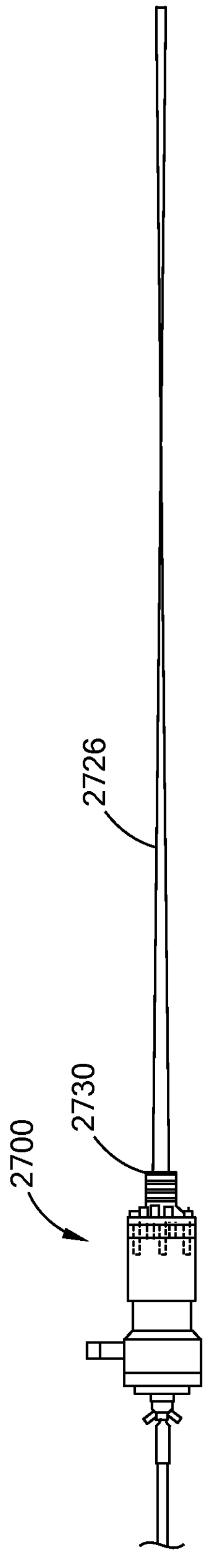
FIG. 19 is a perspective view of an embodiment of a laser cutting tool in accordance with the present inventions.
Figure 19A:
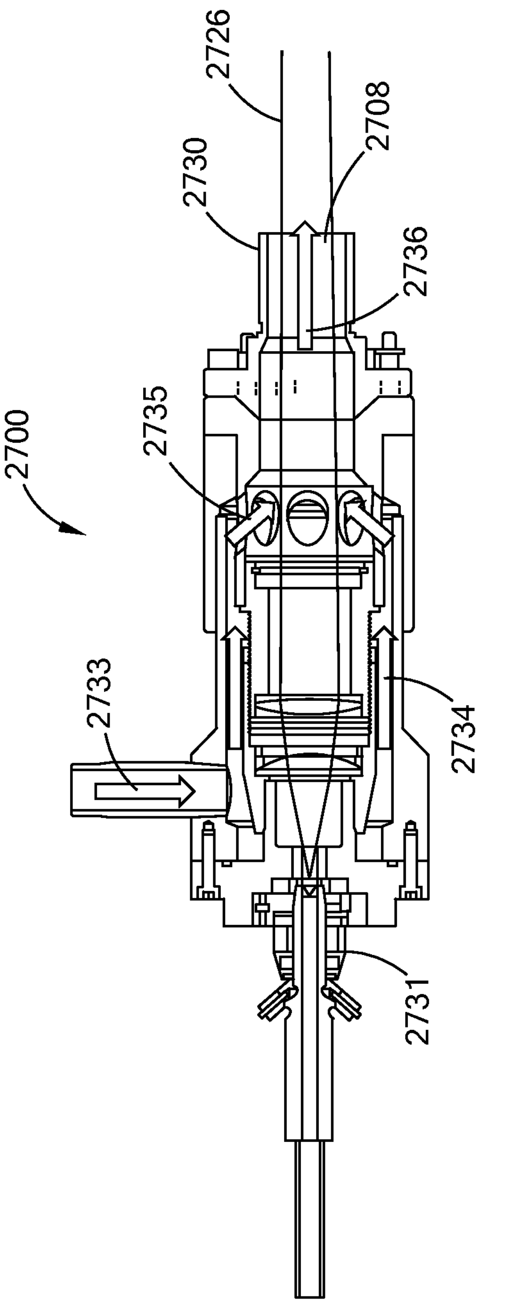
FIG. 19A is a cross section view of the embodiment of FIG. 19.

Turning to FIGS. 19 and 19A there is shown a portion of a laser tool 2700, having a laser discharge opening 2708 in the tool face end 2730. This embodiment of a laser tool is the type that may be used with earth moving, tunneling, boring, road-working, mining and quarrying equipment in general, and in particular of the types shown for example in the embodiments of FIGS. 1 to 10, 22, 26, 2A, 3A, 5A, 6A, 8A, 10A and 26A. The laser tool has a water cooled connector 2731. The laser beam path 2726 leaves the tool face 2730 and travels to a target. The flow of air cooling for the laser tool 2700 is shown by arrows 2733, 2734, 2735, 2736

Figure 20:
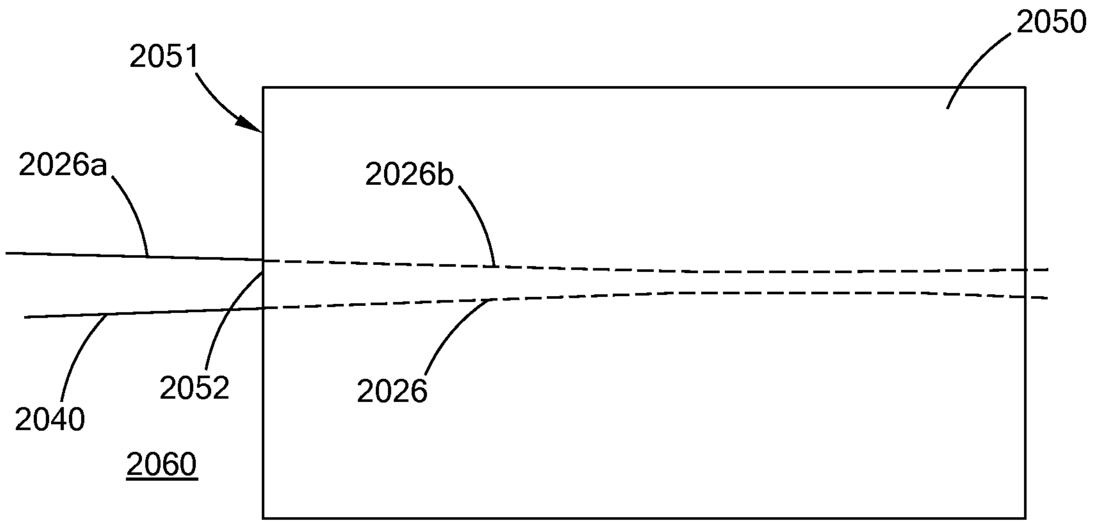
FIG. 20 is a cross section of an embodiment of a laser beam in a target material in accordance with the present inventions.

Turning to FIG. 20 there is shown a cross section of a target material. The laser beam 2040 intersects the surface 2051 of target material 2050 at point 2052. The laser beam path 2026 then extends beneath the work surface 2051 and into the target material 2050. The beam path may be viewed as having two portions. A first portion 2026*a*, extending from the tool face to the surface 2051 of the target material 2050, where the beam path is in free space 2060; and, a second portion 2026*b* where the beam path is within the target material. In the embodiment of FIG. 20, the target material is shown as a freestanding block of material. It should be understood that the target material may not be freestanding, or may only be partially freestanding, e.g., the target material could be the earth, a surface in a borehole in the earth, a seam of ore or mineral containing rock, a rock face at the end of a tunnel, a rock face in a deep mine, a rock face in a quarry, a quarried piece of rock, or the roof of a deep mine (for example in laser caving operations).

Figure 12:
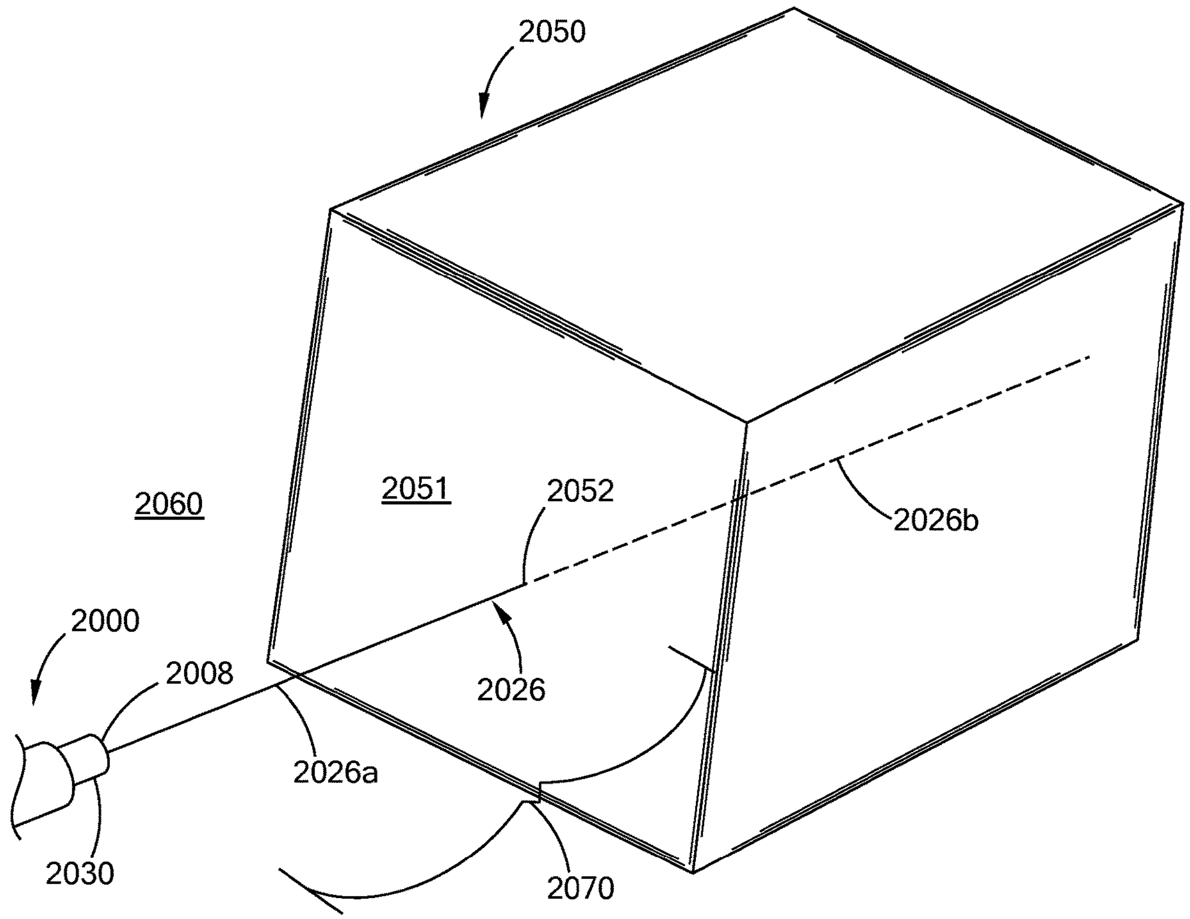
FIG. 12 is a perspective view of an embodiment of a laser tool and a target material in accordance with the present invention.

In general it is preferred that the optimum portion of the laser beam, e.g., beam waist 1064 of FIG. 11B, be positioned on the work surface, e.g., 2051 of FIG. 12. Thus, and for example, the distance from the end of the tool to the end of the beam waist, e.g., 1063 of FIG. 11B, could be the same or essentially the same as the stand off distance, e.g., 2070 of FIG. 12. In this example, the laser beam would tend to form a hole that has an increasing diameter with depth. More preferably, for forming deep penetrations into the target material, the focal point of the laser beam is located at the work surface. Thus, the stand off distance, e.g., 2070 of FIG. 11B and the distance from the end of the tool to the focal point, e.g., 1062 of FIG. 11B would be the same or essentially the same; and similarly, the point where the beam path first contacts the work surface, e.g., 2052 of FIG. 12 and the focal point of the beam, e.g., 1060 of FIG. 11B would be the same or essentially the same. Still more preferably, for forming deep penetrations into the target material, the proximal end, e.g., 1064*a* of the beam waist 1064 of FIG. 11B, is located at the work surface, e.g., 2051 of FIG. 12. Thus, the stand off distance, e.g., 2070 of FIG. 11B and the distance from the end of the tool to the proximal end of the beam waist, e.g., 1067 of FIG. 11B would be the same or essentially the same; and similarly, the point where the beam path first contacts the work surface would be the widest point, or essentially, the widest point of the laser beam waist.

It being understood that many other relative positions of the focal point, the laser beam optimum cutting portion, the beam waist, and the point where the laser beam path initially intersects the work surface may be used. Thus, for example, the focal point may be about 1 inch, about 2 inches, about 10 inches, about 15 inches, about 20 inches, or more above (e.g., away from) or below (e.g., within) the work piece surface.

The beam waist in many applications is preferably in the area of the maximum depth of the cut. In this manner the hole opens up toward the face (from surface), which further helps the molten material to flow from the hole. This effect is further shown in FIG. 20. Further this preferred positioning of the beam waist may also provide high rates of penetration.

Figure 13A:
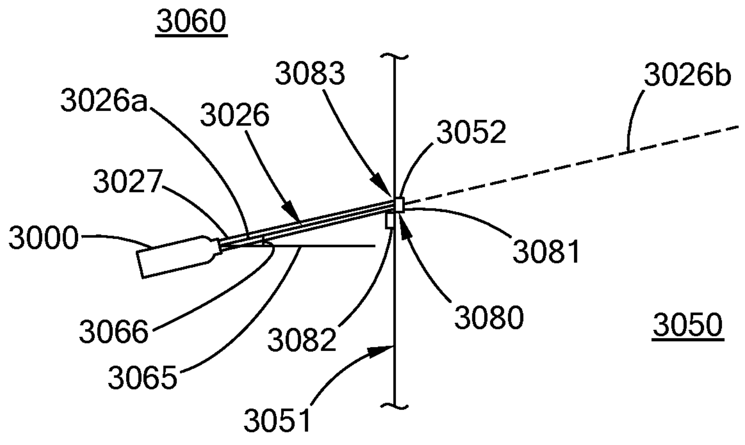
FIGS. 13A to 13C are side cross-section snap shot views of a laser operation in accordance with the present invention.
Figure 13B:
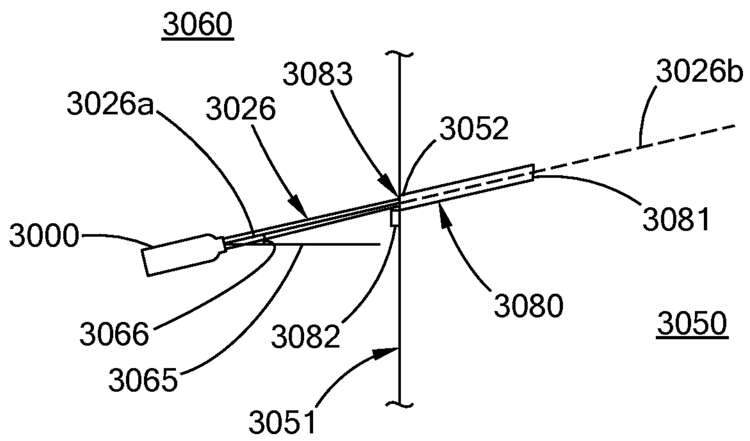
Figure 13C:
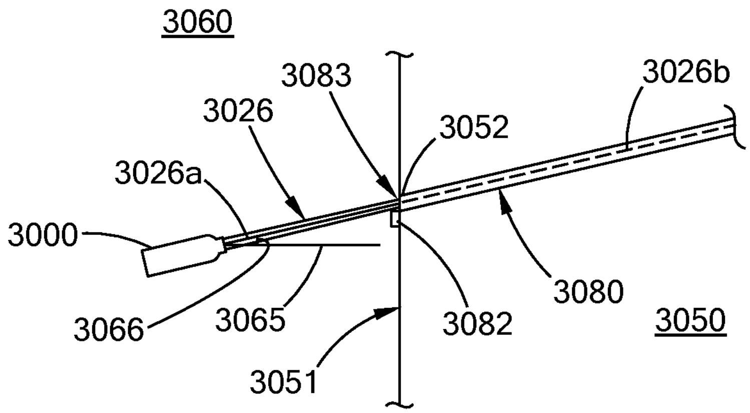

Turning to FIG. 13A through 13C there are provided side cross-sectional schematic snap shot views of an embodiment of a laser operation forming a hole, or perforation, into a target material. Thus, turning to FIG. 13A, in the beginning of the operation the laser tool 3000 is firing a laser beam 3027 along laser beam path 3026, and specifically along section 3026*a* of the beam path. Beam path section 3026*a* is in free space 3060 that has ambient air present. The laser beam path 3026 has a 16° beam path angle 3066 formed with horizontal line 3065. The laser beam path 3026 and the laser beam 3027 traveling along that beam path intersect the face 3051 of target material 3050 at spot 3052. In this embodiment the proximal end of the laser beam waist section is located at spot 3052. The hole or perforation 3080 is beginning to form, as it can be seen that the bottom, or distal, surface 3081 of the hole 3080 is below surface 3051, along beam path 3026*b*, and within the target material 3050. As can be seen from this figure the hole 3080 is forming with a downward slope from the bottom of the hole 3081 to the hole opening 3083. The molten target material 3082 that has flowed from the hole 3080 cools and accumulates below the hole opening 3083.

Turning to FIG. 13B the hole 3081 has become longer, advancing deeper into the target material 3050. In general, the hole advances along beam path 3026*a*. Thus, the bottom 3081 of the hole is on the beam path 3026*b* and deeper within the target material, e.g., further from the opening 3083, than it was in FIG. 13A.

Turning now to FIG. 13C the hole 3081 has been substantially advanced to the extent that the bottom of the hole is no longer visible in the figure. The amount of molten material 3082 that has flowed from the hole 3081 has continued to grow. In this embodiment the length of hole 3082 is substantially longer than the length of the beam waist. The diameter, or cross sectional size of the hole, however does not increase as might be expected in the area distal to the beam waist. Instead, the diameter remains constant, or may even slightly decrease. It is theorized, although not being bound by this theory, that this effect occurs because the optical properties of the hole, and in particular the molten and semi-molten inner surfaces of the hole, are such that they prevent the laser beam from expanding after it is past, i.e., distal to, the beam waist. Further, and again not being bound by this theory, the inner surfaces may absorb the expanding portions of the laser beam after passing through the waist, the inner surfaces may reflect the expanding portions of the laser beam, in effect creating a light pipe within the hole, or the overall conditions within the hole may create a waveguide, and combinations and variations of these. Thus, the depth or length of the hole can be substantially, and potentially many orders of magnitude greater than the length of the beam waist.

In general, the airflow within the tool preferably is sufficient to keep the distal end of the optics package and of the tool clear of debris and dirt from the environment. The airflow may also be used for cooling the optical package, optical components or other portions of the tool. A separate fluid, gas, or other type of cooling or thermal management system may be employed with the tool depending upon such factors as laser power, likely stand off distances, and environment temperatures, e.g., if the target material is a glacier in *Antarctica* compared to a rock face deep within an underground gold mine. For example, air flows of from about 15 scfm to about 50 scfm, about 20 scfm to about 40 scfm, about 20 scfm, and about 30 scfm can be utilized. Greater air flows may be used, but may not be necessary to cool and keep the optics clean. Ambient air from a compressor, bottled or compress air, nitrogen or other gasses may be used. Preferably the gas is clean, and substantially free from, or free from, any grease, oil or dirt that could adversely effect the optics when the laser beam is being propagated.

Figure 14:
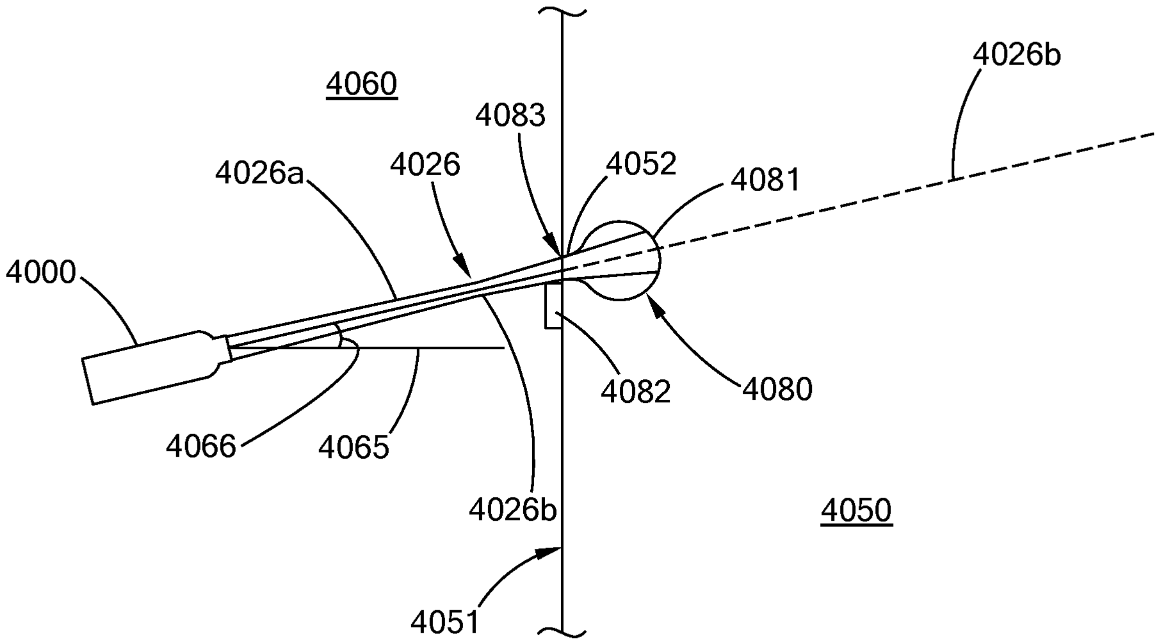
FIG. 14 is a side cross-section snap shot view of a laser operation in accordance with the present invention.

Turning to FIG. 14 these is provided a schematic showing an embodiment of a laser operation in which the distal end of the beam waist is positioned away from the work surface of the target material. The laser tool 4000 is firing a laser beam 4027 along laser beam path 4026, which may be considered as having two section 4026*a* and 4026*b*. Beam path section 4026*a* is in free space 4060 that has ambient air present, and beam path 4026*b* is within the target material 4050. The laser beam path 4026 has a 22° beam path angle 4066 formed with horizontal line 4065. The laser beam path 4026 and the laser beam 4027 traveling along that beam path intersect the surface 4051 of target material 4050 at location 4052. In this embodiment the distal end 4064*b* of the laser beam waist section is not on location 4052 and is located away from surface 4051. In this embodiment the hole or perforation 4080 forms but then reaches a point where the bottom of the hole 4081 will not advance any further along the beam path 4026*b*, e.g., the hole stops forming and will not advance any deeper into the target material 4050. Further, unlike the operation of the embodiment in FIGS. 13A to 13C, the hole 4080 does not have a constant or narrowing diameter as one looks from the opening 4083 to the bottom 4081 of the hole 4080. The molten target material 4082 that has flowed from the hole 4080 cools and accumulates below the hole opening 4083. Based upon the laser beam power and other properties, this embodiment provides the ability to have precise and predetermined depth and shaped holes, in the target material and to do so without the need for measuring or monitoring devices. Once the predetermined depth is achieved, and the advancement process has stopped, regardless of how much longer the laser is fired the hole will not advance and the depth will not increase. Thus, the predetermined depth is essentially a time independent depth. This essentially automatic and predetermined stopping of the hole's advancement provides the ability to have cuts of automatic and predetermined depths, and well as, to section or otherwise remove the face of a rock formation at a predetermined depth in an essentially automatic manner.

It should be further noted that once this self limiting depth control has occurred, the laser tool can be moved closer to the material and then have the process continue to advance the hole until the new self limiting depth is reached, at which if desired the tool could be move close, and this may be repeated until the tool is essentially upon the face of the target material. A beam profile providing for a self-limiting depth for example may be used in the laser road machine embodiment of FIG. 4. Thus, a specific depth of road surface can be laser affected and removed, for example, 2 inches, 3, inches, 4 inches, 5 inches and more.

Figure 15A:
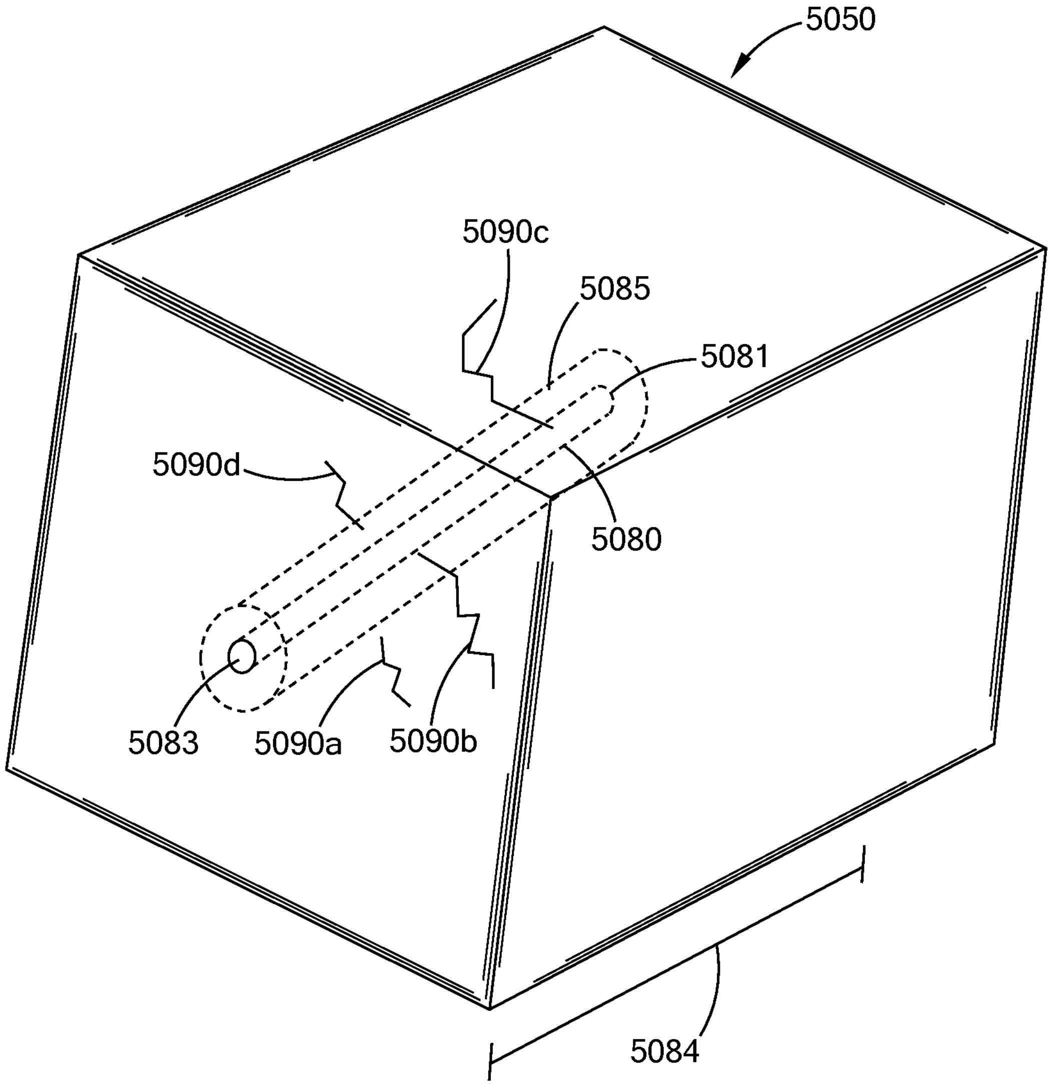
FIG. 15A is a perspective schematic view of an embodiment of a laser pattern for a target material in accordance with the present invention.
Figure 15B:
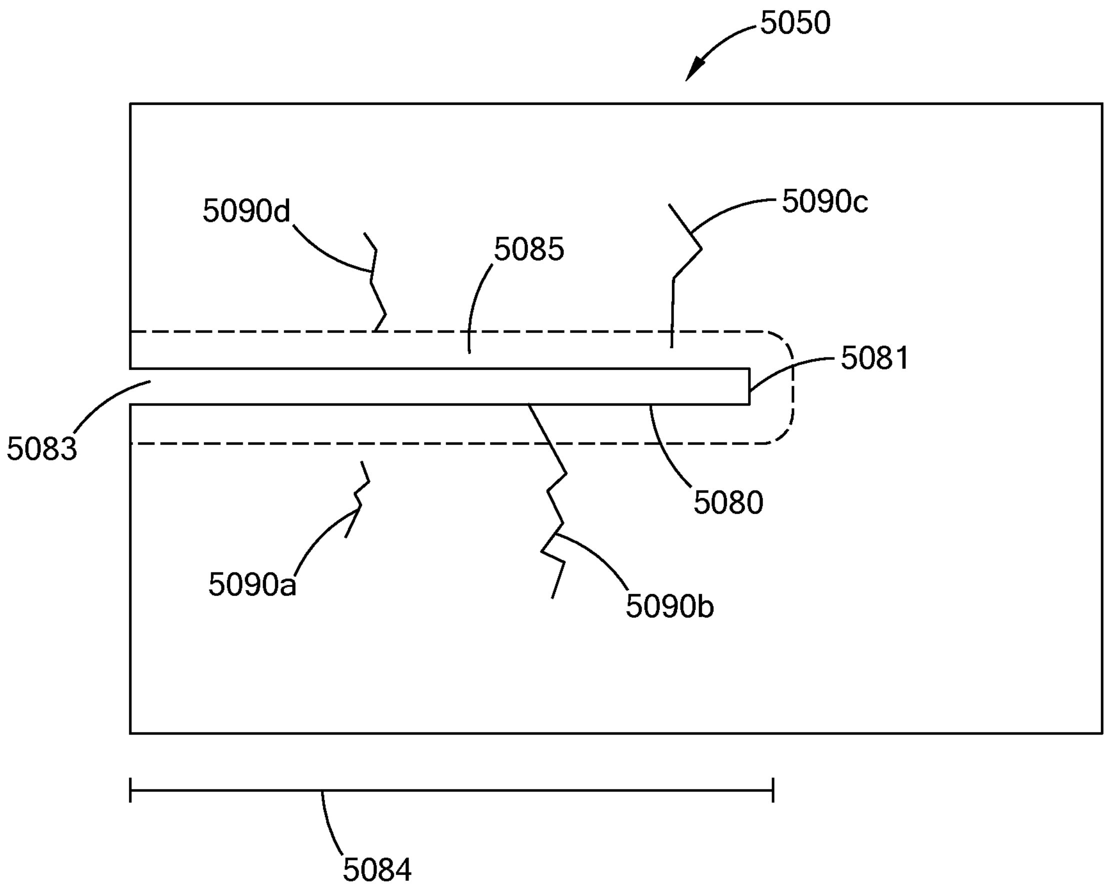
FIG. 15B is a side cross-section view of the embodiment of FIG. 15A.

Turning to FIGS. 15A and 15B there are shown in FIG. 15A a prospective view a target material 5050, and in FIG. 15B a cross sectional view of the target material 5500. The target material 5050 is shown as being freestanding, e.g., a block of material, for the purpose of clarity in the figure. It should be understood that the target material may not be freestanding, or may only be partially freestanding, e.g., the target material could be the earth, a surface in a borehole in the earth, a seam of ore or mineral containing rock, a rock face in a quarry, a quarried piece of rock, a rock face at the end of a tunnel, a rock face in a deep mine, or a roof of a deep mine. A laser cut hole 5080 extends into the target material 5050 from the hole opening 5083 to the back of the hole 5081. Around the hole 5080 is an area 5085 of laser affected target material. In this area 5085 the target material is weakened, substantially weakened, or essentially structurally destroyed. The laser affected material may fall apart on its own, or may be removed by the application of mechanical forces, such as by cutting members and cutters of a piece of equipment, such as the cutting members, e.g., 2406 and cutters, e.g., 2407 of the embodiment in FIG. 1, the laser mechanical cutting assembly 2213 of the embodiment of FIG. 2, the cutting wheel 2113 of the embodiment of FIG. 3, the rotating mechanical cutting roller 2303 and cutting wheels, e.g., 2304 of the embodiment of FIG. 5, the rotating head 1502, and cutting wheels, e.g., 1504, of the embodiment of FIG. 6, the cutting tools, e.g., 1709, 1710 of the embodiment of FIG. 7, a water jet, an air jet, a mechanical scraper, or a hammer and preferably only requires very small forces. For example if the target material is a rock having a hardness of about 40 kpsi, then the laser affected rock or area of laser affected rock may have a hardness of less than about 20 kpsi, less than about 10 kpsi, and less than about 5 kpsi. Additionally, the laser cutting process forms cracks or fractures, i.e., laser induced fracturing, in the target material. By way of example, fracture 5090*a* is an independent fracture and does not extend to, or into, the laser affected area 5085, the hole 5080 or another fracture. Fracture 5090*b* extends into and through the laser affected area 5085 into the hole 5081. Additionally, fracture 5090*b* is made up of two associated cracks that are not fully connected. Fracture 5090*c* extends to, and into, the laser affected area 5085 but does not extend to the hole 5080. Fracture 5090*d* extend to, but not into the laser affected area 5085.

The fractures 5090*a*, 5090*b*, 5090*c* and 5090*d* are merely schematic representation of the laser induced fractures that can occur in the target material, such as rock, earth, rock layer formations and hard rocks, including for example granite, basalt, sandstone, dolomite, sand, salt, limestone, ores, minerals, overburden, marble, rhyolite, quartzite and shale rock. In the target material, and especially in target materials that have a tendency, and a high tendency for thermal-mechanical fracturing, in a 10 foot section of laser cut hole there may be about 10, about 20, about 50 or more such fractures, and these fractures may be tortious, substantially linear, e.g., such as a crack along a fracture line, interconnected to greater and lessor extents, and combinations and variations of these. These laser fractures may also be of varying size, e.g., length, diameter, or distance of separation. Thus, they may vary from micro fractures, to hairline fractures, to total and extended separation of sections having considerable lengths.

The depth or length of the hole can be controlled by determining the rate, e.g., inches/min, at which the hole is advanced for a particular laser beam, configuration with respect to the work surface of the target material, and type of target material. Thus, based upon the advancement rate, the depth of the hole can be predetermined by firing the laser for a preset time.

The rate and extent of the laser fracturing, e.g., laser induced crack propagation, may be monitored by sensing and monitoring devices, such as acoustical devices, acoustical geological sensing devices, and other types of geological, sensing and surveying type devices. In this manner the rate and extent of the laser fracturing may be controlled real time, by adjusting the laser beam properties based upon the sensing data.

In doing assays of a formation, for example, to determine a mineral or precious metal content, a laser hole can be cut into the face of the formation and advanced into the formation to a predetermined depth, for example 100 feet.

Samples of the molten material flowing from the hole can be taken at set time intervals, which would correspond to set distances from the face (based upon the advancement rate for the hole). The molten sample can be analyzed at the location or solidified and stored, for later analysis. In this manner, if a series of holes are laser cut into the rock face at predetermined intervals an analysis of the entire formation can be performed. For example, since the laser can be used to melt the target material, e.g., a rock, it is also possible to collect the molten rock in for example a crucible. By keeping the rock molten for a few minutes, (the laser may be used for this purpose, a second laser may be used, or conventional heaters, e.g., flame, electric, may be used) the heavier desired metal, e.g., gold, silver, copper, and other heavy metals can sink to the bottom of the crucible giving the operator a real time method for assaying the potential of the formation. The laser can also be used to melt a predetermined surface or volume of rock for the purpose of assaying the formation independent of any drilling or cutting process. The spectral emissions from the laser rock process may also be used to determine the presence of trace elements. In this example, preferably a sophisticated spectral analysis technique, known to those of skill in the spectral analysis arts, can be employed, to sort out the spectral signatures of the desired or sought after materials that may be buried in the background blackbody radiation signal.

Cuts in, sectioning of, and the volumetric removal of the target material can be accomplished by delivering the laser beam energy to the target material in preselected and predetermined energy distribution patterns. These patterns can be done with a single laser beam, or with multiple laser beams. For example, these patterns can be: a linear cut; a circular cut; a spiral cut; a pattern of connected cuts; a pattern of connected linear cuts, such as a grid pattern, a pattern of radially extending cuts, e.g., spokes on a wheel; a circle and radial cut pattern, e.g., cutting pieces of a pie and cutting around the pie pan; a pattern of spaced apart holes, such as in a line, in a circle, in a spiral, or other pattern, as well as other patterns and arrangements. The patterns, whether lines, staggered holes, others, or combinations thereof, can be traced along a feature of the target material, such as, a geologic feature of a formation, a boarder of an ore seam, or a joint in a structure. The patterns can be traced along a feature intended to be created in the target material, such as a side wall or roof of a tunnel or shaft. The forgoing are illustrative examples of the types and nature of laser cuts, sectionings and volumetric removals that the can be performed; and that additional, other, varied, as well as combinations and variations of the forgoing are contemplated. Additionally, the timing and sequence of the creation of the holes, cuts and volumetrically removed sections, can be predetermined to enhance, and take advantage, the laser fracturing of the target material, as well as the laser affected zones in the material. The predetermined timing sequence can also provide the ability to enhance other non-laser operations that may be taking place before, after or in conjunction with the laser operations.

Thus, for example, in determining a laser beam delivery pattern to provide a predetermined and preselected laser beam energy distribution pattern, the spacing of cut lines, or staggered holes, in the target material, preferably may be such that the laser affected zones are slightly removed from one another, adjacent to one another but do not overlap, or overlap only slightly. In this manner, the maximum volume of the target material will be laser affected, i.e., weakened, with the minimum amount of total energy.

It is further believed that when comparing the energy delivered from the present laser operations, as compared to conventional blasting using explosives, substantially less energy is being used. Further, the present laser operations avoid the peripheral environment damage, and structural damage to surround structures, e.g., homes and business, that may occur from the use of explosive in mining, quarrying, tunneling and construction activities. The present inventions provide a further benefit by eliminating risk to personnel from the use and handling of explosives; thus eliminating the need to vacate all personnel during the mining operation. Unlike explosive use, the use of the present laser operations may not require the clearing of large areas and the stopping of other operations, while the cutting and fracturing operations are ongoing.

Preferably, when the laser tool is configured for performing a laser operation on a target material the laser beam path from the front of the tool to the surface of target material should be isolated. This may be accomplished by the use of a barrier that prevents the laser light from escaping or from reaching the location where personnel may be present. For example the laser beam path may be isolated by using a light weight metal tube, having an internal diameter that is large enough to not interfere with the laser beam, that is optically sealed to the laser tool, i.e., no laser light can escape, and that extends from the laser tool to the work surface, where it is optically sealed to the work surface. It may be isolated by using a temporary, semi-permanent or permanent shielding structure, e.g., stands holding welding blankets or other light blocking materials, a scaffold supporting light blocking materials, a telescoping or extendable housing that is placed over the beam path or more preferably the tool and the beam path. It may also be isolated by constructing a temporary, semi-permanent or permanent barrier to optically isolate the beam path, and more preferably to isolate the tool, the work surface and the target material from personnel, e.g., a temporary barrier in a tunnel, optically sealing against the tunnel walls, behind the laser tool as it is advancing the tunnel face.

Preferably, the laser equipment will meet the requirements of 21 C.F.R. § 1040.10 (Revised as of Apr. 1, 2012), the entire disclosure of which is incorporated herein by reference, to be considered Class Ill, more preferably Class II, and still more preferably Class I.

As used in this specification a "Class I product" is equipment that will not permit access during the operation of the laser to levels of laser energy in excess of the emission limits set forth in Table I. Thus, preferably personnel operating, and in the area of operation, of the equipment will receive no more than, and preferably less than, the following exposers in Table I during operation of the laser equipment.

TABLE I

CLASS I ACCESSIBLE EMISSION LIMITS FOR LASER RADIATION

| Wavelength (nanometers) | Emission duration (seconds) | Class I-Accessible emission limits (value) | (unit) | (quantity)** |
|---|---|---|---|---|
| ≥180 | ≤3.0 × $10^4$ - - - | 2.4 × $10^{-5}k_1k_2$* | Joules(J)* | radiant energy |
| but | >3.0 × $10^4$ - - - | 8.0 × $10^{-10}k_1k_2$* | Watts(W)* | radiant power |
| ≤400 | | | | |
| >400 | >1.0 × $10^{-9}$ to 2.0 × $10^{-5}$ - - - | 2.0 × $10^{-7}k_1k_2$ | J | radiant energy |
| but | >2.0 × $10^{-5}$ to 1.0 × $10^1$ - - - | 7.0 × $10^{-4}k_1k_2t^{3/4}$ | J | radiant energy |

TABLE I-continued

CLASS I ACCESSIBLE EMISSION LIMITS FOR LASER RADIATION

| Wavelength | Emission duration | Class I-Accessible emission limits | | |
|---|---|---|---|---|
| (nanometers) | (seconds) | (value) | (unit) | (quantity)** |
| ≤1400 | >1.0 × $10^1$ to 1.0 × $10^4$ - - - | 3.9 × $10^{-3}k_1k_2$ | J | radiant energy |
| | >1.0 × $10^4$ - - - | 3.9 × $10^{-7}k_1k_2$ | W | radiant power |
| | and also (See paragraph (d)(4) of this section) | | | |
| | >1.0 × $10^{-9}$ to 1.0 × $10^1$ - - - | $10k_1k_2t^{1/3}$ | $Jcm^{-2}sr^{-1}$ | integrated radiance |
| | >1.0 × $10^1$ to 1.0 × $10^4$ - - - | $20k_1k_2$ | $Jcm^{-2}sr^{-1}$ | integrated radiance |
| | >1.0 × $10^4$ - - - | 2.0 × $10^{-3}k_1k_2$ | $Wcm^{-2}sr^{-1}$ | radiance |
| >1400 | >1.0 × $10^{-9}$ to 1.0 × $10^{-7}$ - - - | 7.9 × $10^{-5}k_1k_2$ | J | radiant energy |
| but | >1.0 × $10^{-7}$ to 1.0 × $10^1$ - - - | 4.4 × $10^{-3}k_1k_2t^{1/4}$ | J | radiant energy |
| ≤2500 | >1.0 × $10^1$ - - - | 7.9 × $10^{-4}k_1k_2$ | W | radiant power |
| >2500 | >1.0 × $10^{-9}$ to 1.0 × $10^{-7}$ - - - | 1.0 × $10^{-2}k_1k_2$ | $Jcm^{-2}$ | radiant exposure |
| but | >1.0 × $10^{-7}$ to 1.0 × $10^1$ - - - | 5.6 × $10^{-1}k_1k_2t^{1/4}$ | $Jcm^{-2}$ | radiant exposure |
| ≤1.0 × $10^6$ | >1.0 × $10^1$ - - - | 1.0 × $10^{-1}k_1k_2t$ | $Jcm^{-2}$ | radiant exposure |

*Class I accessible emission limits for wavelengths equal to or greater than 180 nm but less than or equal to 400 nm shall not exceed the Class I accessible emission limits for the wavelengths greater than 1400 nm but less than or equal to 1.0 × $10^6$ nm with a $k_1$ and $k_2$ of 1.0 for comparable sampling intervals.
**Measurement parameters and test conditions shall be in accordance with paragraphs (d)(1), (2), (3), and (4), and (e) of this section.

As used in this specification a "Class IIa product" is equipment that will not permit access during the operation of the laser to levels of visible laser energy in excess of the emission limits set forth in Table II-A; but permit levels in excess of those provided in Table I.

TABLE II-A

CLASS IIa ACCESSIBLE EMISSION LIMITS FOR LASER RADIATION
CLASS IIa ACCESSIBLE EMISSION LIMITS ARE IDENTICAL TO CLASS I ACCESSIBLE EMISSION LIMITS EXCEPT WITHIN THE FOLLOWING RANGE OF WAVELENGTHS AND EMISSION DURATIONS:

| Wavelength | Emission duration | Class IIa-Accessible emission limits | | |
|---|---|---|---|---|
| (nanometers) | (seconds) | (value) | (unit) | (quantity)* |
| >400 but ≤710 | >1.0 × $10^3$ | 3.9 × $10^{-6}$ | W | radiant power |

*Measurement parameters and test conditions shall be in accordance with paragraphs (d)(1), (2), (3), and (4), and (e) of this section.

As used in this specification a "Class II product" is equipment that will not permit access during the operation of the laser to levels of laser energy in excess of the emission limits set forth in Table II; but permit levels in excess of those provided in Table II-A.

TABLE II

CLASS II ACCESSIBLE EMISSION LIMITS FOR LASER RADIATION
CLASS II ACCESSIBLE EMISSION LIMITS ARE IDENTICAL TO CLASS I ACCESSIBLE EMISSION LIMITS EXCEPT WITHIN THE FOLLOWING RANGE OF WAVELENGTHS AND EMISSION DURATIONS:

| Wavelength | Emission duration | Class II-Accessible emission limits | | |
|---|---|---|---|---|
| (nanometers) | (seconds) | (value) | (unit) | (quantity)* |
| >400 but ≤710 | >2.5 × $10^{-1}$ | 1.0 × $10^{-3}$ | W | radiant power |

*Measurement parameters and test conditions shall be in accordance with paragraphs (d)(1), (2), (3), and (4), and (e) of this section.

As used in this specification a "Class IIIa product" is equipment that will not permit access during the operation of the laser to levels of laser energy in excess of the emission limits set forth in Table III-A; but permit levels in excess of those provided in Table II.

TABLE III-A

CLASS IIIa ACCESSIBLE EMISSION LIMITS FOR LASER RADIATION
CLASS IIIa ACCESSIBLE EMISSION LIMITS ARE IDENTICAL TO CLASS I ACCESSIBLE EMISSION LIMITS EXCEPT WITHIN THE FOLLOWING RANGE OF WAVELENGTHS AND EMISSION DURATIONS:

| Wavelength | Emission duration | Class IIIa-Accessible emission limits | | |
|---|---|---|---|---|
| (nanometers) | (seconds) | (value) | (unit) | (quantity)* |
| >400 but ≤710 | >3.8 × $10^{-4}$ | 5.0 × $10^{-3}$ | W | radiant power |

*Measurement parameters and test conditions shall be in accordance with paragraphs (d)(1), (2), (3), and (4), and (e) of this section.

As used in this specification a "Class IIIb product" is equipment that will not permit access during the operation of the laser to levels of laser energy in excess of the emission limits set forth in Table III-B; but permit levels in excess of those provided in Table III-A.

TABLE III-B

| CLASS IIIb ACCESSIBLE EMISSION LIMITS FOR LASER RADIATION | | | | |
|---|---|---|---|---|
| Wavelength (nanometers) | Emission duration (seconds) | Class IIIb-Accessible emission limits (value) | (unit) | (quantity)* |
| ≥180 but ≤400 | ≤2.5 × $10^{-1}$ - - - | 3.8 × $10^{-4} k_1 k_2$ | J | radiant energy |
| | >2.5 × $10^{-1}$ - - - | 1.5 × $10^{-3} k_1 k_2$ | W | radiant power |
| >400 but ≤1400 | >1.0 × $10^{-9}$ to 2.5 × $10^{-1}$ - - - | $10 k_1 k_2 t^{1/3}$ | $Jcm^{-2}$ | radiant exposure |
| | >2.5 × $10^{-1}$ - - - | to a maximum value of 10 | $Jcm^{-2}$ | radiant exposure |
| | | 5.0 × $10^{-1}$ | W | radiant power |
| >1400 but ≤1.0 × $10^6$ | >1.0 × $10^{-9}$ to 1.0 × $10^1$ - - - | 10 | $Jcm^{-2}$ | radiant exposure |
| | >1.0 × $10^1$ - - - | 5.0 × $10^{-1}$ | W | radiant power |

*Measurement parameter and test conditions shall be in accordance with paragraphs (d)(1), (2), (3), and (4), and (e) of this section.

The values for the wavelength dependent correction factors "k1" and "k2" for Tables I, IIA, II, IIIA, IIIB are provided in Table IV.

TABLE IV

| VALUES OF WAVELENGTH DEPENDENT CORRECTION FACTORS $k_1$ AND $k_2$ | | | | |
|---|---|---|---|---|
| Wavelength ( nanometers) | $k_1$ | $k_2$ | | |
| 180 to 302.4 | 1.0 | 1.0 | | |
| >302.4 to 315 | $10^{\left[\frac{\lambda-302.4}{5}\right]}$ | 1.0 | | |
| >315 to 400 | 330.0 | 1.0 | | |
| >400 to 700 | 1.0 | 1.0 | | |
| >700 to 800 | $10^{\left[\frac{\lambda-700}{515}\right]}$ | if: $t \le \frac{10100}{\lambda - 699}$ then: $k_2 = 1.0$ | if: $\frac{10100}{\lambda - 699} < t \le 10^4$ then: $k_2 = \frac{t(\lambda - 699)}{10100}$ | if: $t > 10^4$ then: $k_2 = \frac{\lambda - 699}{1.01}$ |
| >800 to 1060 | $10^{\left[\frac{\lambda-700}{515}\right]}$ | if: $t \le 100$ then: $k_2 = 1.0$ | if: $100 < t \le 10^4$ then: $k_2 = \frac{t}{100}$ | if: $t > 10^4$ then: $k_2 = 100$ |
| >1060 to 1400 | 5.0 | | | |
| >1400 to 1535 | 1.0 | 1.0 | | |
| >1535 to 1545 | $t \le 10^{-7}$ $k_1 = 100.0$ $t > 10^{-7}$ $k_1 = 1.0$ | 1.0 | | |
| >1545 to 1.0 × $10^6$ | 1.0 | 1.0 | | |

Note:
The variables in the expressions are the magnitudes of the sampling interval(t), in units of seconds, and the wavelength (λ), in units of nanometers.

The measurement parameters and test conditions for Tables I, IIA, II, IIIA, and IIIB, which are referred to by paragraph numbers of "this section," are as follows, and are provided with their respective paragraph numbers "b" and "e" as they appear in 21 C.F.R. § 1040.10 (Revised as of Apr. 1, 2012):

(b)(1) Beam of a single wavelength. Laser or collateral radiation of a single wavelength exceeds the accessible emission limits of a class if its accessible emission level is greater than the accessible emission limit of that class within any of the ranges of emission duration specified in tables I, II-A, II, Ill-A, and III-B.

(b)(2) Beam of multiple wavelengths in same range. Laser or collateral radiation having two or more wavelengths within any one of the wavelength ranges specified in tables I, II-A, II, Ill-A, and III-B exceeds the accessible emission limits of a class if the sum of the ratios of the accessible emission level to the corresponding accessible emission limit at each such wavelength is greater than unity for that combination of emission duration and wavelength distribution which results in the maximum sum.

(b)(3) Beam with multiple wavelengths in different ranges." Laser or collateral radiation having wavelengths within two or more of the wavelength ranges specified in tables I, II-A, II, Ill-A, and III-B exceeds the accessible emission limits of a class if it exceeds the applicable limits within any one of those wavelength ranges.

(b)(4) Class I dual limits. Laser or collateral radiation in the wavelength range of greater than 400 nm but less than or equal to 1.400 nm exceeds the accessible emission limits of Class I if it exceeds both: (i) The Class I accessible emission limits for radiant energy within any range of emission duration specified in table I, and (ii) The Class I accessible emission limits for integrated radiance within any range of emission duration specified in table I.

(e) (1) Tests for certification. Tests shall account for all errors and statistical uncertainties in the measurement process. Because compliance with the standard is required for the useful life of a product such tests shall also account for increases in emission and degradation in radiation safety with age.

(e)(2) Test conditions. tests for compliance with each of the applicable requirements of paragraph (e) shall be made during operation, maintenance, or service as appropriate: (i) Under those conditions and procedures which maximize the accessible emission levels, including start-up, stabilized emission, and shut-down of the laser product; and (ii) With all controls and adjustments listed in the operation, maintenance, and service instructions adjusted in combination to result in the maximum accessible emission level of radiation; and (iii) At points in space to which human access is possible in the product configuration which is necessary to determine compliance with each requirement, e.g., if operation may require removal of portions of the protective housing and defeat of safety interlocks, measurements shall be made at points accessible in that product configuration; and (iv) With the measuring instrument detector so positioned and so oriented with respect to the laser product as to result in the maximum detection of radiation by the instrument; and (v) For a laser product other than a laser system, with the laser coupled to that type of laser energy source which is specified as compatible by the laser product manufacturer and which produces the maximum emission level of accessible radiation from that product.

(e)(3) Measurement parameters. Accessible emission levels of laser and collateral radiation shall be based upon the following measurements as appropriate, or their equivalent: (i) For laser products intended to be used in a locale where the emitted laser radiation is unlikely to be viewed with optical instruments, the radiant power (W) or radiant energy (J) detectable through a circular aperture stop having a diameter of 7 millimeters and within a circular solid angle of acceptance of 1*10-3 steradian with collimating optics of 5 diopters or less. For scanned laser radiation, the direction of the solid angle of acceptance shall change as needed to maximize detectable radiation, with an angular speed of up to 5 radians/second. A 50 millimeter diameter aperture stop with the same collimating optics and acceptance angle stated above shall be used for all other laser products. (ii) The irradiance (W cm-2) or radiant exposure (J cm-2 equivalent to the radiant power (W) or radiant energy (J) detectable through a circular aperture stop having a diameter of 7 millimeters and, for irradiance, within a circular solid angle of acceptance of 1**10-3 steradian with collimating optics of 5 diopters or less, divided by the area of the aperture stop (cm-2). (iii) The radiance (W cm-2 sr-1) or integrated radiance (J cm-2sr-1) equivalent to the radiant power (W) or radiant energy (J) detectable through a circular aperture stop having a diameter of 7 millimeters and within a circular solid angle of acceptance of 1*10-5steradian with collimating optics of 5 diopters or less, divided by that solid angle (sr) and by the area of the aperture stop (cm-2).

In general, for embodiments of laser-mechanical and laser earth moving, tunneling, boring, road-working, mining and quarrying equipment, they may have, and it is preferable that embodiments include, for example, protective housing or shields, safety interlocks, remote interlock connectors, key controls, emission indicators, beam attenuators, remote controls, remote camera and display systems for viewing the laser and laser-mechanical operations and work zones, scanning safeguards, warning signs, stickers and designations and combinations and variations of these. Examples of some embodiments of control and monitoring systems for high power laser systems and operations are disclosed and taught in Published U.S. Patent Application Publication Numbers: 2012/0248078 and 2012/0273269, the entire disclosures of each of which are incorporated by reference herein.

The protective housing or shielding may be of an expandable or deployable nature, or it may be fixed. If deployable, it may be expanded or positioned, against the floor, walls, and roof of a shaft or opening to optically seal, or substantially optically seal, the area of laser operation. In this manner the expandable or deployable shield prevents excess laser light form escaping the shield, and optically contained area, where the laser operation is being performed. These expandable shields may be made out of composite materials, metal and carbon fiber bases materials to name a few. It is preferred that the materials that are used have a high absorption for the wavelength(s) of laser energy that are being used, have sufficient durability and heat resistance that they are not quickly (instantly) destroyed if the laser beam should strike them, and they should be durable enough and conformable enough to for optical seals against the surrounding material. In the expandable type of shield, for example, they could be made from an expandable shirt, such as the shirts that are used in hovercraft. They may also be made from material and technology used in oil field packers, and packer systems; if they are inflated with a fluid, expanded, or if internal void spaces are present, they may be preferably be filled with fluid, or other material that is absorbent, and more preferably highly absorbent to the laser wavelengths being used. They may be made out of steel, metal, carbon-based material and may be multi-layer and multi-material based.

Figure 16A:
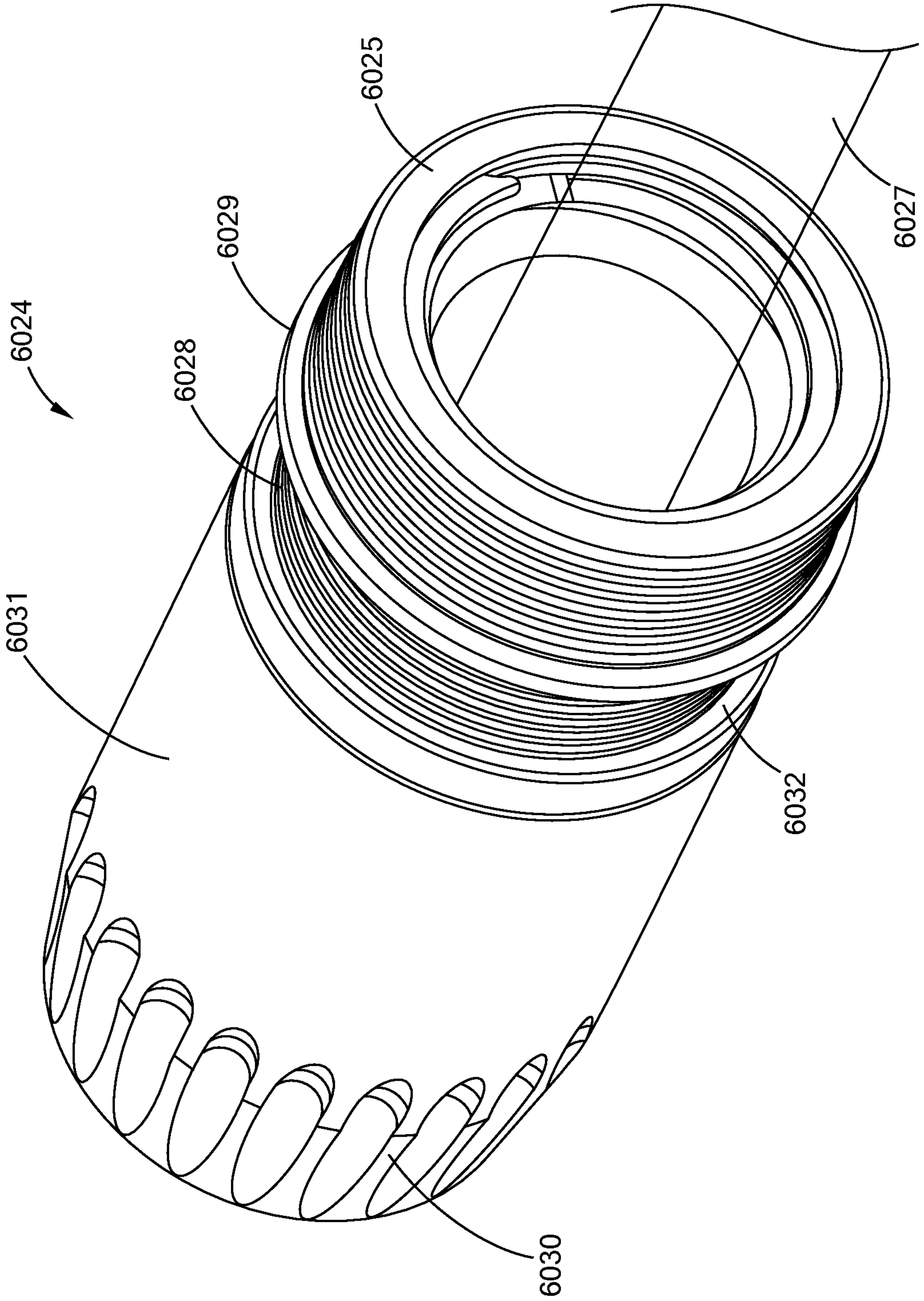
FIGS. 16A to 16D are views of an embodiment of an optics package in accordance with the present invention.

Turning to FIG. 16A to 16D there is shown an embodiment of an adjustable optics package that may be used in a laser cutting tool. FIG. 16A is a perspective view of the adjustable optics package 6024 with a laser beam 6027 being propagated, e.g., fired, shot, delivered, from the front (distal) end 6025 of the optics package 6024. The optics package 6025 has an adjustment body 6028 that has a fixed ring 6029. The adjustment body 6029 is adjustably, e.g., movably, associated with the main body 6031 of the optics package 6024, by threaded members. There is also a locking ring 6032 on the adjustment body 6025. The locking ring 6025 is engageable against the main body to lock the adjustment body 6028 into position.

A preferable configuration, and use, for an adjustable optics package will be for use with a 300 m optic system so that the beam waist can be driven, e.g., advanced forward by changing focal length, into the borehole as the borehole advances.

Figure 16B:
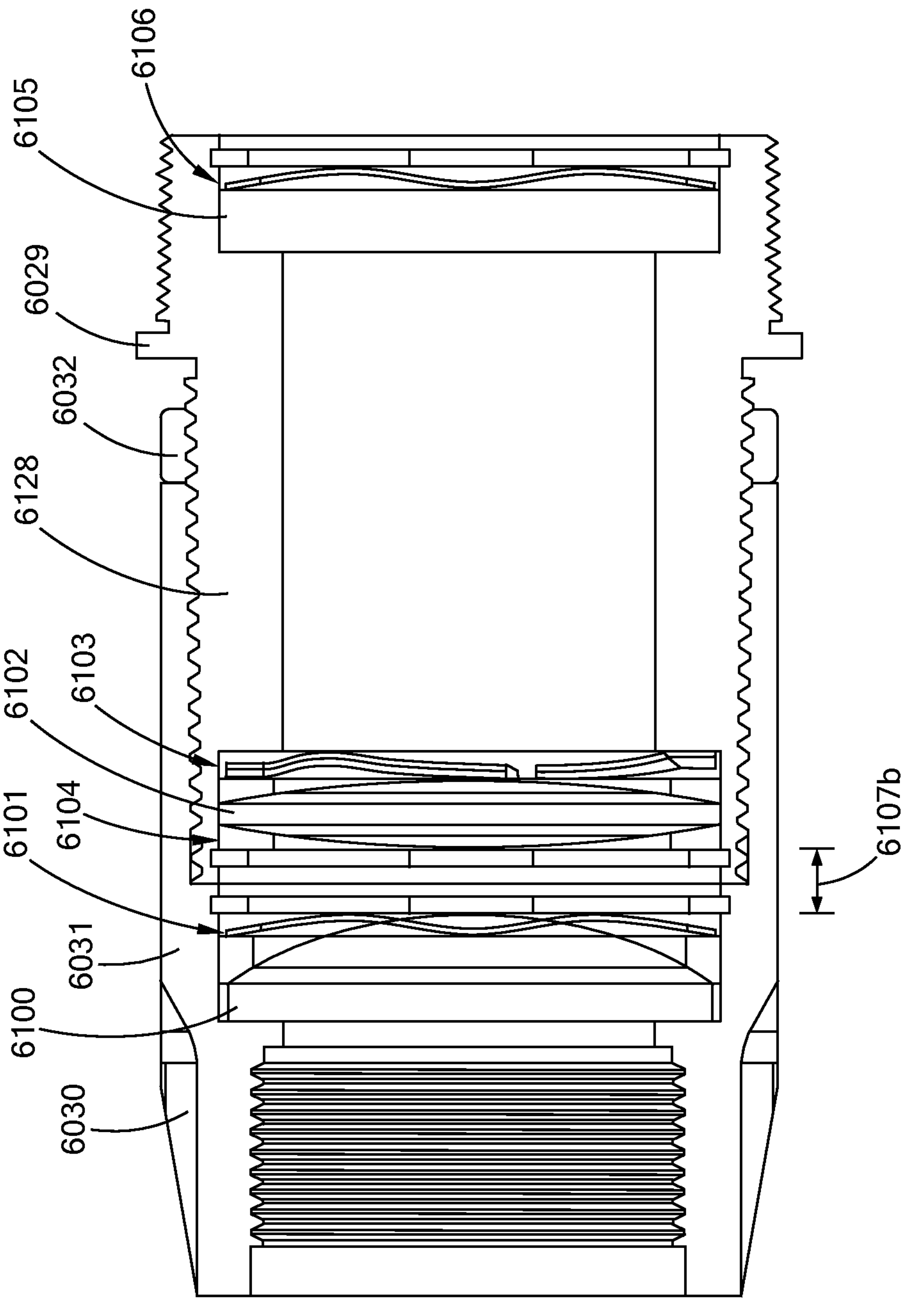
Figure 16C:
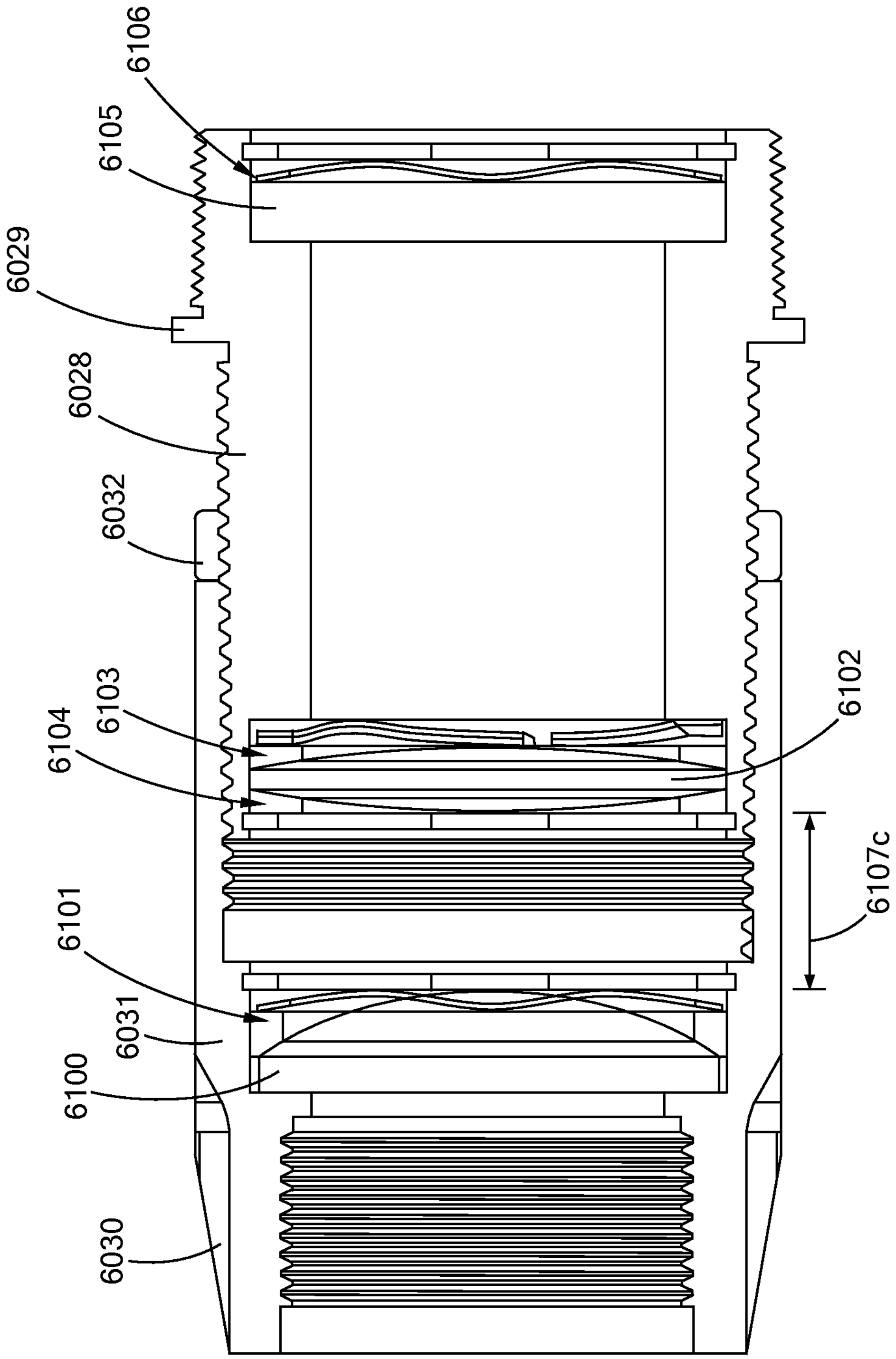
Figure 16D:
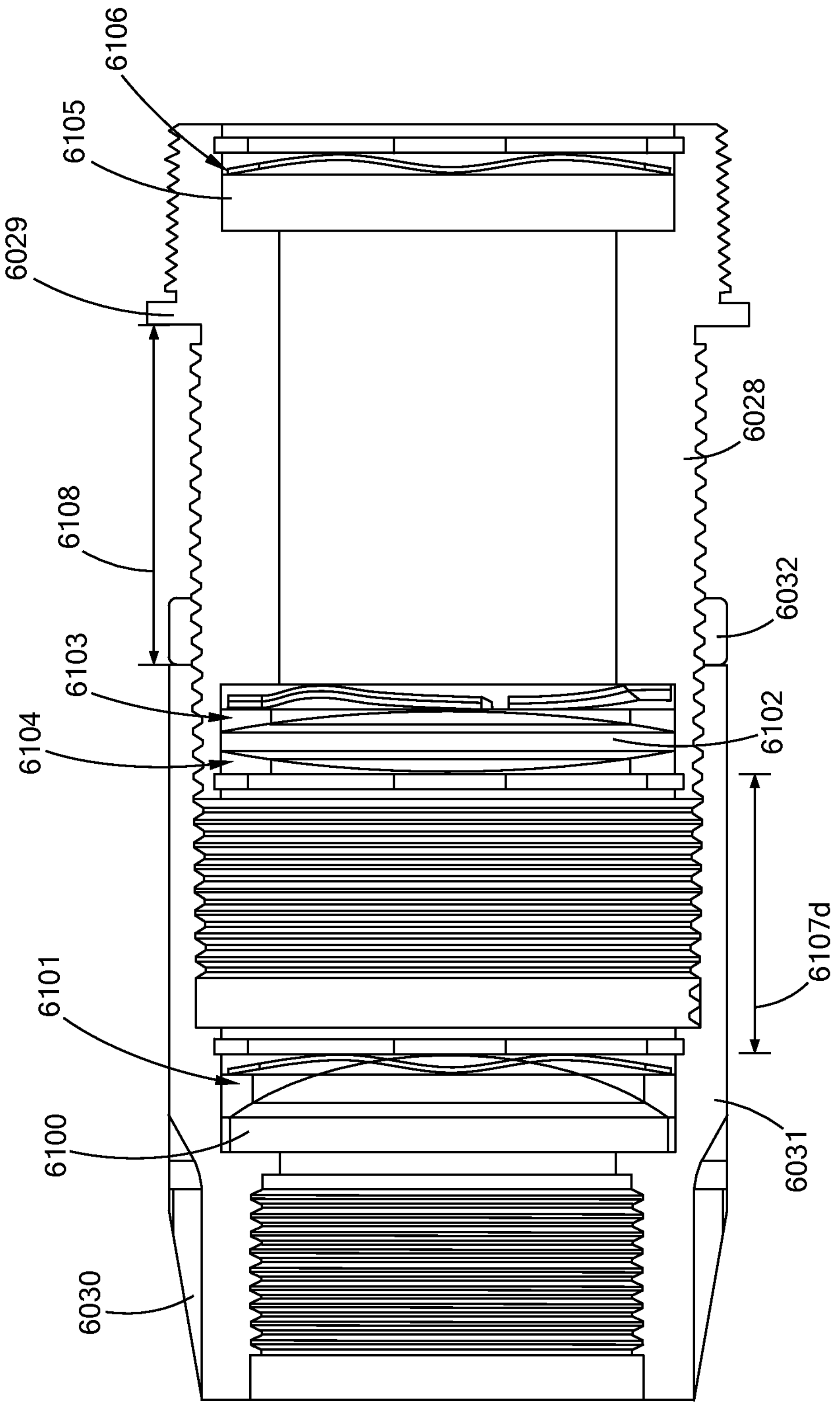

Turning to FIGS. 16B to 16D, there are shown cross sectional views of the embodiment of FIG. 16A in different adjustment positions. Thus, there is provided a first focusing lens 6100, which is held in place in the main body 6031 by lens holding assembly 6101. Thus, lens 6100 is fixed, and does not change position relative to main body 6031. A second focusing lens 6102 is held in place in the adjustment body 6028 buy holding assemblies 6103, 6104. Thus, lens 6102 is fixed, and does not change position relative to the adjustment body 6028. Window 6105 is held in place in the front end 6025 of the adjustment body 6028 by holding assembly 6106. In this manner as the adjustment body 6028 is moved in and out of the main body 6031 the distance, e.g., 6107*b*, 6107*c*, 6107*d*, between the two lens 6100, 6102 changes resulting in the changing of the focal length of the optical system of the optics package 6024. Thus, the optical system of optics package 6024 can be viewed as a compound optical system.

In FIG. 16B the two lenses 6100, 6102 are at their closest position, i.e., the distance 6107*b* is at its minimum. In FIG. 16C the two lenses 6101, 6102 are at a middle distance, i.e., the distance 6107*c* is at about the mid point between the minimum distance and the maximum distance. In FIG. 16D the two lenses 6101, 6102 are at their furthest operational distance, i.e., the distance 6107*d* is the maximum distance that can operationally be active in the optics assembly. (It should be noted that although the adjustment body 6028 could be moved out a little further, e.g., there are a few threads remaining, to do so could compromise the alignment of the lenses, and thus, could be disadvantages to the performance of the optics package 6024.)

Figure 28:
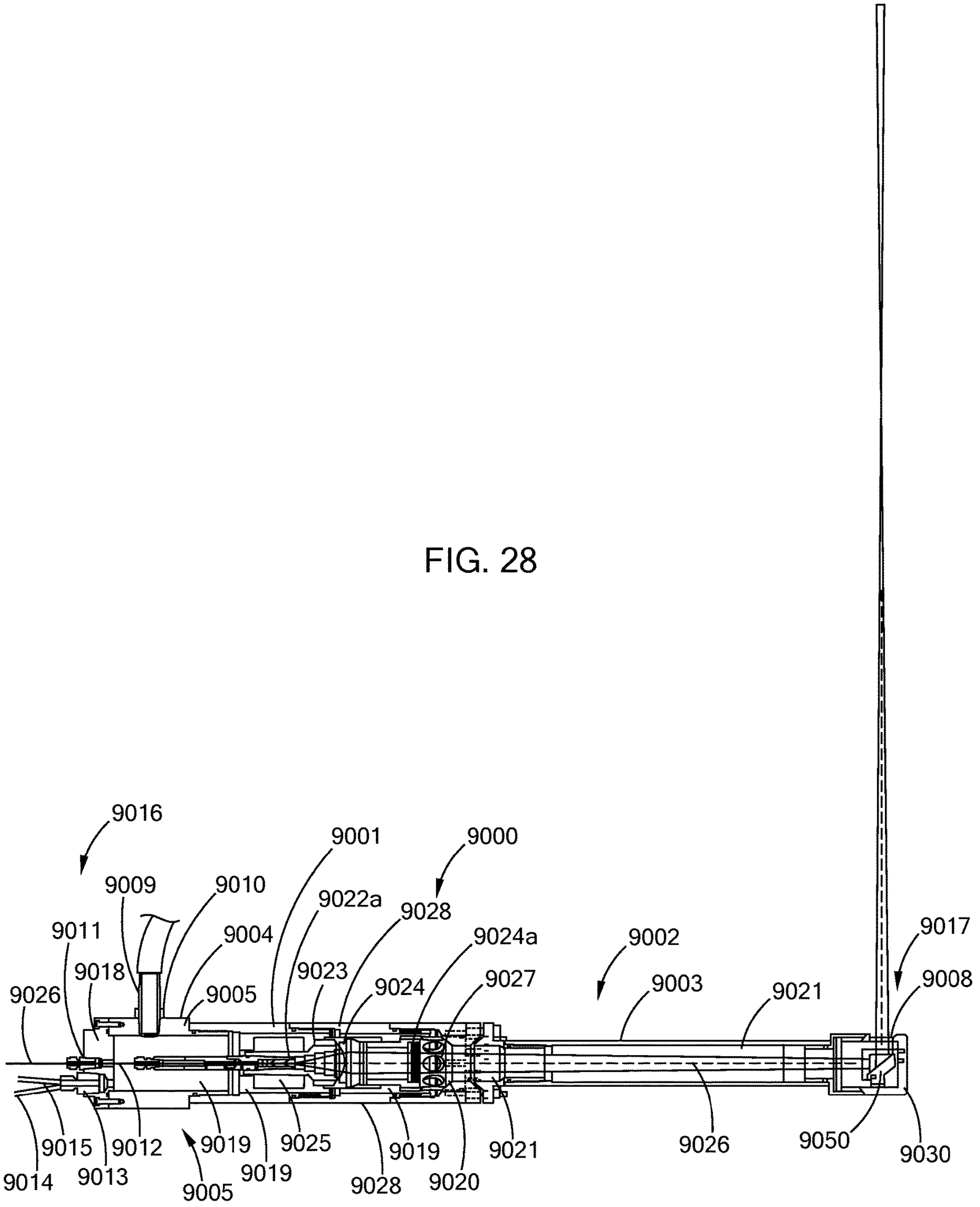
FIG. 28 is a cross-sectional view of an embodiment of a long stand off distance high power laser cutting tool in accordance with the present invention.

In the embodiment of FIG. 28, there is provided a schematic cross section of a right angle cutting tool 9000 that may be useful, for example in perforating borehole side walls for the purpose of increase the production of hydrocarbons or the flow of a geothermal heat source into the borehole, or that may be used to cut pipe, or any other structure or target material that is not axially aligned with the tool body. The cutting tool 9000 has a gas inlet section body 9005, has a gas inlet line 9009 and connector 9010, for securing the gas inlet line 9009 to the gas inlet section body 9005. The gas inlet section body 9005 has a back end piece 9018, which has a fitting 9011 for an optical fiber cable 9012. The back end piece 9018, also has an auxiliary fitting 9013 for data line 9014, and data line 9015. There is a gas flow passage 9019 that channels the gas from the gas inlet line 9009 along the length of the tool, around the exterior of a series of optical components. The gas flow is than transitioned, by gas flow carryover section 9020, from a location exterior to the optical components to gas flow passage 9021, which is positioned in, on and associated with the laser beam path 1026, where the gas then exits the optics section body 9028 travels along beam tube 9003 in beam tube section 9002 to prism section 9030, having TIR prism 9050, and exits through the distal end 9017 of the tool 9000 through opening 9008. The gas flow passage 9019 is within the gas inlet section body 9005 and the optics section body 9028 of the tool 9000. The optical section body 9028 is made of up several bodies that are threaded together. The back end of the optical section body 9028 is connected by a threaded connection to the front end of the gas inlet section body 9005. The front end of optical section body 9028 is attached by threaded members, e.g., bolts, to the laser discharge section body 9003.

Generally, the various body sections of the tool 9000 may be separate components or they may be integral. They may be connected by any means available that meets the use requirements for the tool. Preferably, the tool, as assembled, should be sufficiently rigid to withstand anticipated vibration and mechanical shocks so that the optical components will remain in optical alignment. The tool body, body section, the beam tube and the prism section may be made from a single component or tube, it may be made from two, three or more components that are fixed together, such as by threaded connections, bolts, screws, flanges, press fitting, welding, etc. Preferably, the tool, as assembled, should meet the anticipated environmental conditions for an intended use, such as temperature, temperature changes, moisture, weather conditions, and dust and dirt conditions. The tool body, body sections, and beam tube, and prism sections may be made from metal, composite materials, or similar types of materials that provide the requisite performance capabilities.

The optical fiber cable 9012 extends into the gas inlet section body 1005 and the gas flow passage 9019. The optical fiber cable 9012 is optically and mechanically associated with optical connector 9022, which is positioned in optical connector receptacle 9023. The optical connector receptacle has a plurality of fins, e.g., 9025, which extend into gas flow passage 9019, and which provide cooling for the optical connector 9022 and the optical connector receptacle 9023. The laser beam path is represented by dashed line 9026, and extends from within the core of the optical fiber cable 9012 to a potential target or work surface. (The totality of the optical path would start at the source of the laser beam, and extend through all optical components, and free space, that are in the intended path of the laser beam.) At the distal end 9022*a* of optical connector 9022, the laser beam path 9026 is in free space, e.g., no solid components are present, and travels from the distal connector end 9022*a* to the optics package 9024, where the laser beam is optically manipulated to predetermined laser beam parameters for providing long stand off distance capabilities. The laser beam path 9026 exits the distal end 9024*a* of the optics package 9024, and travels in free space in the flow carry over section 9020, in the front section of the optical section body 9028, and into beam path tube section 9003 which has beam tube 9003, and enters TIR prism 9050 where it is reflected at a right angle, exiting through opening 9008. In operation the laser beam 9027 would be propagated by a laser, e.g., a source of a laser beam, and travel along the laser beam path 9026. The TIR (total internal reflection) prism 9050 is of the type taught and disclose in U.S. Patent Application Ser. No. 61/605,434 the entire disclosure of which is incorporated herein by reference, and which can be configured to provide other angles in addition to 90°.

Other types of reflective mirrors may be used. Thus, the mirror may be any high power laser optic that is highly reflective of the laser beam wavelength, can withstand the operational pressures, and can withstand the power densities that it will be subjected to during operation. For example, the mirror may be made from various materials. For example, metal mirrors are commonly made of copper, polished and coated with polished gold or silver and sometime may have dielectric enhancement. Mirrors with glass substrates may often be made with fused silica because of its very low thermal expansion. The glass in such mirrors may be coated with a dielectric HR (highly reflective) coating. The HR stack as it is known, consists of layers of high/low index layers made of $SiO_2$, $Ta_2O_5$, $ZrO_2$, MgF, $Al_2O_3$, $HfO_2$, $Nb_2O_5$, $TiO_2$, $Ti_2O_3$, $WO_3$, SiON, $Si_3N_4$, Si, or $Y_2O_3$ (All these materials would work for may wave lengths, including 1064 nm to 1550 nm). For higher powers, such as 50 kW actively cooled copper mirrors with gold enhancements may be used. It further may be water cooled, or cooled by the flow of the gas. Preferably, the mirror may also be transmissive to wavelengths other than the laser beam wave length. In this manner an optical observation device, e.g., a photo diode, a camera, or other optical monitoring and detection device, may be placed behind it.

In the embodiment of the tool in FIG. 28, the distance between the TIR prism and the distal end 1024*a* of the optics package can be about greater than 1 cm, greater than about 10 cm, greater than about 100 cm, and greater than about 1,000 cm depending in part upon the focal lengths, which for example could be greater than about 100 cm, greater than about 1,000 cm, and greater than about 2,000 cm.

Further examples and types of long laser cutting tools, optic assemblies, laser beam paths, and laser beam delivery assemblies are taught and disclosed in U.S. patent application Ser. No. 14/080,722 the entire disclosure of which is incorporated by reference.

The nozzles or distal end opening of the tools may have opens of about 1 cm diameter for a focusing optic with a short focal length to 40 cm diameter for the long focal length optics assemblies.

EXAMPLES

The following examples are provide to illustrate various devices, tools, configurations and activities that may be performed using the high power laser tools, devices and system of the present inventions. These examples are for illustrative purposes, and should not be view as, and do not otherwise limit the scope of the present inventions.

Example 1

The laser mechanical tunneling machine of the embodiment of FIG. 1 has 8 laser cutting tools of the general type shown in FIG. 11A, each tool has an adjustable optics package of the type shown in FIG. 16A-16D, and the focal length of each tool is adjusted to 1,000 mm. Each laser tool is connected to a fiber laser system capable of providing a 40 kW laser beam. The fiber laser system provides a multimode continuous laser beam having a wavelength of about 1070 nm. Each laser tool is connected to the fiber laser system by way of an optical fiber having a core of about 300 μm, a conventional water cooled connector is used to launch the laser beam into the focusing optical elements of the optics package of the laser tool. The connector at the end of the fiber has an NA of 0.22 at the laser beam launch face (distal end) of the connector. Each laser beam when fired provides a spot size having diameter and a power density of at the proximal surface of the proximal focusing lens in the optics package. Each optics package contains a lens configured to correct for aberrations in the beam path introduced by other elements in the optics package and along the laser beam path.

Example 2

Figure 17A:
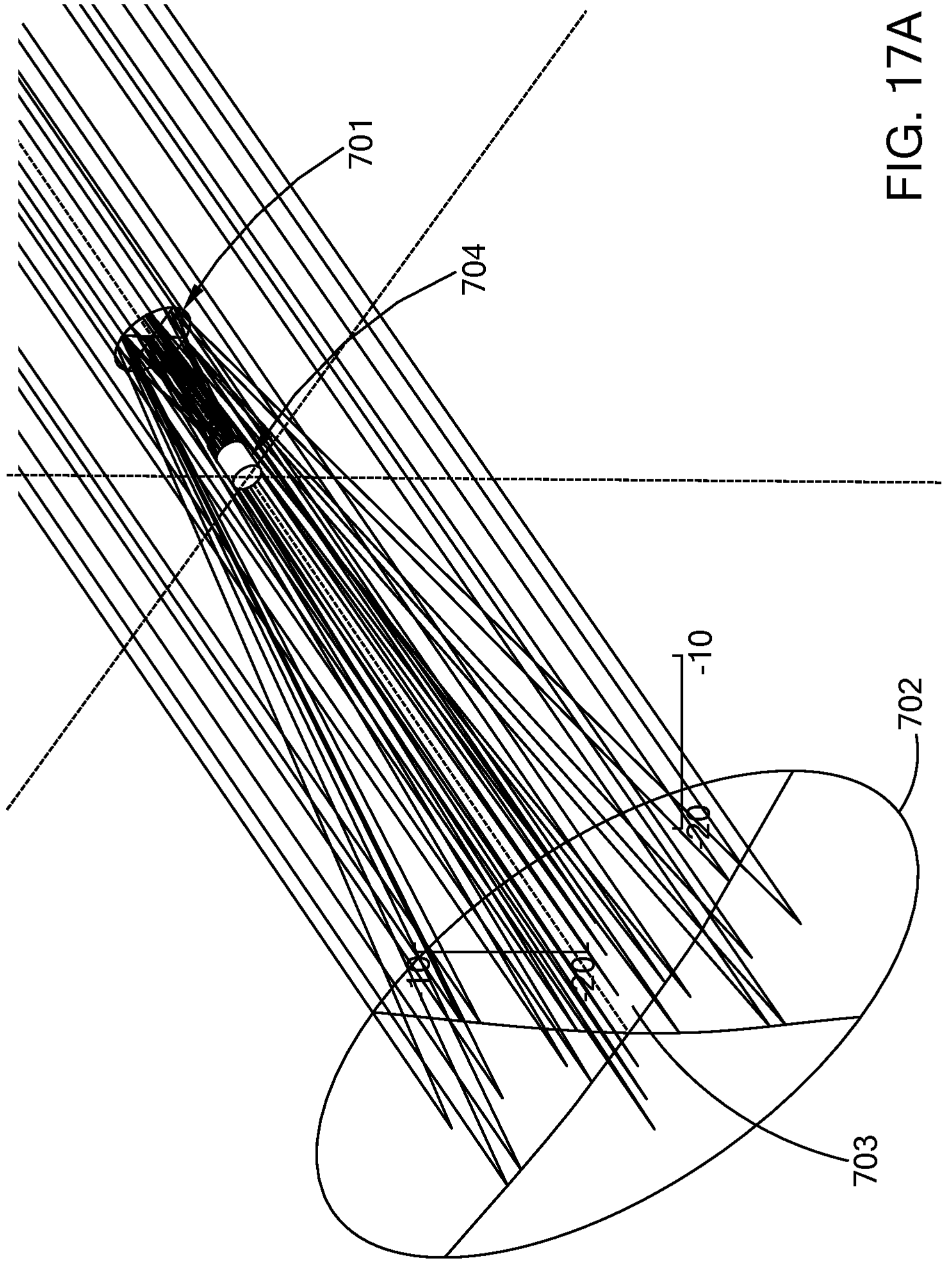
FIG. 17A is a perspective view of an optics assembly and beam ray trace pattern in accordance with the present invention.
Figure 17B:
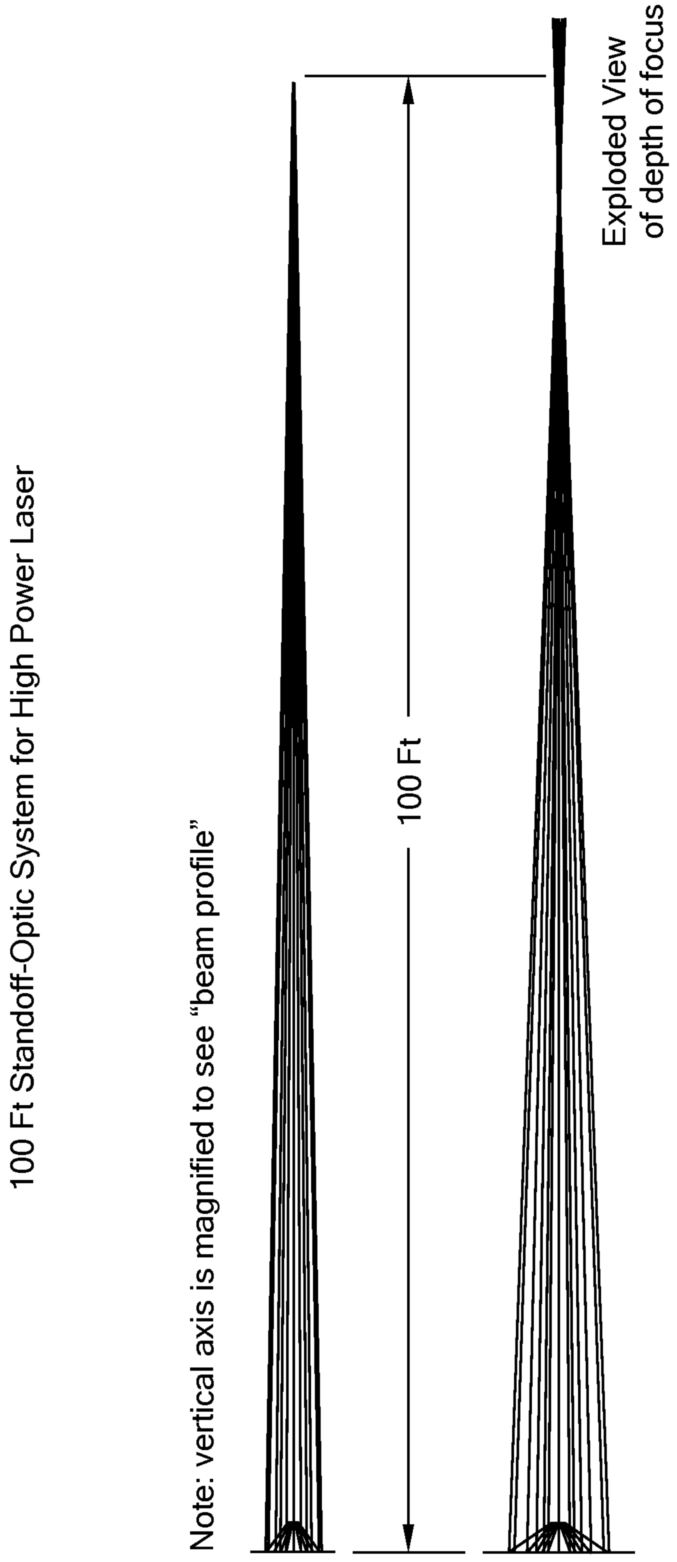
FIG. 17B is a cross sectional view of the laser beam of FIG. 17A.
Figure 17C:
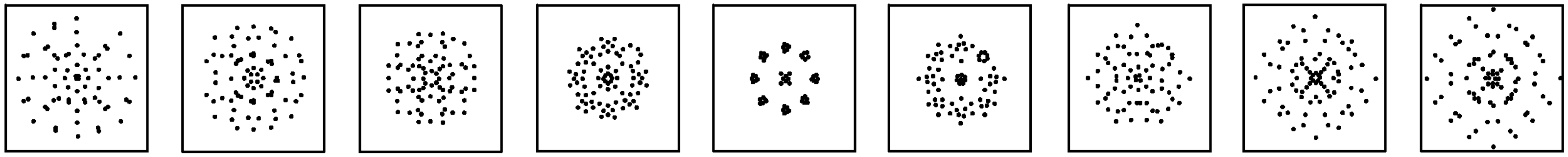
FIG. 17C is a view of the laser beam pattern of the laser beam of FIG. 17A.

An embodiment of an optics assembly for providing a high power laser beam for cutting and drilling a target material from a stand off distance of 100 feet is provided in FIGS. 17A to 17C, this optics assembly is located in the laser cutting tool of the embodiment of FIG. 26. Turning to FIG. 17A there is shown a perspective schematic view of an optics assembly having two mirrors 701, 702, which their reflective surfaces facing each other. A high power laser cable 703 having a single optical fiber having a core of about 200 μm extends through the center of mirror 702 to a beam launch assembly 704. The NA of the distal face of the beam launch assembly is 0.22. The beam launch assembly 704 launches a high power laser beam, having 20 kW of power in a pattern shown by the ray trace lines, to a secondary mirror 701. The secondary mirror 701 is located 11 cm from the launch or distal face of the beam launch assembly 704. The secondary mirror 701 has a diameter of 2" and has its convex reflective surface facing proximally, i.e., toward the distal end of the laser launch assembly 704. The secondary mirror has a radius of curvature 143 cm. The laser beam, as shown by the ray trace lines, is directed proximally, and focused (negative focus) away from the secondary mirror 701, in a manner in which the laser beam passes around, e.g., past the laser launch assembly 704. As shown in the FIGS. 17A and 17B, the laser beam, as shown by the ray trace lines, travels from the second mirror to the primary mirror 702. (FIG. 17B is a cross sectional view and ray trace diagram of the laser beam and beam path 700. In FIG. 17B the vertical dimension has been enlarged to better see the ray lines of the beam and beam path 700*a*, thus enlarged primary mirror 702*a*, enlarged secondary mirror 701*a*, and the focal plane 760 are shown.) The primary mirror has its concave reflective surface facing distally, i.e., toward the secondary mirror 701. The primary mirror 702 has a diameter of 18" and a radius of curvature of 135 cm. The laser beam, as shown by the ray trace lines, is directed and focused away from the primary mirror 702, in a manner in which the laser beam passes around, e.g., past the secondary mirror 701. In this manner the laser beam is launched from the launch assembly 704 in a diverging or expanding beam profile, where it strikes the convex surface of the secondary mirror 701, and is directed back proximally past the launch assembly 704 (without striking it), leaving the secondary mirror 701 the beam continues to be in a diverging or expanding beam profile, until it strikes the primary mirror 702. The primary mirror is shaped, based upon the incoming beam profile, to provide for a focal point 100 feet from the face the primary mirror.

Turning to FIG. 17C, there is shown the laser beam delivery pattern of the assembly of FIG. 17A, along various points in the beam waist. The patterns 770*a* to 770*i* show cross sections of the laser beam, e.g., a spot, taken at various axial locations along the laser beam path, e.g., the length of the laser beam. These cross sections show the pattern within the laser beam shot if the beam were to strike a target at that location in the laser beam path. Thus, pattern 770*a* is four feet away from the focal plane 760 in a direction toward the optics (e.g., 996 along the beam path). The beam patterns 770*a*, 770*b*, 770*c*, 770*d*, 770*e*, 770*f*, 770*g*, 770*h*, 770*i* are taken along the beam waist moving away from the launch face of the optics to a location 770*i* that is four feet from the focal plane (e.g., 104 feet along the beam path from the focusing lens). The laser beam delivery profile 770*e* provides for a very tight spot in the focal plain 760, the spot having a diameter of 1.15 cm. Moving in either direction from the focal plane 760, along the beam waist, it can be seen that for about 4 feet in either direction (e.g., an 8 foot preferred, e.g., optimal, cutting length of the laser beam) the laser beam spot size is about 2 cm, 770*a*, 770*i*. For cutting rock, it is preferable to have a spot size of about ¾" or less (1.91 cm or less) in diameter (for laser beam having from about 10 to 40 kW).

Example 2a

Figure 21A:
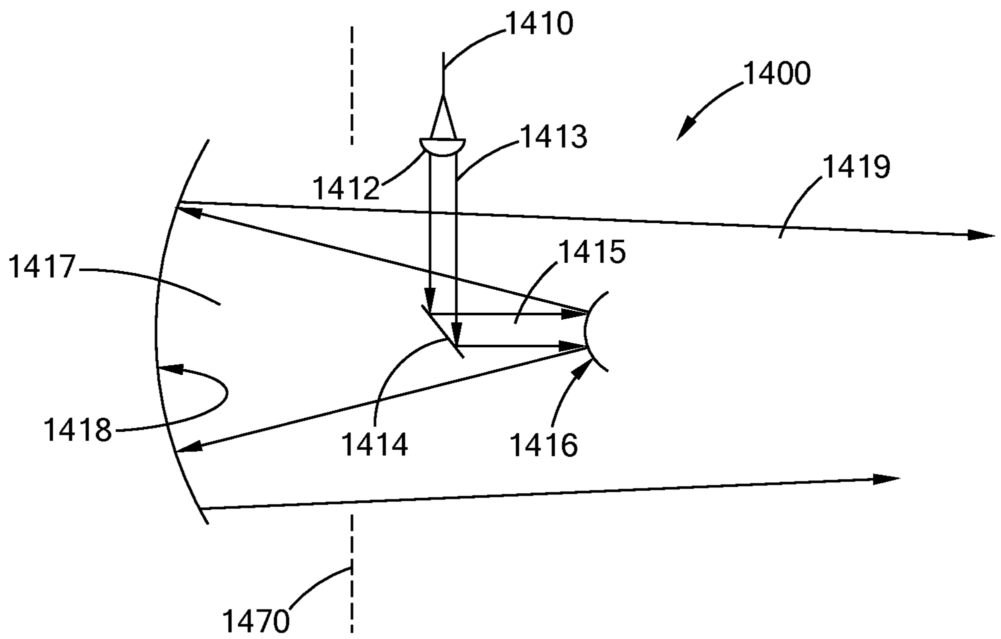
FIG. 21A is a cross section side schematic view of an embodiment of a two lens long distance laser optics assembly in accordance with the present invention.
Figure 21B:
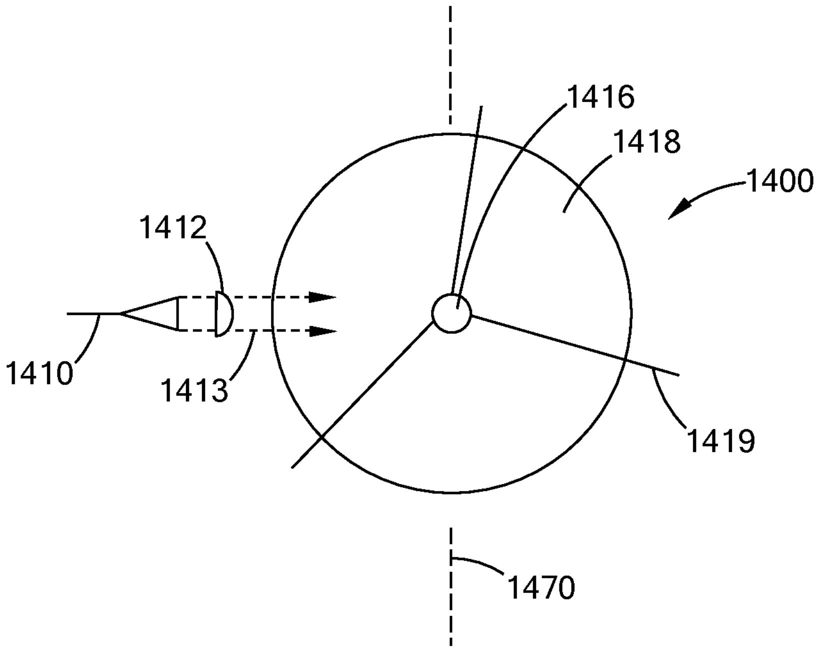
FIG. 21B is a plan view of the assembly of FIG. 21A.
Figure 22:
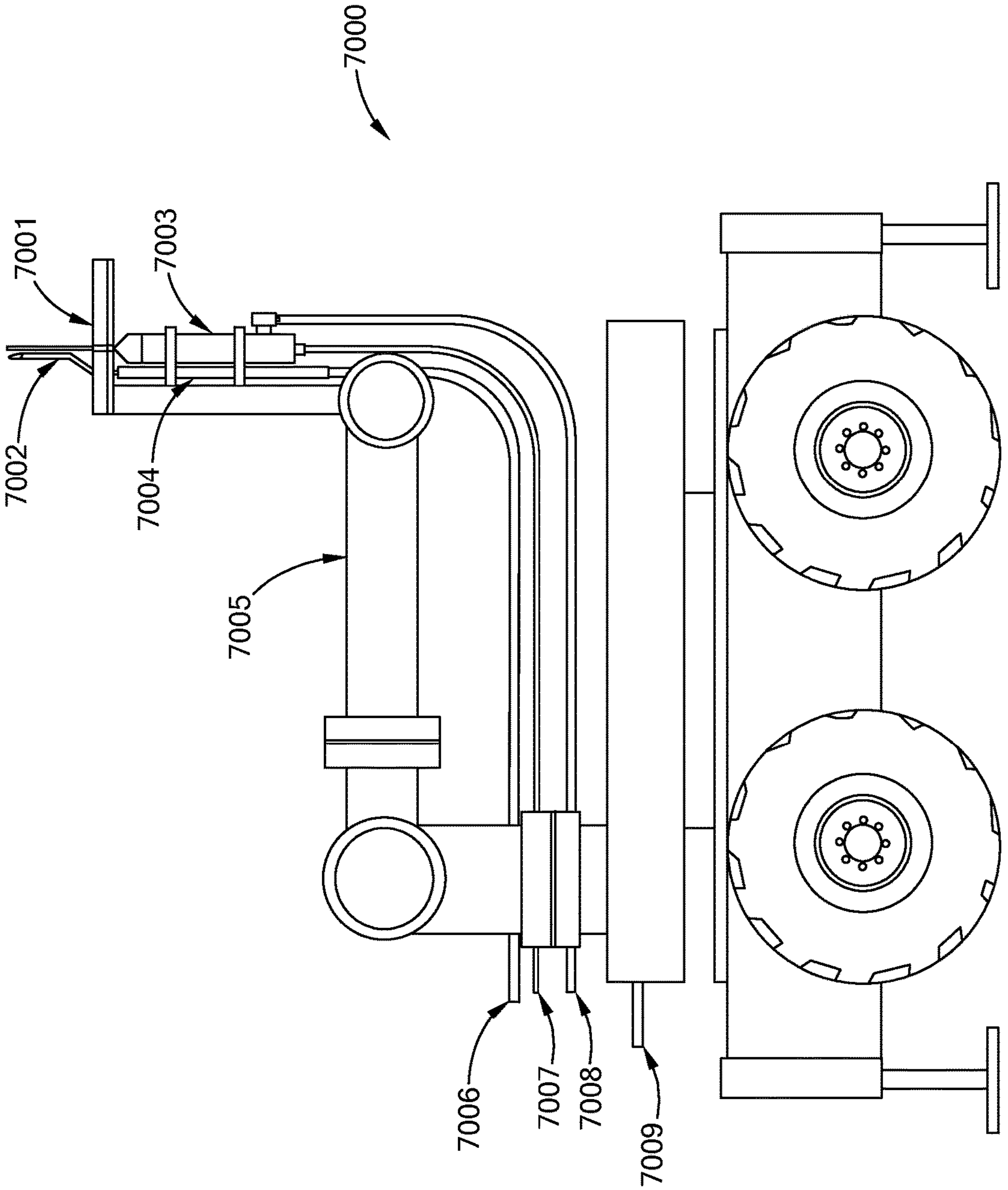
FIG. 22 is a schematic of an embodiment of a laser mining robot in accordance with the present inventions.

FIGS. 21A and 21B provides a side cross section schematic view and a front on view of an embodiment of a divert, convergent lens assembly along the lines of EXAMPLE 2, having a 45 degree reflector to handle and direct the incoming laser beam in collimated space, which is used with a laser cutting tool system of the type shown in FIG. 26. FIG. 21A provides a side view of this optics assembly 1400, with respect to the longitudinal axis 1470 of the tool. FIG. 21B provides a front view of optics assembly 1400 looking down the longitudinal axis 1470 of the tool. As best seen in FIG. 14A, where there is shown a side schematic view of an optics assembly having a fiber 1410 with a connector launch a beam into a collimating lens 1412. The collimating optic 1412 directs the collimated laser beam along beam path 1413 toward reflective element 1414, which is a 45° mirror assembly. Reflective mirror 1414 directs the collimated laser beam along beam path 1415 to diverging mirror 1416. Diverging mirror 1416 directs the laser beam along diverging beam path 1417 where it strikes primary and long distance focusing mirror 1418. Primary mirror focuses and directs the laser beam along the operational, e.g., cutting, laser path 1429 toward the face of the target material e.g., a rock face, quarry face, cement and/or target (not shown) to be cut. Thus, the two mirrors 1416, 1418, have their reflective surfaces facing each other. The diverging (or secondary) mirror 1416 supports, e.g., 1419 are seen in FIG. 21B.

In an example of an embodiment of this optical assembly, the fiber may have a core of about 200 μm, and the NA of the connector distal face is 0.22. The beam launch assembly (fiber 1410/connector) launches a high power laser beam, having 20 kW of power in a pattern shown by the ray trace lines, to a secondary mirror 1416. The diverging mirror 1416 is located 11 cm (as measured along the total length of the beam path) from the launch or distal face of the beam launch assembly. The secondary mirror 1416 has a diameter of 2" and a radius of curvature 143 cm. For distances of about 100 feet the primary mirror 1418 has a diameter of 18" and a radius of curvature of 135 cm. In this embodiment the primary mirror is shaped, based upon the incoming beam profile, to provide for a focal point 100 feet from the face of the primary mirror. This configuration can provided a very tight spot in the focal plain, the spot having a diameter of 1.15 cm. Moving in either direction from the focal plane, along the beam waist, for about 4 feet in either direction (e.g., an 8 foot optimal cutting length of the laser beam) the laser beam spot size is about 2 cm. For cutting rock, it is preferable to have a spot size of about ¾" or less (1.91 cm or less) in diameter (for laser beam having from about 10 to 40 kW). In an example of an embodiment during use, the diverging mirror could have 2 kW/cm$^2$ and the primary mirror could have 32 W/cm$^2$ of laser power on their surfaces when performing a laser perforation operation.

Example 2b

In this embodiment a 20 kW laser beam is launched into the laser optics assembly of the embodiment of Example 2, the secondary mirror would have 1 kW/cm$^2$ and the primary mirror would have 16 W/cm$^2$. 16 of these laser delivery assemblies are located around the inner surface of the kerf cutting ring of an embodiment of FIG. 1

Example 2c

In this embodiment a 40 kW laser beam is launched into the laser optics assembly of the embodiment of Example 2, the secondary mirror would have 2 kW/cm$^2$ and the primary mirror would have 32 W/cm$^2$. 12 of these laser delivery assemblies are located around the inner surface of the kerf cutting ring of an embodiment of FIG. 1. 4 of these laser delivery assemblies are also located more centrally, and directed generally toward the center of the tunnel wall being bored.

Example 2d

In this embodiment a 40 kW laser beam is launched into the laser optics assembly of the embodiment of Example 2a, the diverging (secondary) mirror would have 2 kW/cm$^2$ and the primary mirror would have 32 W/cm$^2$, which is used with a laser cutting tool system of the type shown in FIG. 26.

Example 2e

In this embodiment 3 optical assemblies of the configuration of Example 2a are used, with a separate fiber each providing a 20 kW laser beam to the assemblies. The three assemblies are positioned to direct three laser beams into a 2 cm$^2$ spot, having a combined power of about 60 kW at a distance of 100 feet from the tool, which is used with a laser cutting tool system of the type shown in FIG. 26

Example 2f

In this embodiment 3 optical assemblies of the configuration of Example 2a are used, with a separate 200 μm core fiber, each providing a 40 kW laser beam to the assemblies. The three assemblies are positioned to direct three laser beams into a 2 cm$^2$ spot, having a combined power of about 120 kW at a distance of 100 feet from the tool.

Example 3

Turning to FIG. 18, there is shown a schematic of an embodiment of an optical assembly for use in an optics package, having a launch face 801 from a connector, ray trace lines 802 show the laser beam exiting the face of the connector and traveling through four lens, lens 810, lens 820, lens 830, lens 840. In this embodiment lens 810 minimizes the aberrations for the lens 810-820 combination, which combination collimates the beam. Lens 830 and 840 are the focusing lenses, which focus the laser beam to a focal point on focal plane 803. Lens 840 minimizes the spherical aberrations of the 830-840 lens pair. The distances from the launch face 801 of the connector to the various lens are set forth in FIG. 18.

Differing types of lens may be used, for example in an embodiment Lens 830 has a focal length of 500 mm and lens 840 has a focal length of 500 mm, which provide for a focal length for the optics assembly of 250 mm. The NA of the connector face is 0.22. Lens 810 is a meniscus (f=200 mm). Lens 820 is a plano-convex (f=200 mm). Lens 830 is a plano-convex (f=500 mm). Lens 840 is a menisus (f=500 mm).

Example 4

Turning to FIG. 18A there is a table setting forth the types of lens that may be used in an embodiment of the optics assembly of the type shown in FIG. 18. In this embodiment Lens 3 has a focal length of 500 mm and lens 4 has a focal length of 500 mm, which provide for a focal length for the optics assembly of 250 mm. The NA of the connector face is 0.22. Lens 1 is a meniscus (f=200 mm). Lens 2 is a plano-convex (f=200 mm). Lens 3 is a plano-convex (f=500 mm). Lens 4 is a menisus (f=500 mm).

Example 5

Turning to FIG. 18B, there is a table setting forth the types of lens that may be used in an embodiment of the optics assembly of the type shown in FIG. 8. In this embodiment only one focusing lens is used, lens 4. Lens 3 has been removed from the optical path. As such, the focal length for the beam provided by this embodiment is 500 mm.

Example 6

The embodiment of FIG. 19, 19A, has the lens configurations and types of the embodiment of FIG. 18, and has an actively cooled connector, for example a commercially available water-cooled QBH connector.

Example 7

In this embodiment the lens configuration and types of the embodiment of FIG. 18 are used and the connector is a passively cooled connector of the type disclosed and taught in U.S. patent application Ser. No. 13/486,795. These optics packages are used in the laser cutting tools of the embodiment of FIG. 3.

Example 8

In this embodiment lens 3 has a 1,000 mm focus and a diameter of 50.8 mm and lens 4 is not present in the configuration of FIG. 18, all other lens and positions remain unchanged, providing for an optical assembly that has a focal length of 1,000 mm. These optics packages are used in the laser cutting tools of the embodiment of FIG. 2.

Example 9

In this embodiment the lens configuration of the embodiment of FIG. 18 has a focal length in the 10 foot range (3,500 mm). These lens configurations are used in the laser cutting tools of the embodiment of FIG. 5.

Example 10

In this embodiment the lens configuration of FIG. 17A is used in the laser tools of the embodiment of FIG. 3 and have a focal length of in the 50 foot range.

Example 11

The embodiment of the system of FIG. 26, having a laser cutting tool of the type of the embodiment of FIG. 19, 19A delivers a crosshatched laser beam delivery pattern to a rock face in a mine. The laser beam has a power of 20 kW and a spot size of 2 cm at the rock face. The laser beam delivery pattern has a series of horizontal planer cuts and a series of vertical planer cuts. These planar cuts intersect to form a crosshatched pattern. The distance between the vertical cuts, and the distance between the horizontal cuts is selected to provide for the laser-affected zones of each cut to be adjacent each other. Material is volumetrically removed from the rock face when the high power laser beam is delivered in this pattern.

Example 12

The embodiment of the system of FIG. 9, having a laser cutting tool of the type of the embodiment of FIG. 11 delivers a crosshatch laser beam delivery pattern having 100 essentially vertical planar cuts and 20 essentially horizontal planar cuts is delivered to the rock face of an open face mine. The laser beam has a focal point of 100 feet, a beam waist of about 2 cm and a depth of focus of about 8 feet. The laser beam has a beam angle of 10°. The laser beam has a power of 40 kW. The vertical planes of the pattern are cut first, by firing the laser at the top of the planar cut until the desired depth of the initial hole is achieved and then moving the laser beam down until the length of the cut, to depth has been completed. Once the vertical cuts have been done, the horizontal cuts are made.

Example 13

The embodiment of the system of FIG. 10, having a laser cutting tool of the type of the embodiment of FIG. 11, having optics of the type of FIG. 18 delivers a crosshatch laser beam delivery pattern having 300 essentially vertical planar cuts and 10 essentially horizontal planar cuts is delivered to the rock face in a subsurface mine. The laser beam has a focal point of 25 feet, a beam waist having a length of about 2.5 feet, and a maximum spot size diameter of about 2 cm. The laser beam has a beam angle of 15°. The laser beam has a power of 50 KW. The vertical planes of the pattern are cut first, by firing the laser at the top of the planar cut until the desired depth of the initial hole is achieved and then moving the laser beam down until the length of the cut, to depth has been completed. Once the vertical cuts have been done, the horizontal cuts are made.

Example 14

Figure 26A:
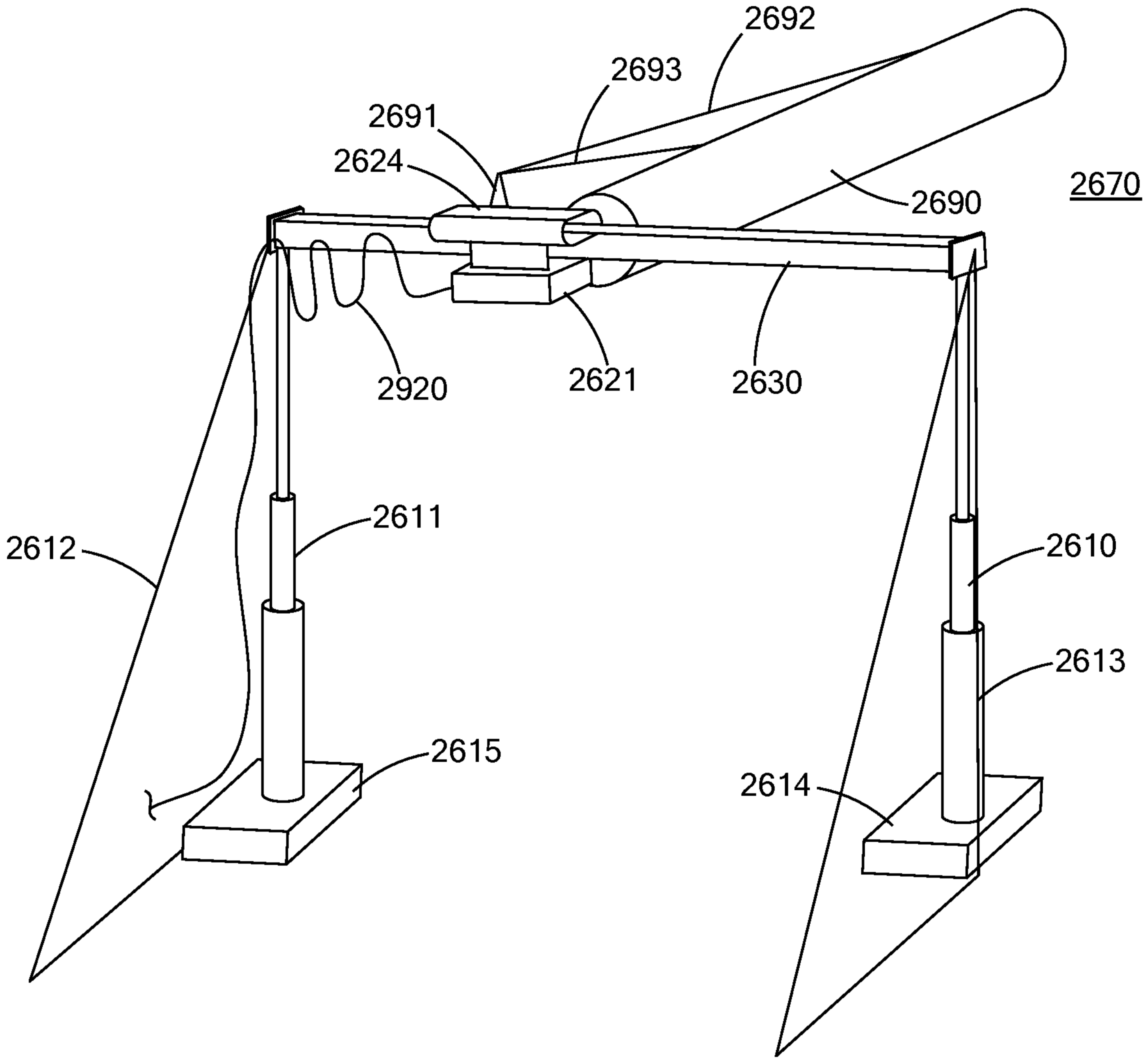
FIG. 26A is a perspective view of a laser shielded assembly of FIG. 26.

The embodiment of the system of FIG. 26A, having a laser cutting tool of the type of the embodiment of FIG. 11 having optics of the type of FIG. 21 delivers a crosshatch laser beam delivery pattern having 100 essentially vertical planar cuts and 20 essentially horizontal planar cuts is delivered to the rock face of an open face mine. The laser beam has a focal point of 100 feet, a beam waist having a length of 8 feet, and a maximum spot size diameter of about 2 cm. The laser beam has a beam angle of 10°. The laser beam has a power of 40 KW. The horizontal planes of the pattern are cut first, by firing the laser at the top of the planar cut until the desired depth of the initial hole is achieved and then moving the laser beam across until the length of the cut, to depth has been completed. Once the horizontal cuts have been done, the vertical cuts are made.

Example 15

Figure 2A:
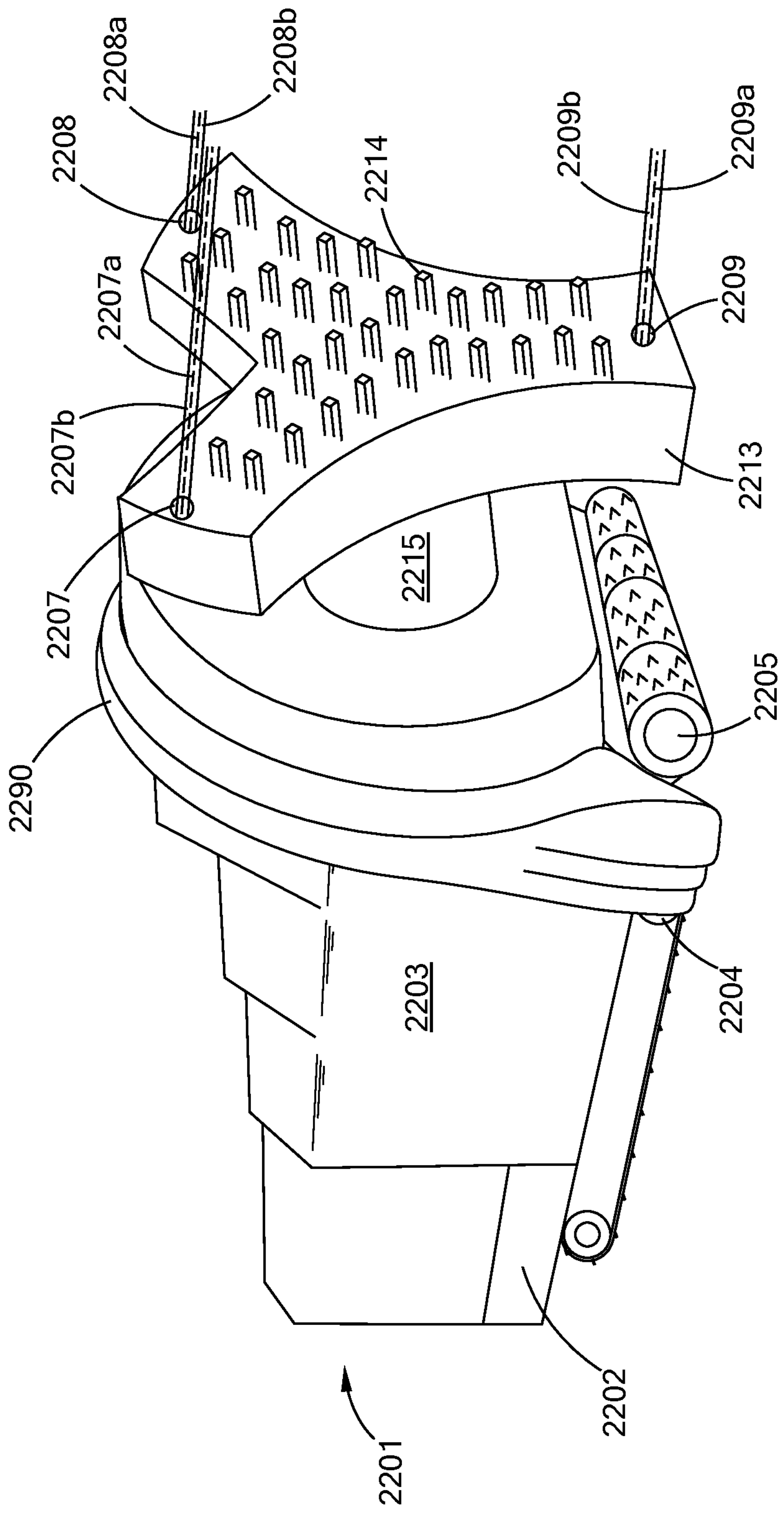
FIG. 2A is a perspective view of the machine of FIG. 2 having an embodiment of an optical shield in accordance with the present invention.

Turning to FIG. 2A there is shown an embodiment of the type of laser-mechanical tunneling machine having an extendable optical shield 2290. (All other components and numbers correspond to the embodiment of FIG. 2) During operation of the laser cutting tools the shield 2290 extends to and abuts the surrounding walls forming an optical barrier limiting the passage of any laser energy to less than the amounts of Table I The shield 2290 is an inflatable device comprising steel mesh, heavy rubber, and an outer surface designed to form an optical seal against the wall material as the equipment is advanced forward during laser tunneling operations.

Example 16

A laser tool was used to cut perforations in rock samples. The laser power was 15.3 kW, the beam angle was 15°, the standoff distance was 3 feet, and a laser tool of the general type shown in FIG. 11 was used.

| Run No. | Depth (in) | Time (s) | Rate (ft/hr) |
|---|---|---|---|
| Sandstone | | | |
| 1 | 2 | 210 | 2.86 |
| 2 | 4.5 | 210 | 6.43 |
| 3 | 4.75 | 210 | 6.79 |

-continued

| Run No. | Depth (in) | Time (s) | Rate (ft/hr) |
|---|---|---|---|
| Granite | | | |
| 1 | 9 | 330 | 8.18 |
| 2 | 9 | 230 | 11.74 |
| 3 | 9 | 255 | 10.59 |
| Brohm | | | |
| 1 | 12 | 720 | 5.00 |
| 2 | 12 | 720 | 5.00 |
| 3 | 12.5 | 745 | 5.03 |

Example 17

A laser tool was used to cut perforations in Brohm rock samples. The laser power was 15 kW, the beam angle was 15°, the standoff distances were varied, and a laser tool of the general type shown in FIG. 11 was used.

| Run No. | Depth (in) | Time (s) | Rate (ft/hr) |
|---|---|---|---|
| Standoff distance 3 ft | | | |
| 1 | 9.125 | 180 | 15.21 |
| 2 | 9.25 | 180 | 15.42 |
| Standoff distance 4.5 ft | | | |
| 1 | 8.9375 | 180 | 14.90 |
| 2 | 8.875 | 180 | 14.79 |
| Standoff distance 6 ft | | | |
| 1 | 8 | 180 | 13.33 |
| 2 | 8.25 | 180 | 13.75 |

Example 18

A laser tool was used to cut perforations in Brohm rock samples. The laser power was 15 kW, the beam angle was 15°, the standoff distances were varied, and a laser tool of the general type shown in FIG. 11 was used.

| Run No. | Standoff ft | Depth (in) | Time (s) | Rate (ft/hr) |
|---|---|---|---|---|
| 1 | 3 | 13.25 | 249 | 15.96 |
| 2 | 7.75 | 6.5 | 180 | 10.83 |

Example 19

A laser tool was used to cut perforations in Brohm rock samples. The laser power was 15.3 kW, the beam angle was 30°, the standoff distance was 3 feet, and a laser tool of the general type shown in FIG. 11 was used. In these tests the laser beam penetrated completely through the rock sample.

| Run No. | Depth (in) | Time (s) | Rate (ft/hr) |
|---|---|---|---|
| 1 | 7.875 | 102 | 23.16 |
| 2 | 7.375 | 98 | 22.58 |
| 3 | 7.375 | 95 | 23.29 |
| 4 | 6.625 | 88 | 22.59 |

-continued

| Run No. | Depth (in) | Time (s) | Rate (ft/hr) |
|---|---|---|---|
| 5 | 10.5 | 243 | 12.96 |
| 6 | 10.375 | 220 | 14.15 |
| 7 | 9.75 | 233 | 12.55 |
| 8 | 8.5 | 115 | 22.17 |

Example 20

A laser tool was used to cut perforations in limestone rock samples. The laser power was 15.3 kW, the beam angle was 15°, the standoff distance was 3 feet, and a laser tool of the general type shown in FIG. 11 was used.

| Run No. | Depth (in) | Time (s) | Rate (ft/hr) |
|---|---|---|---|
| 1 | 4.5 | 240 | 5.63 |
| 2 | 2.5 | 60 | 12.50 |
| 3 | 2.5 | 120 | 6.25 |

Example 21

A laser tool was used to cut perforations in limestone rock samples. The laser power was varied, the beam angle was 30°, the standoff distance was 3 feet, and a laser tool of the general type shown in FIG. 11 was used.

| Run No. | LP kW | Depth (in) | Time (s) | Rate (ft/hr) |
|---|---|---|---|---|
| 1 | 15 | 4.375 | 240 | 5.47 |
| 2 | 10 | 6 | 196 | 9.18 |
| 3 | 10 | 4.5 | 240 | 5.63 |

Example 22

A laser tool was used to cut perforations in rock samples. The laser power was 15.3 kW, the beam angle was 15°, the standoff distance was 3 feet, and a laser tool of the general type shown in FIG. 11 was used.

| Run No. | Depth (in) | Time (s) | Rate (ft/hr) |
|---|---|---|---|
| 1 | 13.5 | 410 | 9.88 |
| 2 | 14.5 | 780 | 5.58 |

Example 23

A laser tool was used to cut perforations in rock samples. The laser power was varied, the beam angle was 30°, the standoff distance was 3 feet, and a laser tool of the general type shown in FIG. 11 was used.

| Run No. | LP kW | Depth (in) | Time (s) | Rate (ft/hr) |
|---|---|---|---|---|
| 1 | 15 | 11.5 | 319 | 10.82 |
| 2 | 10 | 10.5 | 227 | 13.88 |

-continued

| Run No. | LP kW | Depth (in) | Time (s) | Rate (ft/hr) |
|---|---|---|---|---|
| 3 | 10 | 10.375 | 319 | 9.76 |
| 4 | 5 | 10.25 | 600 | 5.13 |
| 5 | 2.5 | 5.25 | 600 | 2.63 |

Example 24

Figure 3A:
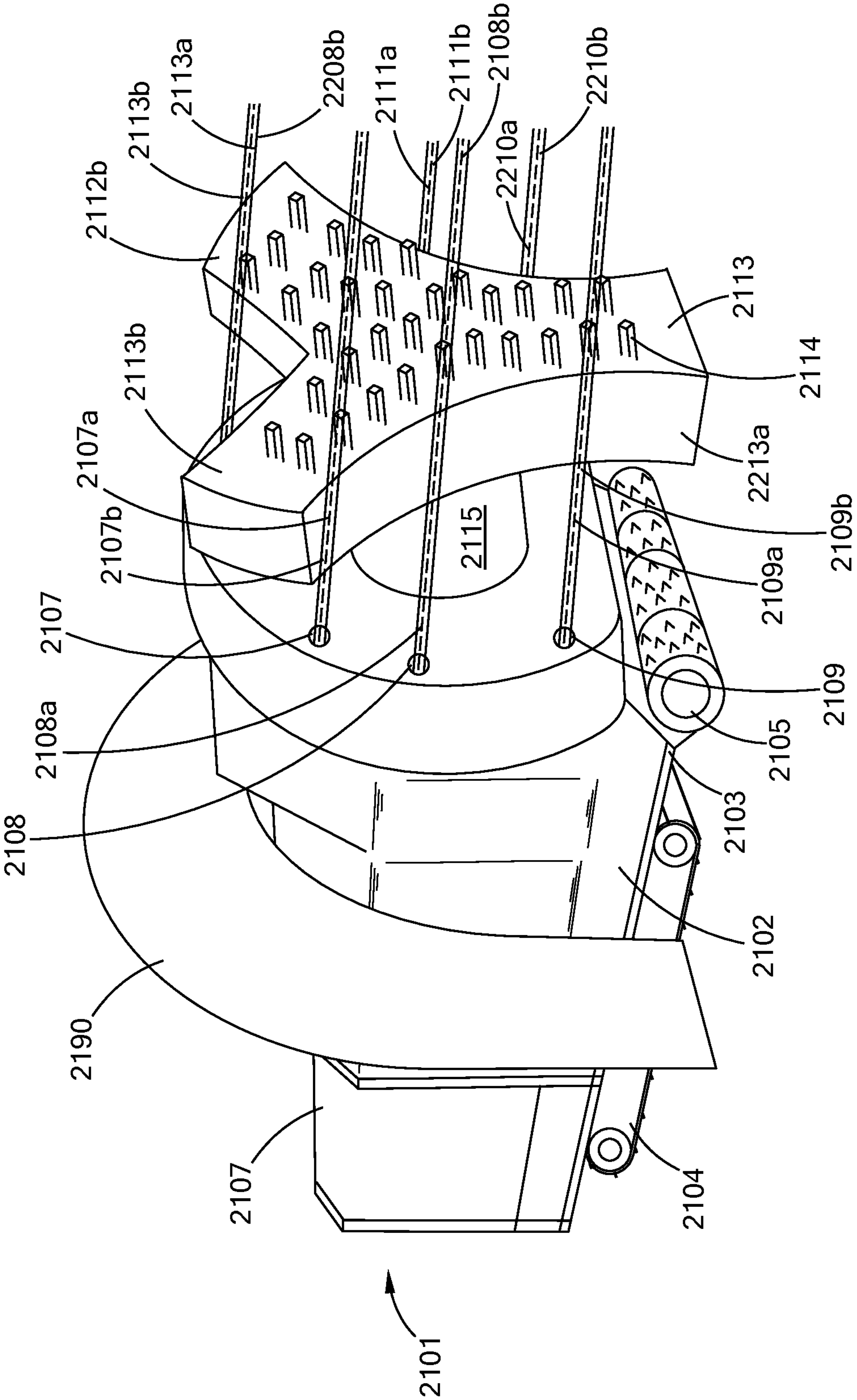
FIG. 3A is a perspective view of the machine of FIG. 3 having an embodiment of an optical shield in accordance with the present invention.

Turning to FIG. 3A there is shown an embodiment of a Class I laser-mechanical tunneling machine having an extendable optical shield 2190. (All other components and numbers correspond to the embodiment of FIG. 3.) During operation of the laser cutting tools the shield 2190 is mechanically extended to and abuts the surrounding walls, forming an optical barrier limiting the passage of any laser energy to less than the amounts of Table I. Safety interlocks are located on the shield prevent the laser from being fired unless and until the shield is seated against the work surface. The shield 2290 is an inflatable device comprising steel mesh, heavy rubber, and an outer surface designed to form an optical seal against the wall material as the equipment is advanced forward during laser tunneling operations.

Example 25

Figure 5A:
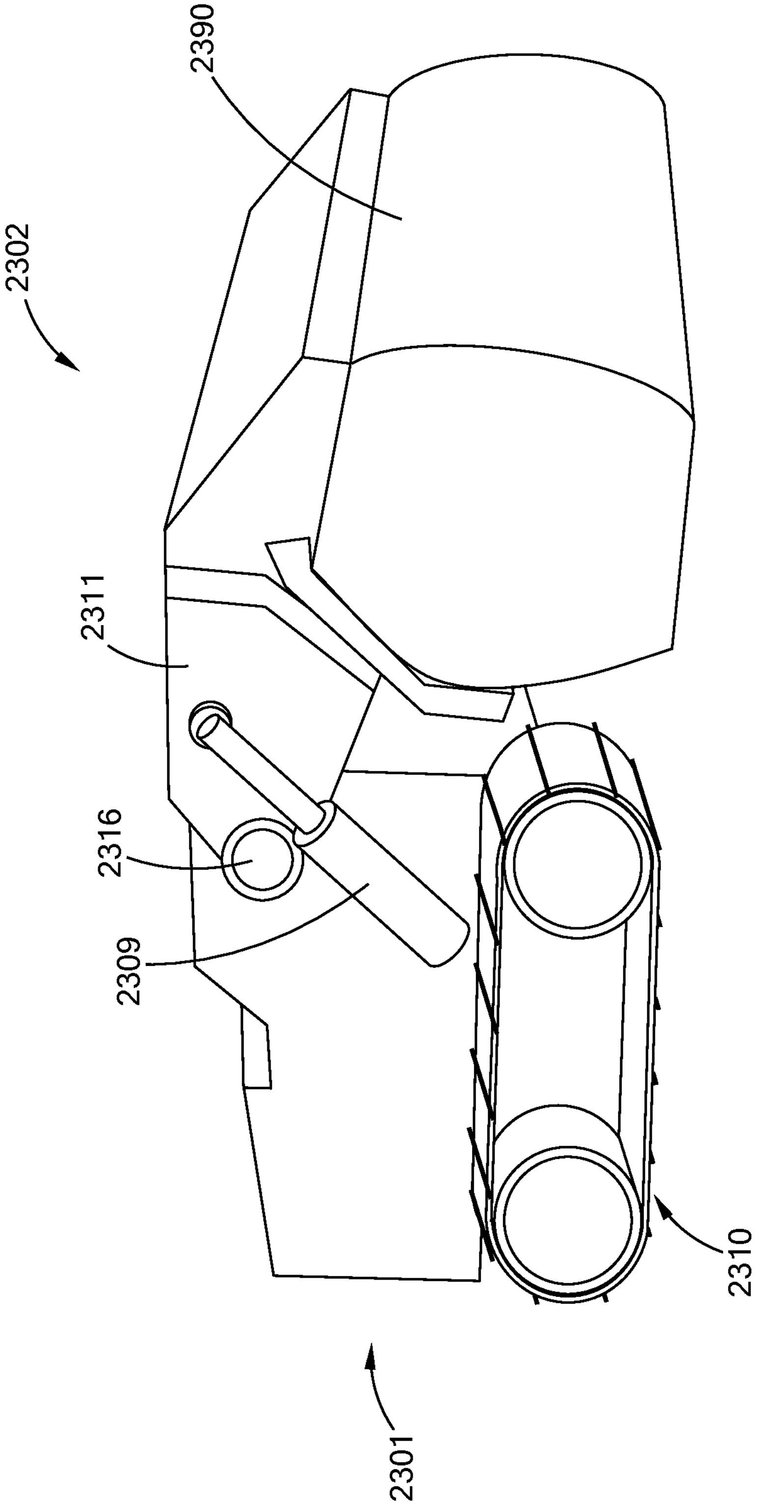
FIG. 5A is a perspective view of the machine of FIG. 5 having an embodiment of an optical shield in accordance with the present invention.

Turning to FIG. 5A there is shown an embodiment of a Class I laser-mechanical tunneling machine having an optical housing shield 2390. (All other components and numbers correspond to the embodiment of FIG. 5.) The optical housing shield 2390 extends and encompasses the laser mechanical equipment and extends to and abuts the face of the work surface surrounding and encompassing the entire laser work area, forming an optical barrier limiting the passage of any laser energy to less than the amounts of Table I. Safety interlocks are located on the shield prevent the laser from being fired unless and until the shield is seated against the work surface. The shield 2390 may be made from a multilayer, semi-flexible material of, for example, steel mesh, metal, heavy rubber, and carbon fiber.

Example 26

Figure 6A:
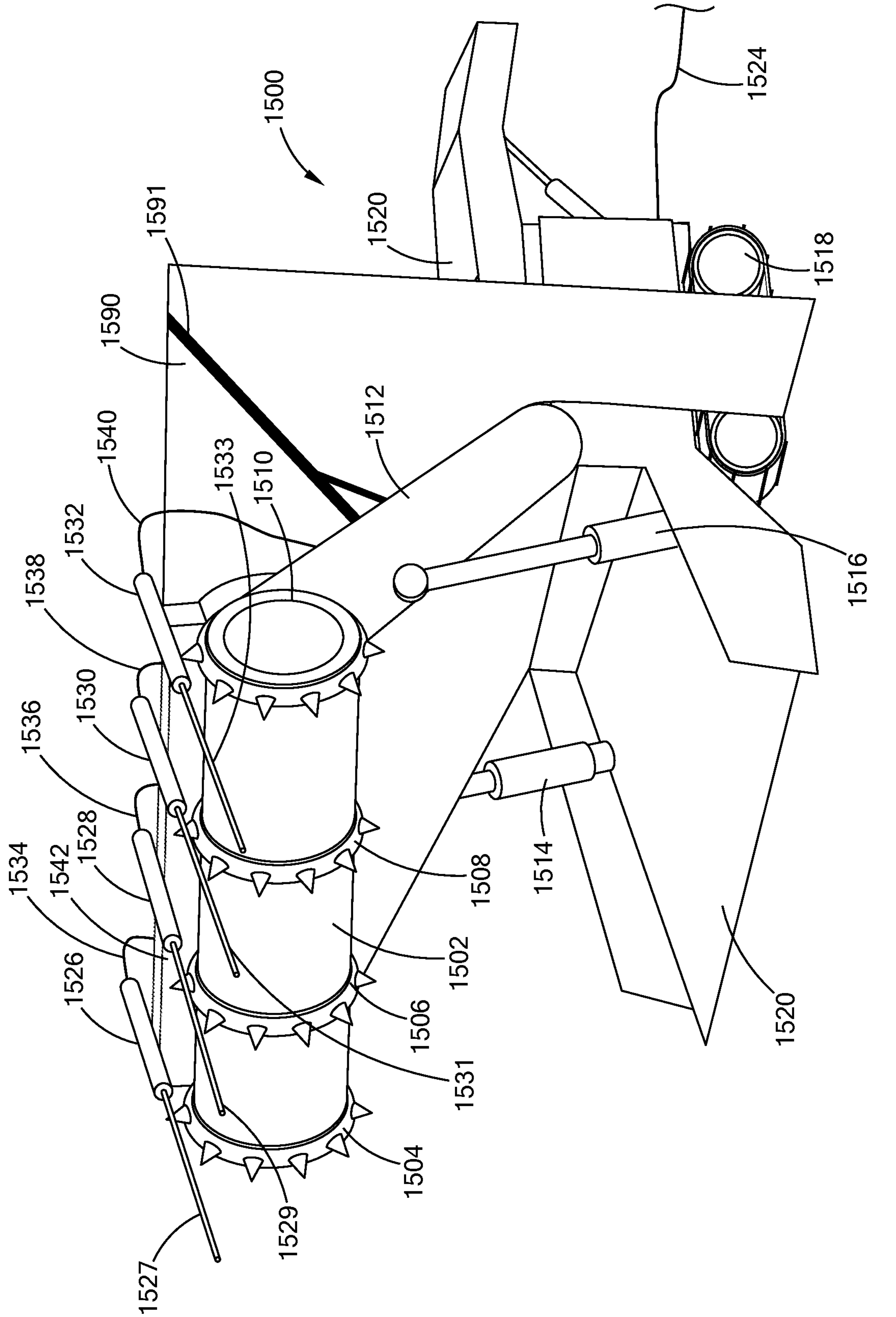
FIG. 6A is a perspective view of the machine of FIG. 6 having an embodiment of an optical shield in accordance with the present invention.

Turning to FIG. 6A there is shown an embodiment of a Class I laser-mechanical continuous mining machine having an optical housing shield 1590, having a mechanical extension and supporting mechanism 1591. (All other components and numbers correspond to the embodiment of FIG. 6.)

Example 27

Figure 8A:
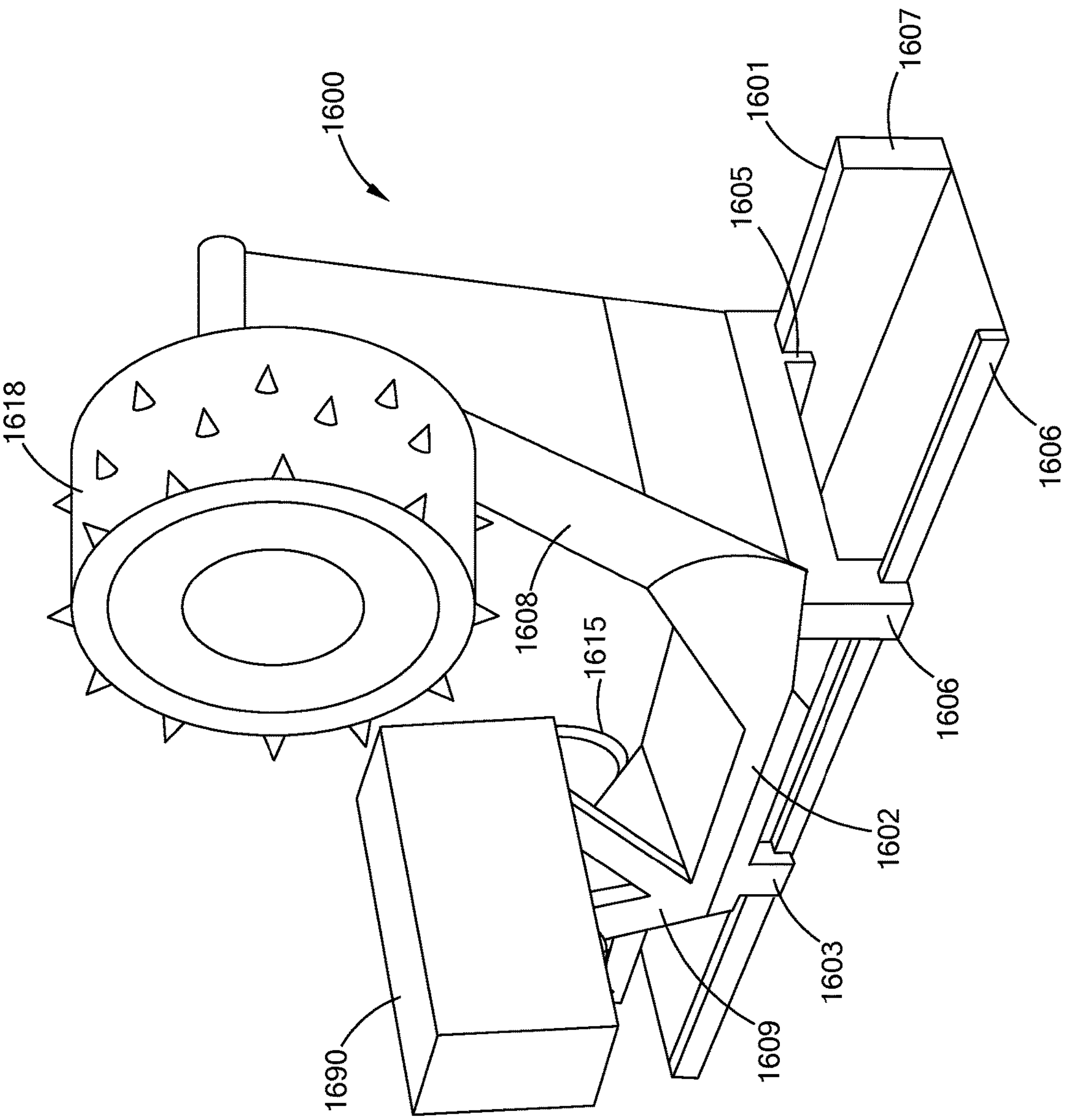
FIG. 8A is a perspective view of the machine of FIG. 8 having an embodiment of an optical shield in accordance with the present invention.

Turning to FIG. 8A there is shown an embodiment of a Class I laser-mechanical continuous mining machine having an optical shield box 1690. (All other components and numbers correspond to the embodiment of FIG. 8.)

Example 28

Turning to FIG. 10A there is shown an embodiment of a laser roof shield assembly having a back optical shield 1990*a* and a side optical shield 1990*a*. One of these units would would be placed at either end of a line of laser roof shield units linked together with safety interlocks form a Class I product. (All other components and numbers correspond to the embodiment of FIG. 10.)

Example 29

Turning to FIG. 26A there is shown an embodiment of a laser cutting system having a back optical tube shield 2690 and tube supporting mechanisms 2691, 2692, 2693. One of these units would would be placed at either end of a line of laser roof shield units linked together with safety interlocks form a Class I product. (All other components and numbers correspond to the embodiment of FIG. 26.)

Example 30

A laser-mechanical equipment of the type shown in FIG. 1 has laser cutting tools of the type shown in FIG. 11A, having an optics assembly of the type shown in FIG. 18.

Example 31

A laser-mechanical equipment of the type shown in FIG. 8 has laser cutting tools of the type shown in FIG. 11A, having an optics assembly of the type shown in FIG. 18.

Example 32

A laser-mechanical equipment of the type shown in FIG. 6 has laser cutting tools of the type shown in FIG. 19, having an optics assembly of the type shown in FIG. 16A.

Example 33

A laser-mechanical equipment of the type shown in FIG. 8 has a laser cutting tool of the type shown in FIG. 19, having an optics assembly of the type shown in FIG. 16A.

Example 34

A laser-mechanical equipment of the type shown in FIG. 2 has three laser cutting tools of the type shown in FIG. 28, radially positioned within the laser mechanical cutting assembly. There proximal ends being near the center of the cutting assembly and their distal ends at the laser tool distal opening.

Example 35

Figure 23:
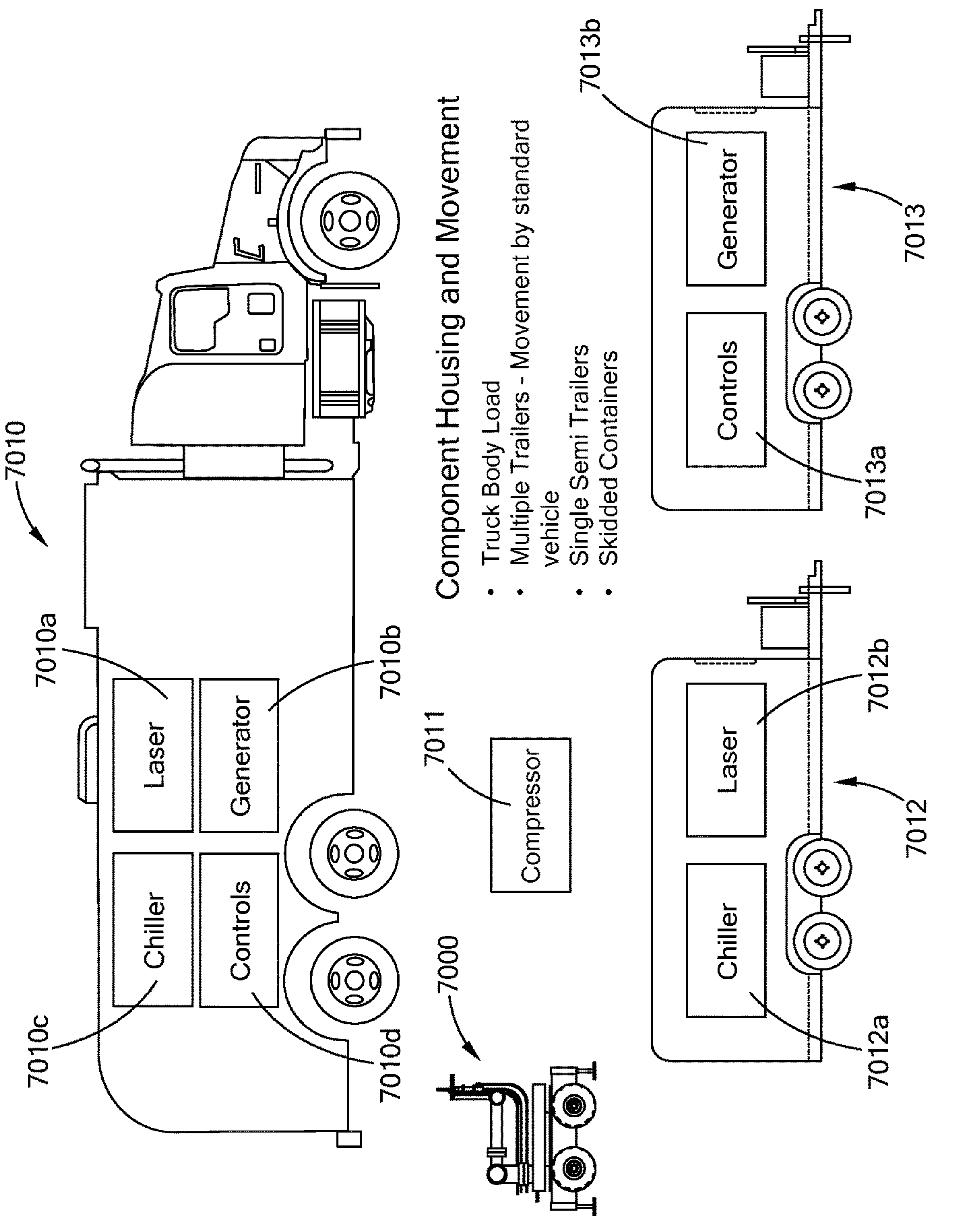
FIG. 23 is a schematic of embodiments of laser vehicles for laser mining systems in accordance with the present inventions.
Figure 24:
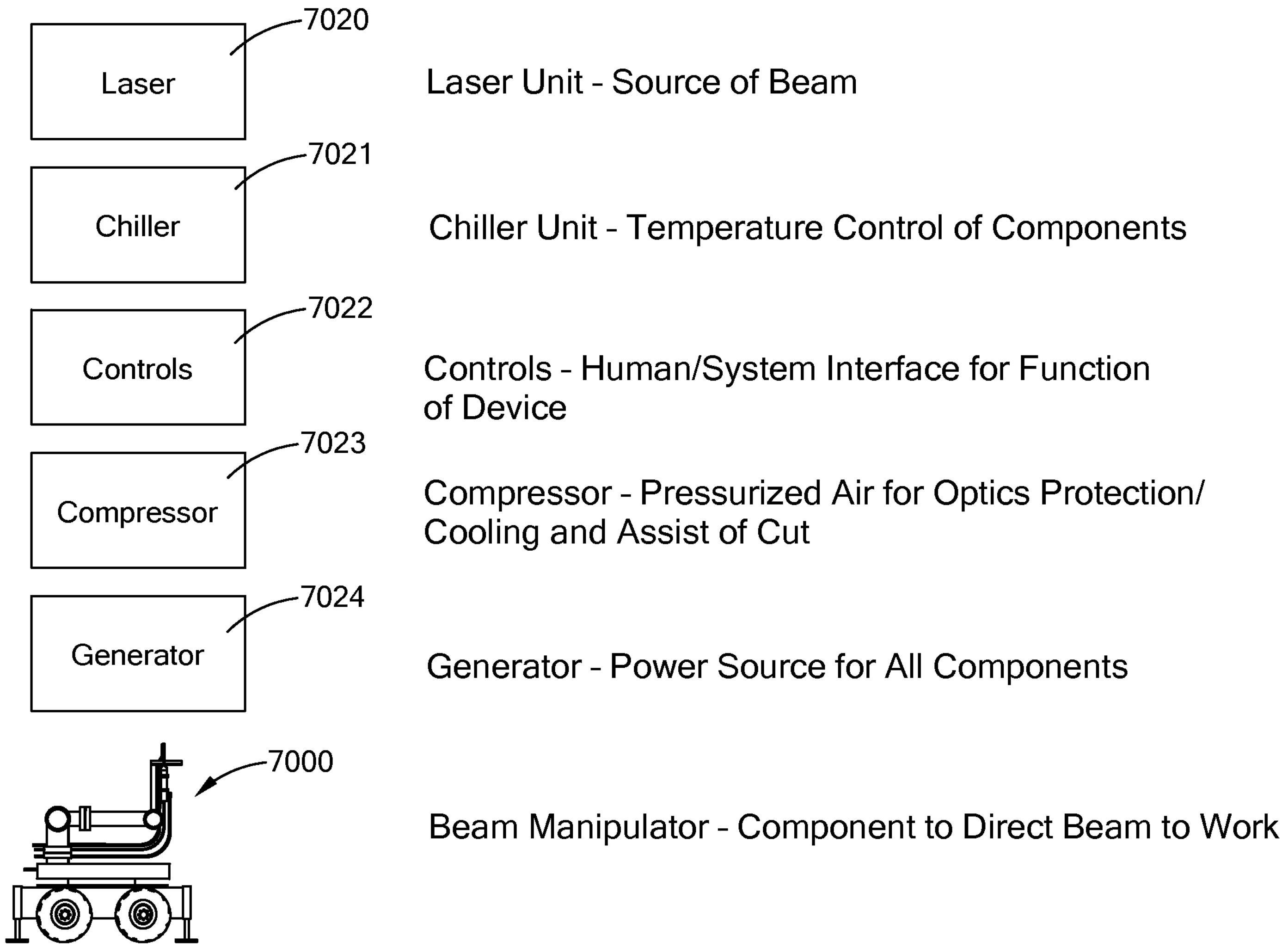
FIG. 24 is a schematic view of a laser mining system in accordance with the present inventions.

Turning to FIGS. 22 to 25 there is shown a laser mining system for use in for example laser caving operations, such as laser caving and block caving. Thus, there is provided a laser robot 7000 for position in a mining area for making upward, vertical or semi vertical cuts in a formation. For example delivering V shaped laser beam patterns to provide a sloped internal area for collection material as it falls from above. The laser robot 7000 has a splatter shield 7001, a cut assist wand 7002. The laser robot 7000 has a laser cut assist wand extender 7004 and a laser head having an optics assembly 7003. The laser robot 7000 has a multiple axis manipulator arm 7005. The laser robot 7000 has several feed or input lines, including a high pressure air feed 7006, a fiber in feed 7007 for the high power laser optical fiber, a low pressure air feed 7008 and a remote control, power, data and motor feed 7009. The robot is remote controlled, to protect personal from entering into dangerous areas where cutting is being done overhead. The robot 7000 also has cameras and sensors. In addition to shooting the laser beam in a vertical orientation, and primarily in a vertical orientation, it could also be directed horizontally. Turning to FIG. 23 there are shown three embodiments of laser vehicles 7010, 7012, 7013 that can be used with the laser robot 7000 to provide a laser delivery mining system. The laser vehicle 7010 is a laser truck having a chiller 7010*c*, a laser 7010*a*, a generator 7010*b*, and a controller 7010*d*. The laser vehicle 7012 is a trailer having a chiller 7012*a* and a laser 7012*b*. The laser vehicle 7013 is a second trailer, that could be used in conjunction with trailer 7012, but located at a different area of the mine, and has a controller 7013*a* and a generator 7013*b*. A compressor 7011 is also used in the system, or compressed air could be obtained from the system in place in the mine.

Figure 25:
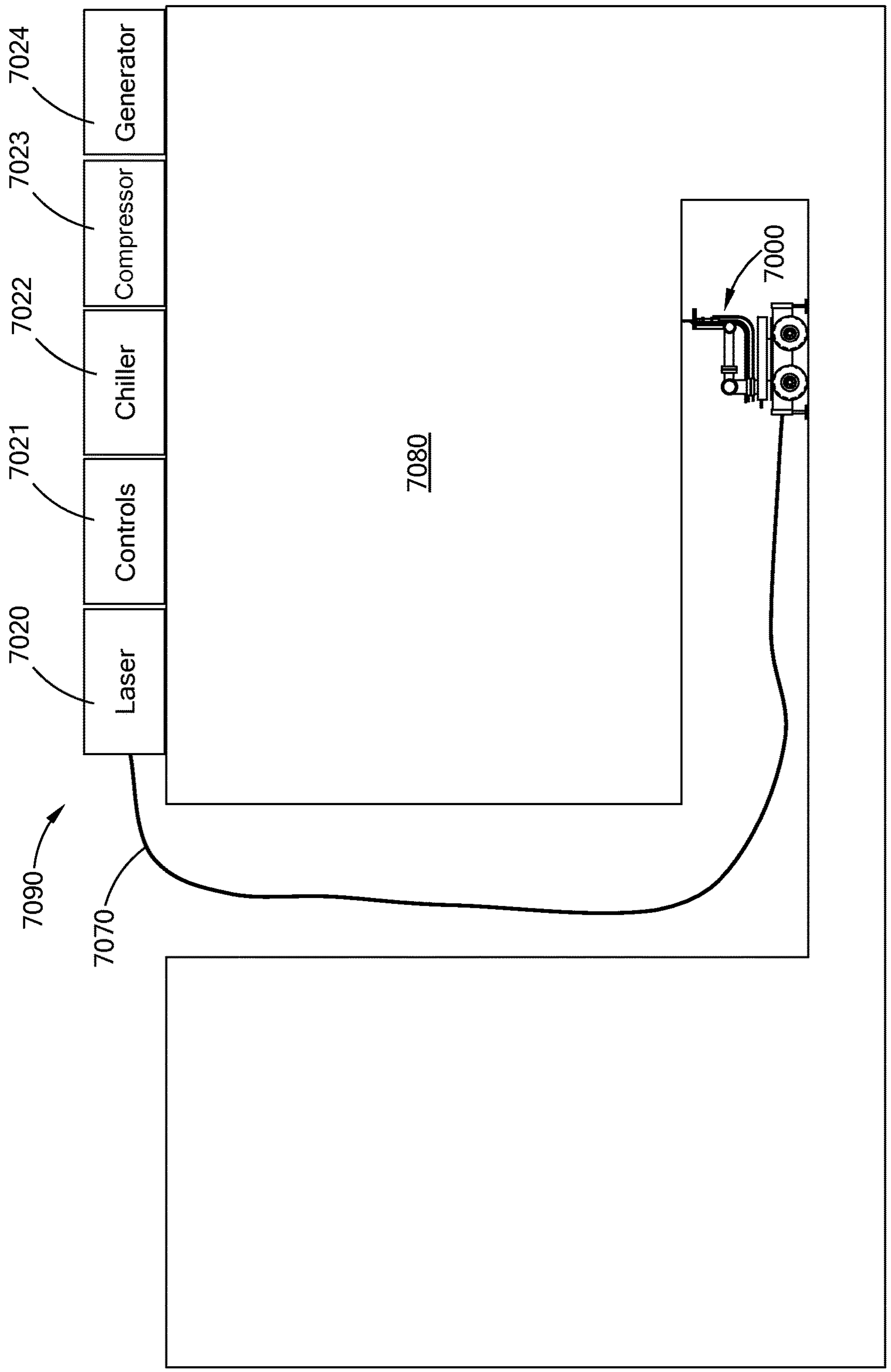
FIG. 25 is a schematic view of an embodiment of a deployed laser mining system in accordance with the present inventions.

Thus, and generally, a laser mining systems for use in example laser caving operations could have a laser unit 7020, a chiller 7021, a control unit 7022, a compressor or source of high pressure air 7023, a generator 7024 and a laser robot 7000. The laser beam would be transmitted from the laser to the laser robot 7000 by way of one or more high power laser fibers. (Additionally, it should be understood that one, two, three or more laser robots may be used in a single laser system, further a laser robot may have one, two, three or more laser cutters.) Turning to FIG. 25 there is shown a schematic of a laser system 7080, having a laser conveyance structure 7070, deployed in a mine 7080. It should be understood that the system may be located entirely under ground within the mine.

Some of the Examples illustrate the integration of long distance high power laser cutting tools with large earth moving, boring, tunneling, removing, etc., equipment. In general, the laser energy is used to soften, weaken or remove, the rock in predetermined and preselected locations and patterns enabling the mechanical cutters to more easily remove the material, which can have many benefits, including for example increase speed, reduced noise, reduced vibration, reduced costs, longer mechanical equipment life, greater control over the removal process, greater control of the surface of the remaining material. Moreover, because the targeted laser energy can substantially reduce the hardness of the rock, or earth, much smaller, and less expensive, equipment can be used in situations where it might otherwise not have been able to be used. These examples are provided as illustrative embodiments of these general types of laser-equipment, it being recognized that other combinations and variations of these and other equipment may be utilized.

In addition to these, examples, the high power laser systems, tools, devices, equipment and methods of the present inventions may find other uses and applications in activities such as: off-shore activities; subsea activities; decommissioning structures such as, factories, nuclear facilities, nuclear reactors, pipelines, bridges, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; precise and from a distance, in-place milling and machining; heat treating; and combinations and variations of these and other activities and operations.

In addition to the foregoing examples, figures and embodiments, other optics assemblies and configurations may be used to focus the laser beam and provide long stand off distance operations. Such optics assemblies would include zoom optics based on a moveable lens, zoom optics based on a movable mirror, zoom optics based on an adaptive optic, and combinations and variations of these.

For example, and preferably gravity can be used as the motive force to remove the molten material by drilling the laser at a slight upward angle, this angle can be as small as a few degrees or as much as 90 degrees from horizontal, i.e., a vertical hole. In general, the greater the angle, the faster the flow rate of the molten rock. For example, the temperature for the melting point for quartz is about 2,100° C. This effect is shown in the chart of FIG. 11, where the laser is pointed up 6° from horizontal, making a natural incline for the molten rock, e.g., lava to flow from the hole that is being drilled. The penetration rate of the laser beam into the hard limestone formation at an inclination angle of 6 degrees is essentially linear with increasing laser power. It being noted that at 0° the laser beam may not be able to penetrate the rock formation, or penetrate deeply because of the lava puddling at the entrance to the hole. Further, the hole shape and size, beam size and power distribution may also have an effect on the flow rate of the molten rock. The laser can penetrate deep into the rock by using either a collimated laser beam or a long focal length laser beam. The laser beam processing head can be against the rock or several feet from the rock since gravity does the clearing of the rock debris and there is no need for fluid to be used to clear the hole. The beam may also have a beam profile such that the beam angle may be zero degrees, yet the have an effective beam angle of greater than zero because the lower part of the hole cut by the laser is at a sufficient slope to cause the molten material for flow from the hole back towards the direction of the laser.

A single high power laser may be utilized in the system, tools and operations, or there may be two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers).

An example of this general type of fiber laser is the IPG YLS-20000. The detailed properties of which are disclosed in US patent application Publication Number 2010/0044106.

Examples of lasers, conveyance structures, high power laser fibers, high power laser systems, optics, optics housings to isolate optics from vibration and environment conditions, break detection and safety monitoring, control systems, connectors, cutters, and other laser related devices, systems and methods that may be used with, in, or in conjunction with, the various embodiments of devices systems, tools, activities and operations set forth in this specification are disclosed and taught in the following US patent application publications and US patent applications: Publication Number 2010/0044106; Publication Number 2010/0044105; Publication Number 2010/0044103; Publication Number 2010/0215326; Publication Number 2012/0020631; Publication Number 2012/0074110; Publication No. 2012/0068086; Publication No. 2012/0248078; Ser. No. 13/403,723; Ser. No. 13/403,509; Ser. No. 13/486,795; Ser.

No. 13/565,345; Ser. No. 61/605,429; and Ser. No. 61/605,434, the entire disclosures of each of which are incorporated herein by reference.

In addition to the use of high power electromagnetic energy, such as high power laser beams, other forms of directed energy or means to provide the same, may be utilized in, in addition to, or in conjunction with the devices systems, tools, activities and operations set forth in this specification. Such directed energy could include, for example, non-optical stimulated emission electromagnetic energy, non-optical coherent electromagnetic energy, microwaves, sound waves, millimeter waves, plasma, electric arcs, flame, flame jets, steam and combinations of the foregoing, as well as, water jets and particle jets. It is noted, however, that each of these other such directed energies, has significant disadvantages when compared to high power laser energy. Nevertheless, the use of these other less desirable directed energy means is contemplated by the present inventions as directed energy means.

These tools, systems and operations provide a unique laser drilling and cutting methods for performing many activities such as prepping blast holes or cutting out the slope of a rock face, they also provide the ability to reduce the need for, if not to eliminate the need for the use of explosives in construction, demolition, decommissioning, mining, and other types of activities where explosives and large equipment are utilized. It being understood, that precision activities of a very fine nature may also be performed, such as precision cutting of a part or component in a high hazardous environment, such as within a nuclear reactor containment structure. For example a high power laser, of 1 kW or greater, can be used to drill a hole directly in a rock face. A laser, when drilling into a vertical wall or ceiling can penetrate to the maximum limit of the laser beam's intensity, as long as, fresh material is being exposed to the laser beams energy. Thus, by way of example, it is preferable that there is room for the melted rock to flow from the laser drilled hole, and if necessary and preferably that some means be employed to force or assist in the melted rock being removed from the laser drilled hole, or from the laser beam path as it progress into and advances the hole.

Depending upon the target material being cut, the location of the cutting, e.g., in a confined area or in the open, it may be advisable or preferable to have a system for handling, managing, processing and combinations and variation of these, the gases, fumes, and other air born or gaseous materials that are created during or by the laser operation. Thus, for example and preferably, a high volume vacuum system can be located near the exit of the drilling or cutting region to be able to remove any toxic fumes from the molten region.

The shape of the laser beam, the laser beam spot on the surface of the target material, and the resultant hole that is created by the laser beam in the target material may be circular, square, v-shaped, circular with a flat bottom, square with a rounded bottom, and other shapes and configurations that may be utilized and can be based upon the flow characteristics of the molten target material, and selected to maximize the removal of that material.

The various embodiments of devices systems, tools, activities and operations set forth in this specification may be used with various high power laser systems and conveyance structures and systems, in addition to those embodiments of the Figures in this specification. The various embodiments of devices systems, tools, activities and operations set forth in this specification may be used with: other high power laser systems that may be developed in the future: with existing non-high power laser systems, which may be modified, in-part, based on the teachings of this specification, to create a high power laser system; and with high power directed energy systems. Further, the various embodiments of devices systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A high power laser mechanical earth removing machine, the machine comprising:

a. a source of high power laser energy, a source of a fluid, and an optics package;

b. the optics package comprising a cooling means, and an optics assembly;

c. the optics assembly configured to convey a laser beam from the source of high power laser energy to a tool that discharges the laser beam, the laser beam having a focal length, a spot size, a spot shape, and a waist having a focal point and a distal end and a proximal end defining a waist length therebetween;

d. a means for mechanically removing laser effected earth; and, e. wherein the spot size of the waist of the laser beam is 2.0 $cm^2$ or less, and the waist length is at least 4 ft.

2. The machine of claim 1, whereby the tool has a stand off distance of at least 10 ft measured from a distal end of the tool to a work surface.

3. The machine of claim 1, wherein the earth removing machine is a laser tunneling apparatus.

4. The machine of claim 1, wherein the earth removing machine is a laser mechanical boring machine.

5. The machine of claim 1, wherein the earth removing machine is a laser mechanical road resurfacing machine.

6. The machine of claim 1, wherein the earth removing machine comprises a movable cutting assembly.

7. The machine of claim 1, wherein the earth removing machine comprises a movable cutting assembly.

8. The machine of claim 1, wherein the earth removing machine is a laser mechanical continuous miner.

9. The machine of claim 1, wherein the earth removing machine is a laser mechanical shear plow.

10. The machine of claim 1, wherein the earth removing machine comprises a long wall mining system.

11. A laser mechanical continuous mining machine, comprising: a rotating head having a position and a cutting wheel; an adjustment means whereby the position of the rotating head is adjusted; an inlet chute for receiving a laser affected ore; and outlet chute for discharging a laser affected ore; a laser cutting assembly; a laser support bar, and a high power laser cable in optical communication with the laser cutting assembly.

12. The machine of claim 11, characterized as a Class I product.

13. The machine of claim 11, characterized as a Class IIa product.

14. The machine of claim 11, characterized as a Class II product.

15. The machine of claim 1, characterized as a Class I product.

16. The machine of claim 1, characterized as a Class IIa product.

17. The machine of claim 1, characterized as a Class II product.

18. The machine of claim 1, characterized as a Class IIIa product.

19. The machine of claim 1, characterized as a Class IIIb product.

* * * * *